United States Patent
Wu

(10) Patent No.: US 12,369,090 B2
(45) Date of Patent: Jul. 22, 2025

(54) CONDITIONAL FULL CONFIGURATION AND CONDITIONAL DELTA CONFIGURATION

(71) Applicant: GOOGLE LLC, Mountain View, CA (US)

(72) Inventor: Chih-Hsiang Wu, Taoyuan (TW)

(73) Assignee: GOOGLE LLC, Mountain View, CA (US)

( * ) Notice: Subject to any disclaimer, the term of this patent is extended or adjusted under 35 U.S.C. 154(b) by 256 days.

(21) Appl. No.: 17/773,654

(22) PCT Filed: Nov. 5, 2020

(86) PCT No.: PCT/US2020/059006
§ 371 (c)(1),
(2) Date: May 2, 2022

(87) PCT Pub. No.: WO2021/092102
PCT Pub. Date: May 14, 2021

(65) Prior Publication Data
US 2022/0386191 A1 Dec. 1, 2022

Related U.S. Application Data

(60) Provisional application No. 62/932,443, filed on Nov. 7, 2019.

(51) Int. Cl.
*H04W 36/00* (2009.01)
*H04W 36/08* (2009.01)
(Continued)

(52) U.S. Cl.
CPC ... *H04W 36/305* (2018.08); *H04W 36/00698* (2023.05); *H04W 36/087* (2023.05); *H04W 36/362* (2023.05)

(58) Field of Classification Search
CPC ................ H04W 36/0069; H04W 36/0066
(Continued)

(56) References Cited

U.S. PATENT DOCUMENTS 10,856,191 B1 * 12/2020 Virtej .................... H04W 76/27
2002/0186440 A1 * 12/2002 Adachi .................... H03F 3/24
398/183

(Continued)

FOREIGN PATENT DOCUMENTS

CN 110178407 A 8/2019
EP 2983407 A1 2/2016
(Continued)

OTHER PUBLICATIONS

International Search Report and Written Opinion for Application No. PCT/US2020/059006, dated Feb. 25, 2021.
(Continued)

*Primary Examiner* — Qutbuddin Ghulamali
(74) *Attorney, Agent, or Firm* — MARSHALL, GERSTEIN & BORUN LLP

(57) ABSTRACT

A user device capable of receiving a full configuration related to a radio connection to a base station and a delta configuration which the user device can apply to a first configuration received previously (i) receives, from the base station while the user device is operating in a cell covered by the base station using the first configuration, the full configuration providing information for user device operation within a candidate cell (1404), (ii) determines whether a set of one or more conditions associated with the full configuration to the candidate cell is satisfied (1406), and (iii) connects to the candidate cell using the full configuration if the user device determines that the set of conditions is satisfied (1410).

20 Claims, 29 Drawing Sheets

(51) Int. Cl.
  *H04W 36/30* (2009.01)
  *H04W 36/36* (2009.01)
(58) Field of Classification Search
  USPC .......................................................... 455/436
  See application file for complete search history.

(56) References Cited

U.S. PATENT DOCUMENTS

| | | | | |
|---|---|---|---|---|
| 2017/0188285 | A1* | 6/2017 | Moon | H04W 36/04 |
| 2018/0199251 | A1* | 7/2018 | Kim | H04W 36/0066 |
| 2018/0279193 | A1* | 9/2018 | Park | H04W 76/27 |
| 2020/0053601 | A1 | 2/2020 | Wu | |
| 2020/0389826 | A1* | 12/2020 | Park | H04W 36/249 |

FOREIGN PATENT DOCUMENTS

| | | |
|---|---|---|
| WO | WO-2014/169880 A1 | 10/2014 |
| WO | WO-2015/168920 A1 | 11/2015 |
| WO | WO-2017/028462 A1 | 2/2017 |
| WO | WO-2018175721 A1 | 9/2018 |
| WO | WO-2018/194326 A1 | 10/2018 |
| WO | WO-2021035384 A1 | 3/2021 |

OTHER PUBLICATIONS

Charter Communications, "On Maximum Number of CHO Candidate Cells and Nodes," 3GPP Draft (2019).
Intel Corporation, "Email Discussion Report for [107#30] [NR/LTE/Mob-enh] Configuration of CHO and Execution Condition," 3GPP Draft (2019).
First Examination Report for India Application No. 202247027351, dated Oct. 10, 2022.
"5G; NR; Overall Description; Stage-2," 3GPP TS 38.300 version 15.60.0 Release 15 (2019).
"5G; NR; Packet Data Convergence Protocol (PDCP) Specification," 3GPP TS 38.323 version 15.5.0 Release 15 (2019).
"LTE; Evolved Universal Terrestrial Radio Access (E-UTRA) and Evolved Universal Terrestrial Radio Access Network (E-UTRAN); Overall Specification," 3GPP TS 36.300 version 15.6.0 Release 15 (2019).
"LTE; Evolved Universal Terrestrial Radio Access (E-UTRA); Packet Data Convergence Protocol (PDCP) Specification," 3GPP TS 36.323 version 15.2.0 Release 15 (2019).
"LTE; Evolved Universal Terrestrial Radio Access (E-UTRA); Radio Resource Control (RRC); Protocol Specification," 3GPP TS 36.331 version 15.7.0 Release 15 (2019).
"Universal Mobile Telecommunications System (UMTS); LTE; 5G; NR; Multi-Connectivity; Overal Description; Stage-2," 3GPP TS 37.340 version 15.7.0 Release 15 (2019).
China Telecom, "[Offline Discussion-081] summary of NR agreements that could be 'imported' to LTE," 3GPP TSG-RAN WG2 Meeting #106 (2019).
ETSI MCC, "Report of 3GPP TSG RAN2#106 meeting, Reno, USA," 3GPP TSG-RAN WG2 meeting #107 (2019).
ETSO MCC, "Report of 3GPP TSG RAN2#107 meeting, Prague, Czech Republic," 3GPP TSG-RAN WG2 meeting #107bis (2019).
STT DOCOMO, "Support of Conditional PSCell addition/change," 3GPP TSG-RAN WG2 Meeting #107 (2019).
vivo, "RRM measurement relaxation criteria," 3GPP TSG-RAN WG2 Meeting #107bis (2019).

* cited by examiner

CONDITIONAL FULL CONFIGURATION AND CONDITIONAL DELTA CONFIGURATION

FIELD OF THE DISCLOSURE

This disclosure relates generally to wireless communications and, more particularly, to conditional operations related to conditional handover and conditional PSCell change with or without SN change. The conditional PSCell change with SN change can be referred to as a conditional SN change.

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In telecommunication systems, the Packet Data Convergence Protocol (PDCP) sublayer of the radio protocol stack provides services such as transfer of user-plane data, ciphering, integrity protection, etc. For example, the PDCP layer defined for the Evolved Universal Terrestrial Radio Access (EUTRA) radio interface (see 3GPP TS 36.323) and New Radio (NR) (see TS 38.323) provides sequencing of protocol data units (PDUs) in the uplink direction (from a user equipment (UE) to a base station) as well as in the downlink direction (from the base station to the UE). Further, the PDCP sublayer provides signaling radio bearers (SRBs) and data radio bearers (DRBs) to the Radio Resource Control (RRC) sublayer. Generally speaking, the UE and a base station can use SRBs to exchange RRC messages as well as non-access stratum (NAS) messages and use DRBs to transport data on a user plane.

UEs can use several types of SRBs and DRBs. When operating in dual connectivity (DC), the cells associated with the base station operating the master node (MN) define a master cell group (MCG), and the cells associated with the base station operating as the secondary node (SN) define the secondary cell group (SCG). So-called SRB1 resources carry RRC messages, which in some cases include non-access stratum (NAS) messages over the dedicated control channel (DCCH), and SRB2 resources support RRC messages that include logged measurement information or NAS messages, also over the DCCH but with lower priority than SRB1 resources. More generally, SRB1 and SRB2 resources allow the UE and the MN to exchange RRC messages related to the MN and embed RRC messages related to the SN, and also can be referred to as MCG SRBs. SRB3 resources allow the UE and the SN to exchange RRC messages related to the SN, and can be referred to as SCG SRBs. Split SRBs allow the UE to exchange RRC messages directly with the MN via lower layer resources of the MN and the SN. Further, DRBs terminated at the MN and using the lower-layer resources of only the MN can be referred as MCG DRBs, DRBs terminated at the SN and using the lower-layer resources of only the SN can be referred as SCG DRBs, and DRBs terminated at the MCG but using the lower-layer resources of either the MN or the SN, or both can be referred to as split DRBs.

The UE in some scenarios can concurrently utilize resources of multiple RAN nodes (e.g., base stations or components of a distributed base station), interconnected by a backhaul. When these network nodes support different radio access technologies (RATs), this type of connectivity is referred to as Multi-Radio Dual Connectivity (MR-DC). When a UE operates in MR-DC, one base station operates as a master node (MN) that covers a primary cell (PCell), and the other base station operates as a secondary node (SN) that covers a primary secondary cell (PSCell). The UE communicates with the MN (via the PCell) and the SN (via the PSCell). In other scenarios, the UE utilizes resources of one base station at a time. One base station and/or the UE determines that the UE should establish a radio connection with another base station. For example, one base station can determine to hand the UE over to the second base station, and initiate a handover procedure.

3GPP specification TS 37.340 (v15.7.0) describes procedures for adding or changing an SN in DC scenarios. These procedures involve messaging (e.g., RRC signaling and preparation) between RAN nodes that generally causes latency, which in turn increases the probability of failure of SN addition or SN change procedures. These procedures do not involve conditions associated with the UE, and can be referred to as "immediate" SN addition and change procedures. R2-1912344 describes procedures for conditionally adding or changing an SN in DC scenarios.

More recently, for both SN addition/change and handover, "conditional" procedures have been considered (i.e., conditional SN addition/change and conditional handover). Unlike the "immediate" procedures discussed above, these procedures do not add or change the SN, or perform the handover, until the UE determines that a condition is satisfied. As used herein, the term "condition" may refer to a single, detectable state or event (e.g., a particular signal quality metric exceeding a threshold), or to a logical combination of such states or events (e.g., "Condition A and Condition B," or "(Condition A or Condition B) and Condition C", etc.).

To configure a conditional procedure, the RAN provides the condition to the UE, along with a configuration (e.g., a set of random-access preambles, etc.) that will enable the UE to communicate with the appropriate base station, or via the appropriate cell, when the condition is satisfied. For a conditional addition of a base station as an SN, for example, the RAN provides the UE with a condition to be satisfied before the UE can add that base station as the SN, and a configuration that enables the UE to communicate with that base station after the condition has been satisfied.

In DC scenarios, the UE receives an RRC reconfiguration message (e.g., RRCReconfiguration, RRCConnectionReconfiguration) that contains an SCG configuration for the UE to communicate with the SN while the UE is connected to the MN. This SCG configuration ("baseline SCG configuration") is the baseline for future delta configurations for conditional PSCell changes (i.e., from a PSCell currently being used by the UE to communicate with the SN to a candidate PSCell (C-PSCell) of the SN (or another SN)) or conditional PSCell additions (i.e., adding a C-PSCell of the SN (or another SN) in addition to the PSCell currently being used by the UE to communicate with the SN). While the UE is in DC with the MN and SN, the SN (or another SN) can generate at least one conditional SCG configuration and send the conditional SCG configuration to the UE. Upon receiving the conditional SCG configuration, the UE configures or reconfigures (i.e., (re)configure) the baseline SCG configuration if the user device determines that condition(s) associated with the conditional SCG configuration are satisfied. According to 3GPP specification TS 38.331, the SN uses delta configuration, not full configuration, as the conditional SCG configuration to (re)configure the SCG configuration for conditional PSCell changes or additions. When the SN uses delta configuration as the conditional SCG configuration for conditional PSCell change or for conditional PSCell addition, the SN parses the baseline SCG configuration currently being used by the UE to communicate with the SN, to identify which configuration parameters in the baseline SCG configuration to keep, so that the SN can exclude the shared (non-delta) configuration parameters when generating the delta configuration and subsequently providing the delta configuration to the UE (e.g., via SRB3). This may lead to inefficient usage of resources in implementing a conditional PSCell change or addition. If the SN updates the baseline SCG configuration of the UE by transmitting a delta SN configuration to the UE, the SN may again spend resources to consequently update the conditional SCG configurations that were previously provided to the UE, and send the updated conditional SCG configurations to the UE to update the conditional SCG configurations stored in the UE.

Further, if the UE detects a radio link failure (RLF) on the PSCell, the UE attempts to connect to the SN (or another SN) via the C-PSCell. If the UE is unable to connect via the C-PSCell, the UE performs a re-establishment procedure with the MN. But if the UE performs the re-establishment procedure, the UE suspends all RBs except SRB0, according to 3GPP TS 36.331/38.331 v15.7.0 section 5.3.7. Therefore, the UE is unable to participate in future procedures for conditionally adding or changing an SN in DC scenarios, because the UE is unable to receive future conditional SCG configurations (e.g., via SRB3) from the SN.

3GPP specifications 36.300 v15.7.0 and 38.300 v15.7.0 describe a handover procedure that includes several steps (RRC signaling and preparation) between RAN nodes, which causes latency in the handover procedure and therefore higher risk of handover failure. The procedure does not involve conditions associated with the UE, and can be referred to as an "immediate" handover procedure.

In a conditional handover scenario, a UE receives an RRC configuration to communicate with an MN while the UE is connected in single connectivity (SC) to the MN via a PCell. This RRC configuration ("baseline RRC configuration") is the baseline for future delta configurations for conditional handover (i.e., from a PCell currently being used by the UE to communicate with the MN to a candidate PCell (C-PCell) of a candidate MN (C-MN). In an intra-base station conditional handover, the MN generates the conditional handover command configuration. In an inter-base station conditional handover, the C-MN generates the conditional handover configuration and sends the conditional handover configuration to the MN during a conditional handover procedure. Upon receiving the conditional handover configuration, the UE (re)configures the baseline RRC configuration if the user device determines that condition(s) associated with the conditional handover configuration are satisfied. When the MN or C-MN uses delta configuration as the conditional handover configuration, the MN or C-MN parses the baseline RRC configuration currently being used by the UE to communicate with the first base station, to identify which configuration parameters in the baseline RRC configuration to keep, so that the MN or C-MN can exclude those shared (non-delta) configuration parameters when generating the delta configuration and subsequently providing the delta configuration to the UE. This may lead to inefficient usage of resources in implementing a conditional handover. If the MN or C-MN updates and provides the baseline RRC configuration to the UE, the MN or C-MN may again spend resources to consequently update the delta configuration (and any other delta configuration(s)) that were previously provided to the UE, and send the updated delta configurations to the UE.

SUMMARY

According to some of the techniques of this disclosure, a base station determines, while a user device is operating in a cell covered by the base station using a previously received configuration, to configure a full configuration for the user device. The base station then identifies at least a candidate cell for the full configuration. Subsequently, the base station transmits, to the user device, the full configuration and an indication of a set of one or more conditions to be satisfied before the user device communicates with the base station via the candidate cell using the full configuration.

According to other techniques of this disclosure, a base station transmits, to a user device, a second configuration for the user device to update a first configuration received previously in accordance with the second configuration. The base station then determines, while the user device is operating in a cell covered by the base station using the first configuration, to configure a delta configuration for the user device, wherein the delta configuration includes an indication that the UE is to modify the second configuration. The base station then identifies at least a candidate cell for the delta configuration, and subsequently transmits, to the user device, the delta configuration and an indication of a set of one or more conditions to be satisfied before the user device communicates with the base station via the candidate cell using the delta configuration. Transmitting the delta configuration and the indication of the set of one or more conditions causes the user device to communicate with the base station using the delta configuration and at least a portion of the second configuration when the user device determines that the set of one or more conditions is satisfied.

According to other techniques of this disclosure, a user device receives, from a base station while the user device is operating in a cell covered by the base station using a first configuration previously received, a full configuration providing information for user device operation within a candidate cell. The user device then determines whether a set of one or more conditions associated with the full configuration to the candidate cell is satisfied. Subsequently, the UE connects to the candidate cell using the full configuration if the user device determines that the set of conditions is satisfied.

According to other techniques of this disclosure, a user device receives, from a base station, while the user device is operating in a cell covered by the base station using a first configuration previously received, a second configuration for updating the first configuration for operating in the cell covered by the base station. The user device receives, from the base station while the user device is operating in the cell, a first delta configuration providing information for user device operation within a first candidate cell, wherein the first delta configuration includes an indication for modifying the second configuration. The user device then determines whether a set of one or more conditions associated with the first delta configuration to the first candidate cell is satisfied. Prior to detecting that the set of one or more conditions associated with the first delta configuration to the first candidate cell is satisfied, the user device updates the first configuration in accordance with the second configuration and communicates with the base station using the updated configuration. After detecting that the first set of one or more conditions associated with the first delta configuration to the first candidate cell is satisfied, the user device connects to the first candidate cell using the first delta configuration and one of at least a portion of the updated first configuration or at least a portion of the first configuration.

According to other techniques of this disclosure, a user device receives, from the base station while the user device is operating in a cell covered by the base station using the previously received configuration, a first delta configuration providing information for user device operation within a first candidate cell. The user device also receives, from the base station while the user device is operating in the cell covered by the base station using the previously received configuration, a second delta configuration providing information for user device operation within a second candidate cell. The user device detects that a second set of one or more conditions associated with the second delta configuration to connect to the second candidate cell is satisfied. Subsequently, the user device connects to the second candidate cell using the second delta configuration and a portion of the previously received configuration.

DETAILED DESCRIPTION OF THE DRAWINGS

Generally speaking, the communication devices of this disclosure implement procedures related to conditional handover, conditional primary secondary cell (PSCell) addition and configuring conditional PSCell change with or without SN change.

Figure 1A:
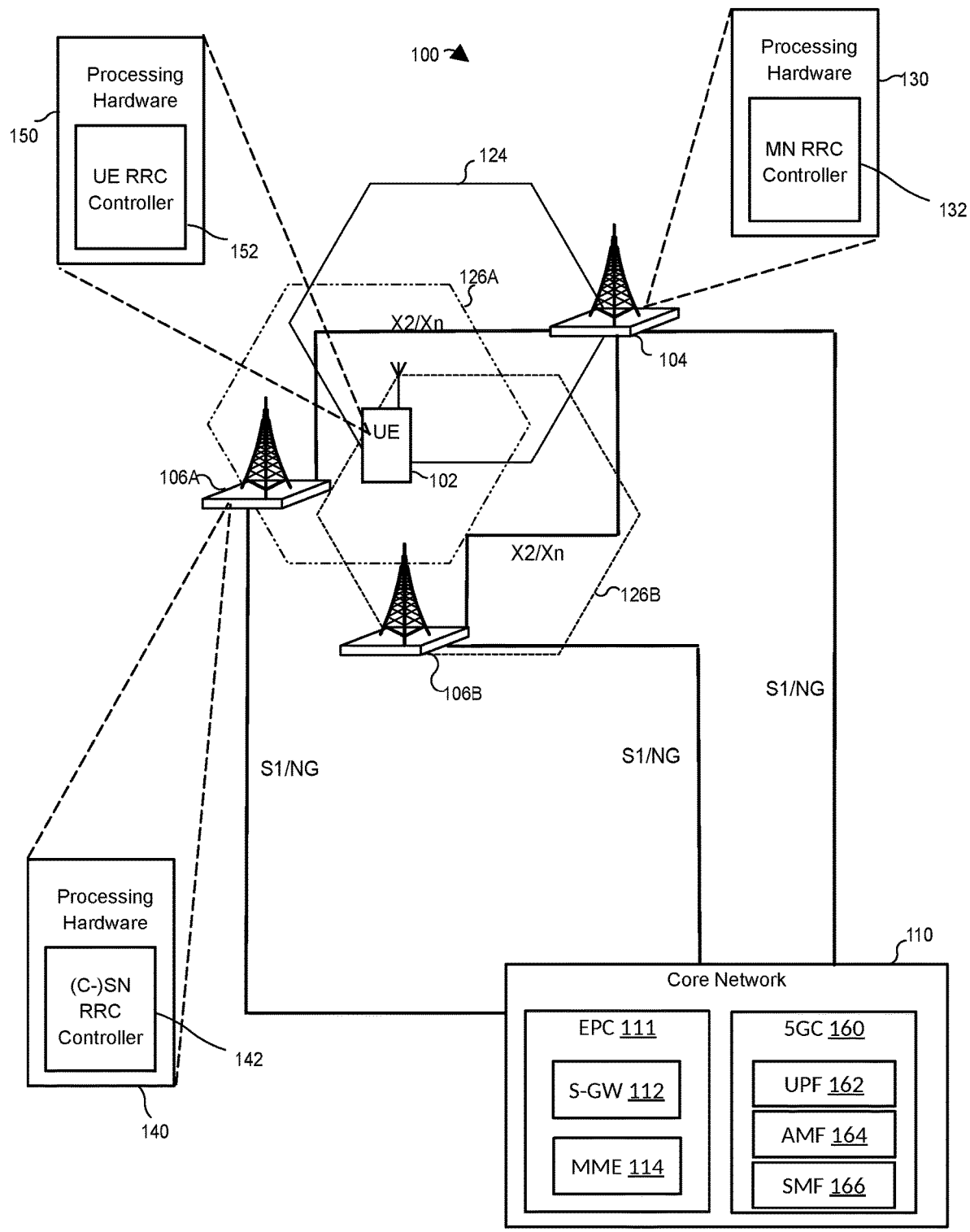
FIG. 1A is a block diagram of an example system in which a radio access network (RAN) and a user device can implement the techniques of this disclosure for managing conditional procedures related to a secondary node (SN)

FIG. 1A depicts an example wireless communication system 100 in which communication devices can implement these techniques. The wireless communication system 100 includes a UE 102, a base station 104, a base station 106A, a base station 106B and a core network (CN) 110. The UE 102 initially connects to the base station 104.

In some scenarios, the base station 104 can perform immediate SN addition to configure the UE 102 to operate in dual connectivity (DC) with the base station 104 (via a PCell) and the base station 106A (via a PSCell other than cell 126A). The base stations 104 and 106A operate as an MN and an SN for the UE 102, respectively. Later on, the MN 104 in one scenario can perform an immediate SN change to change the SN of the UE 102 from the base station 106A (source SN, or "S-SN") to the base station 106B (target SN, or "T-SN") while the UE 102 is in DC with the MN 104 and the S-SN 106A. In another scenario, the SN 106A can perform an immediate PSCell change to change the PSCell of the UE 102 to the cell 126A. In one implementation, the SN 106A can transmit a configuration changing the PSCell to cell 126A to the UE 102 via a signaling radio bearer (SRB) (e.g., SRB3) for the immediate PSCell change. In another implementation, the SN 106A can transmit a configuration changing the PSCell to the cell 126A to the UE 102 via the MN 104 for the immediate PSCell change. The MN 104 may transmit the configuration immediately changing the PSCell to the cell 126A to the UE 102 via SRB1.

In other scenarios, the base station 104 can perform a conditional SN Addition procedure to first configure the base station 106A as a candidate SN (C-SN) for the UE 102. At this time, the UE 102 can be in single connectivity (SC) with the base station 104 or in DC with the base station 104 and another base station 106B. If the UE 102 is in DC with the base station 104 and the base station 106B, the MN 104 may determine to perform the conditional SN Addition procedure in response to a request received from the base station 106B or in response to one or more measurement results received from the UE 102 or obtained by the MN 104 from measurements on signals received from the UE 102. In contrast to the immediate SN Addition case discussed above, the UE 102 does not immediately attempt to connect to the C-SN 106A. In this scenario, the base station 104 again operates as an MN, but the base station 106A initially operates as a C-SN rather than an SN.

More particularly, when the UE 102 receives a configuration for the C-SN 106A, the UE 102 does not connect to the C-SN 106A until the UE 102 has determined that a certain condition is satisfied (the UE 102 in some cases can consider multiple conditions, but for convenience only the discussion below refers to a single condition). When the UE 102 determines that the condition has been satisfied, the UE 102 connects to the C-SN 106A, so that the C-SN 106A begins to operate as the SN 106A for the UE 102. Thus, while the base station 106A operates as a C-SN rather than an SN, the base station 106A is not yet connected to the UE 102, and accordingly is not yet servicing the UE 102. In some implementations, the UE 102 may disconnect from the SN 106B to connect to the C-SN 106A.

In yet other scenarios, the UE 102 is in DC with the MN 104 (via a PCell) and SN 106A (via a PSCell other than cell 126A and not shown in FIG. 1A). The SN 106A can configure a C-PSCell 126A for the UE 102. If the UE 102 is configured a signaling radio bearer (SRB) (e.g., SRB3) to exchange RRC messages with the SN 106A, the SN 106A may transmit a configuration for the C-PSCell 126A to the UE 102 via the SRB, e.g., in response to one or more measurement results which may be received from the UE 102 via the SRB or via the MN 104 or may be obtained by the SN 106A from measurements on signals received from the UE 102. In case of via the MN 104, the MN 104 receives the configuration for the C-PSCell 126A. In contrast to the immediate PSCell change case discussed above, the UE 102 does not immediately disconnect from the PSCell and attempt to connect to the C-PSCell 126A.

More particularly, when the UE 102 receives a configuration for the C-PSCell 126A, the UE 102 does not connect to the C-PSCell 126A until the UE 102 has determined that a certain condition is satisfied (the UE 102 in some cases can consider multiple conditions, but for convenience only the discussion below refers to a single condition). When the UE 102 determines that the condition has been satisfied, the UE 102 connects to the C-PSCell 126A, so that the C-PSCell 126A begins to operate as the PSCell 126A for the UE 102. Thus, while the cell 126A operates as a C-PSCell rather than a PSCell, the SN 106A may not yet connect to the UE 102 via the cell 126A. In some implementations, the UE 102 may disconnect from the PSCell to connect to the C-PSCell 126A.

In some scenarios, the condition associated with conditional SN addition or conditional PSCell change can be signal strength/quality, which the UE 102 detects on a C-PSCell of the (C-)SN 106A, exceeding a certain threshold or otherwise corresponding to an acceptable measurement. For example, when the one or more measurement results the UE 102 obtains on the C-PSCell 126A are above a threshold configured by the MN 104 or the (C-)SN 106A or above a pre-determined or pre-configured threshold, the UE 102 determines that the condition is satisfied. When the UE 102 determines that the signal strength/quality on C-PSCell of the (C-)SN 106A is sufficiently good (again, measured relative to one or more quantitative thresholds or other quantitative metrics), the UE 102 can perform a random access procedure on the C-PSCell 126A with the (C-)SN 106A to connect to the (C-)SN 106A. Once the UE 102 successfully completes the random access procedure on the C-PSCell 126A, the C-PSCell 126A becomes a PSCell 126A for the UE 102. The (C-)SN 106A then can start communicating data (user-plane data or control-plane data) with the UE 102 through the PSCell 126A.

In various configurations of the wireless communication system 100, the base station 104 can be implemented as a master eNB (MeNB) or a master gNB (MgNB), and the base station 106A or 106B can be implemented as a secondary gNB (SgNB) or a candidate SgNB (C-SgNB). The UE 102 can communicate with the base station 104 and the base station 106A or 106B (106A/B) via the same RAT such as EUTRA or NR, or different RATs. When the base station 104 is an MeNB and the base station 106A is an SgNB, the UE 102 can be in EUTRA-NR DC (EN-DC) with the MeNB and the SgNB. In this scenario, the MeNB 104 may or may not configure the base station 106B as a C-SgNB to the UE 102. In this scenario, the SgNB 106A may configure cell 126A as a C-PSCell to the UE 102. When the base station 104 is an MeNB and the base station 106A is a C-SgNB for the UE 102, the UE 102 can be in SC with the MeNB. In this scenario, the MeNB 104 may or may not configure the base station 106B as another C-SgNB to the UE 102.

In some cases, an MeNB, an SeNB or a C-SgNB is implemented as an ng-eNB rather than an eNB. When the base station 104 is a Master ng-eNB (Mng-eNB) and the base station 106A is a SgNB, the UE 102 can be in next generation (NG) EUTRA-NR DC (NGEN-DC) with the Mng-eNB and the SgNB. In this scenario, the MeNB 104 may or may not configure the base station 106B as a C-SgNB to the UE 102. In this scenario, the SgNB 106A may configure cell 126A as a C-PSCell to the UE 102. When the base station 104 is an Mng-NB and the base station 106A is a C-SgNB for the UE 102, the UE 102 can be in SC with the Mng-NB. In this scenario, the Mng-eNB 104 may or may not configure the base station 106B as another C-SgNB to the UE 102.

When the base station 104 is an MgNB and the base station 106A/B is an SgNB, the UE 102 may be in NR-NR DC (NR-DC) with the MgNB and the SgNB. In this scenario, the MeNB 104 may or may not configure the base station 106B as a C-SgNB to the UE 102. In this scenario, the SgNB 106A may configure cell 126A as a C-PSCell to the UE 102. When the base station 104 is an MgNB and the base station 106A is a C-SgNB for the UE 102, the UE 102 may be in SC with the MgNB. In this scenario, the MgNB 104 may or may not configure the base station 106B as another C-SgNB to the UE 102.

When the base station 104 is an MgNB and the base station 106A/B is a Secondary ng-eNB (Sng-eNB), the UE 102 may be in NR-EUTRA DC (NE-DC) with the MgNB and the Sng-eNB. In this scenario, the MgNB 104 may or may not configure the base station 106B as a C-Sng-eNB to the UE 102. In this scenario, the Sng-eNB 106A may configure cell 126A as a C-PSCell to the UE 102. When the base station 104 is an MgNB and the base station 106A is a candidate Sng-eNB (C-Sng-eNB) for the UE 102, the UE 102 may be in SC with the MgNB. In this scenario, the MgNB 104 may or may not configure the base station 106B as another C-Sng-eNB to the UE 102.

The base stations 104, 106A, and 106B can connect to the same core network (CN) 110 which can be an evolved packet core (EPC) 111 or a fifth-generation core (5GC) 160. The base station 104 can be implemented as an eNB supporting an S1 interface for communicating with the EPC 111, an ng-eNB supporting an NG interface for communicating with the 5GC 160, or as a base station that supports the NR radio interface as well as an NG interface for communicating with the 5GC 160. The base station 106A can be implemented as an EN-DC gNB (en-gNB) with an S1 interface to the EPC 111, an en-gNB that does not connect to the EPC 111, a gNB that supports the NR radio interface as well as an NG interface to the 5GC 160, or a ng-eNB that supports an EUTRA radio interface as well as an NG interface to the 5GC 160. To directly exchange messages during the scenarios discussed below, the base stations 104, 106A, and 106B can support an X2 or Xn interface.

Among other components, the EPC 111 can include a Serving Gateway (S-GW) 112 and a Mobility Management Entity (MME) 114. The S-GW 112 in general is configured to transfer user-plane packets related to audio calls, video calls, Internet traffic, etc., and the MME 114 is configured to manage authentication, registration, paging, and other related functions. The 5GC 160 includes a User Plane Function (UPF) 162 and an Access and Mobility Management (AMF) 164, and/or Session Management Function (SMF) 166. Generally speaking, the UPF 162 is configured to transfer user-plane packets related to audio calls, video calls, Internet traffic, etc., the AMF 164 is configured to manage authentication, registration, paging, and other related functions, and the SMF 166 is configured to manage PDU sessions.

As illustrated in FIG. 1A, the base station 104 supports a cell 124, the base station 106A supports a cell 126A, and the base station 106B supports a cell 126B. The cells 124 and 126A can partially overlap, as can the cells 124 and 126B, so that the UE 102 can communicate in DC with the base station 104 (operating as an MN) and the base station 106A (operating as an SN) and, upon completing an SN change, with the base station 104 (operating as MN) and the SN 106B. More particularly, when the UE 102 is in DC with the base station 104 and the base station 106A, the base station 104 operates as an MeNB, a Mng-eNB or a MgNB, and the base station 106A operates as an SgNB or a Sng-eNB. when the UE 102 is in SC with the base station 104, the base station 104 operates as an MeNB, a Mng-eNB or a MgNB, and the base station 106A operates as a C-SgNB or a C-Sng-eNB.

In general, the wireless communication network 100 can include any suitable number of base stations supporting NR cells and/or EUTRA cells. More particularly, the EPC 111 or the 5GC 160 can be connected to any suitable number of base stations supporting NR cells and/or EUTRA cells. Although the examples below refer specifically to specific CN types (EPC, 5GC) and RAT types (5G NR and EUTRA), in general the techniques of this disclosure also can apply to other suitable radio access and/or core network technologies such as sixth generation (6G) radio access and/or 6G core network or 5G NR-6G DC.

With continued reference to FIG. 1A, the base station 104 is equipped with processing hardware 130 that can include one or more general-purpose processors such as CPUs and non-transitory computer-readable memory storing machine-readable instructions executable on the one or more general-purpose processors, and/or special-purpose processing units. The processing hardware 130 in an example implementation includes an MN RRC controller 132 configured to manage or control one or more RRC configurations or RRC procedures when the base station 104 operates as an MN.

The base station 106A is equipped with processing hardware 140 that can also include one or more general-purpose processors such as CPUs and non-transitory computer-readable memory storing machine-readable instructions executable on the one or more general-purpose processors, and/or special-purpose processing units. The processing hardware 140 in an example implementation includes an (C-)SN RRC controller 142 configured to manage or control one or more RRC configurations and/or RRC procedures when the base station 106A operates as an SN or a candidate SN (C-SN). The base station 106B can have hardware same as or similar to the base station 106A.

Although FIG. 1A illustrates the RRC controllers 132 and 142 as operating in an MN and a SN, respectively, a base station generally can operate as an MN, an SN or a candidate SN in different scenarios. Thus, the MN 104, the SN 106A, and the SN 106B can implement similar sets of functions and support both MN, SN and conditional SN operations.

Still referring to FIG. 1A, the UE 102 is equipped with processing hardware 150 that can include one or more general-purpose processors such as CPUs and non-transitory computer-readable memory storing machine-readable instructions executable on the one or more general-purpose processors, and/or special-purpose processing units. The processing hardware 150 in an example implementation includes a UE RRC controller 152 configured to manage or control one or more RRC configurations and/or RRC procedures.

In operation, the UE 102 can use a radio bearer (e.g., a DRB or an SRB) that at different times terminates at the MN 104 or the SN 106A. The UE 102 can apply one or more security keys when communicating on the radio bearer, in the uplink (from the UE 102 to a base station) and/or downlink (from a base station to the UE 102) direction.

Figure 1B:
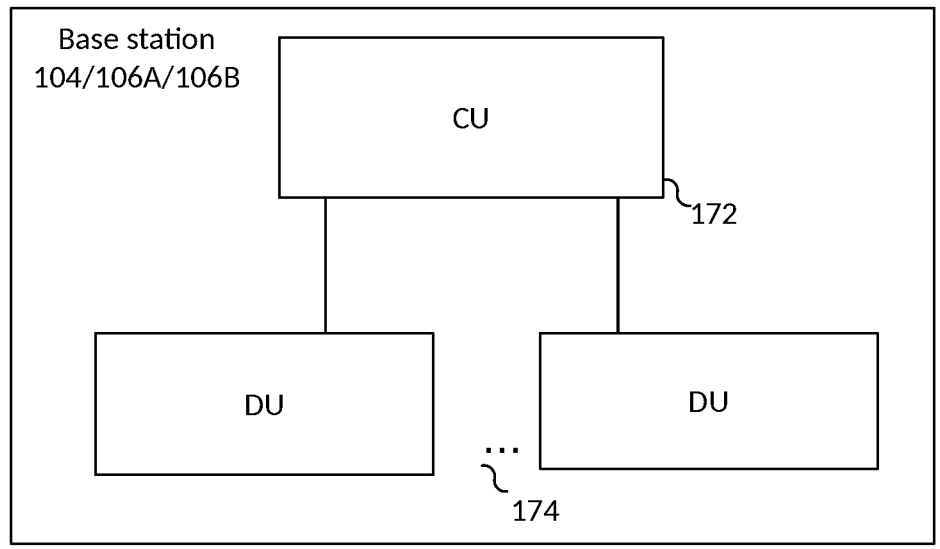
FIG. 1B is a block diagram of an example base station in which a centralized unit (CU) and a distributed unit (DU) that can operate in the system of FIG. 1A.

FIG. 1B depicts an example distributed implementation of a base station such as the base station 104, 106A, or 106B. The base station in this implementation can include a centralized unit (CU) 172 and one or more distributed units (DUs) 174. The CU 172 is equipped with processing hardware that can include one or more general-purpose processors such as CPUs and non-transitory computer-readable memory storing machine-readable instructions executable on the one or more general-purpose processors, and/or special-purpose processing units. In one example, the CU 172 is equipped with the processing hardware 130. In another example, the CU 172 is equipped with the processing hardware 140. The processing hardware 140 in an example implementation includes an (C-)SN RRC controller 142 configured to manage or control one or more RRC configurations and/or RRC procedures when the base station 106A operates as an SN or a candidate SN (C-SN). The base station 106B can have hardware same as or similar to the base station 106A. The DU 174 is also equipped with processing hardware that can include one or more general-purpose processors such as CPUs and non-transitory computer-readable memory storing machine-readable instructions executable on the one or more general-purpose processors, and/or special-purpose processing units. In some examples, the processing hardware in an example implementation includes a medium access control (MAC) controller configured to manage or control one or more MAC operations or procedures (e.g., a random access procedure) and a radio link control (RLC) controller configured to manage or control one or more RLC operations or procedures when the base station 106A operates as a MN, an SN or a candidate SN (C-SN). The process hardware may include further a physical layer controller configured to manage or control one or more physical layer operations or procedures.

Figure 2:
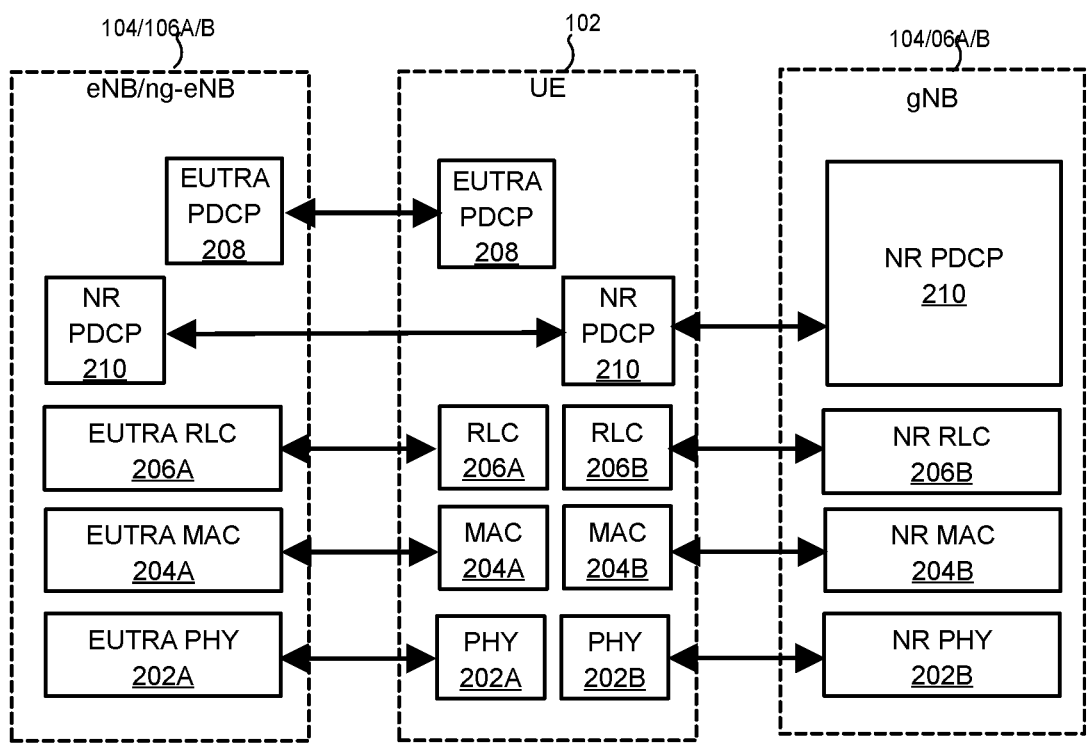
FIG. 2 is a block diagram of an example protocol stack according to which the UE of FIG. 1A communicates with base stations.

Next, FIG. 2 illustrates in a simplified manner a radio protocol stack according to which the UE 102 can communicate with an eNB/ng-eNB or a gNB. Each of the base stations 104, 106A, or 106B can be the eNB/ng-eNB or the gNB.

The physical layer (PHY) 202A of EUTRA provides transport channels to the EUTRA Medium Access Control (MAC) sublayer 204A, which in turn provides logical channels to the EUTRA Radio Link Control (RLC) sublayer 206A, and the EUTRA RLC sublayer in turn provides RLC channels to the EUTRA PDCP sublayer 208 and, in some cases, NR PDCP sublayer 210. Similarly, the PHY 202B of NR provides transport channels to the NR MAC sublayer 204B, which in turn provides logical channels to the NR RLC sublayer 206B, and the NR RLC sublayer 206B in turn provides RLC channels to the NR PDCP sublayer 210. The UE 102 in some implementations supports both the EUTRA and the NR stack, to support handover between EUTRA and NR base stations and/or DC over EUTRA and NR interfaces. Further, as illustrated in FIG. 2A, the UE 102 can support layering of NR PDCP 210 over EUTRA RLC 206A.

The EUTRA PDCP sublayer 208 and the NR PDCP sublayer 210 receive packets (e.g., from the Internet Protocol (IP) layer, layered directly or indirectly over the PDCP layer 208 or 210) that can be referred to as service data units (SDUs), and output packets (e.g., to the RLC layer 206A or 206B) that can be referred to as protocol data units (PDUs). Except where the difference between SDUs and PDUs is relevant, this disclosure for simplicity refers to both SDUs and PDUs as "packets."

On a control plane, the EUTRA PDCP sublayer 208 and the NR PDCP sublayer 210 provide SRBs to exchange Radio Resource Control (RRC) messages, for example. On a user plane, the EUTRA PDCP sublayer 208 and the NR PDCP sublayer 210 provide DRBs to support data exchange.

When the UE 102 operates in EUTRA/NR DC (EN-DC), with the BS 104 operating as a MeNB and the BS 106A operating as a SgNB, the network can provide the UE 102 with an MN-terminated bearer that uses EUTRA PDCP 208 or MN-terminated bearer that uses NR PDCP 210. The network in various scenarios also can provide the UE 102 with an SN-terminated bearer, which use only NR PDCP 210. The MN-terminated bearer can be an MCG bearer or a split bearer. The SN-terminated bearer can be a SCG bearer or a split bearer. The MN-terminated bearer can be an SRB (e.g., SRB1 or SRB2) or a DRB. The SN-terminated bearer can an SRB (e.g., SRB) or a DRB.

Next, several example scenarios in which a base station initiates a conditional PSCell change procedure are discussed with reference to FIGS. 3A-8B.

Figure 3A:
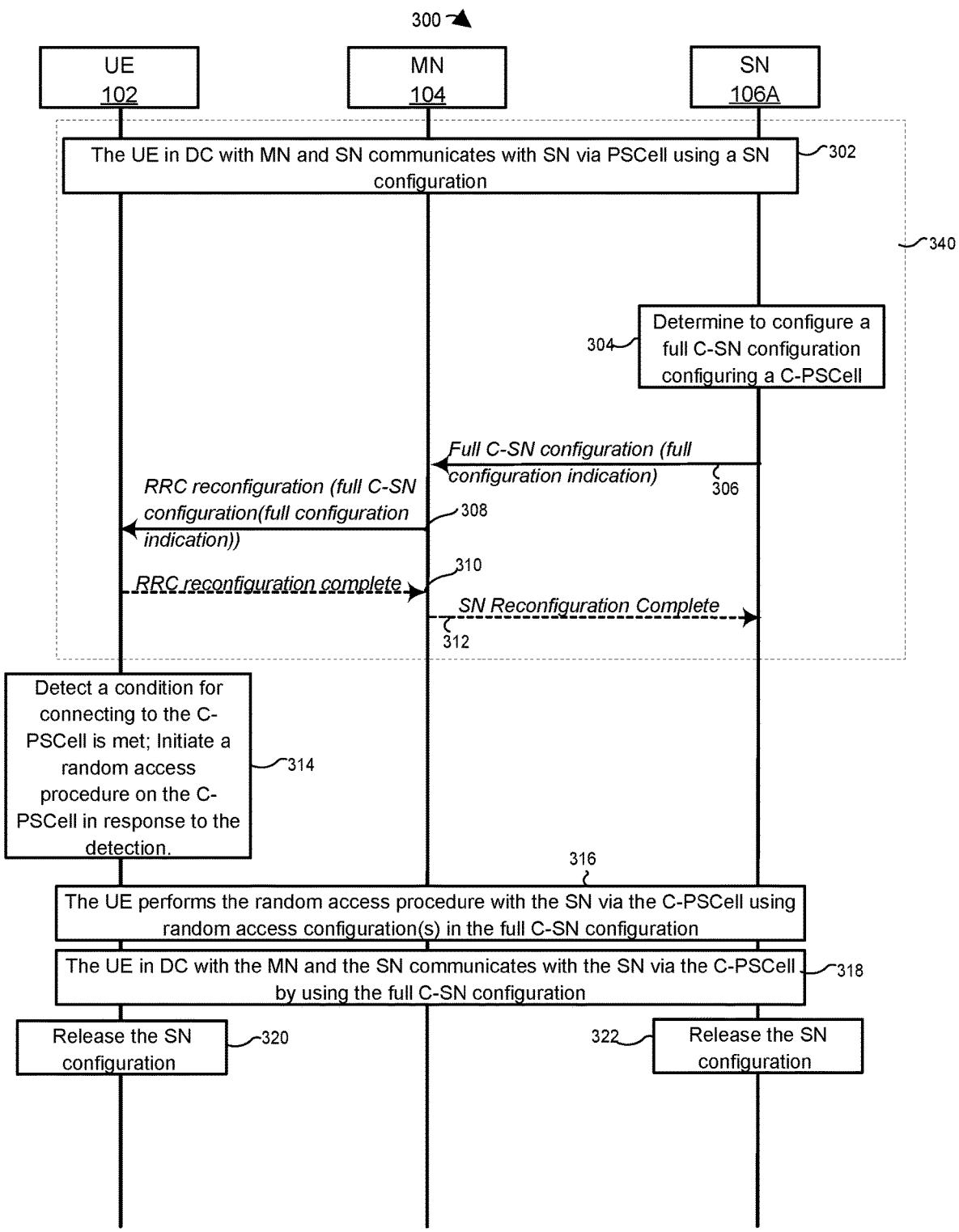
FIG. 3A is a messaging diagram of an example scenario in which the SN of FIG. 1A or 1B initiates a conditional PSCell change procedure using a full configuration including a full configuration indication, via the MN of FIG. 1A or 1B, in accordance with the techniques of this disclosure.

Referring first to FIG. 3A, the base station 104 in a scenario 300 operates as an MN, and the base station 106A operates as a SN. Initially, the UE 102 in DC with the MN 104 and SN 106A communicates 302 UL Data PDUs and/or DL Data PDUs with MN 104 via a PCell and communicates 302 UL Data PDUs and/or DL Data PDUs with SN 106A via a PSCell (i.e., a cell other than cell 126A). The SN 106A determines 304 to configure a full C-SN configuration configuring a C-PSCell 126A. The SN 106A can make this determination based on one or more measurement results received from the UE 102 via the MN 104, from the UE directly (e.g., via a signaling radio bearer (SRB) established between the UE 102 and the SN 106A or via a physical control channel), or obtained by the SN 106A from measurements on signals, control channels or data channels received from the UE 102, for example, or another suitable event. In response to this determination, the SN 106A sends 306 the full C-SN configuration including a full configuration indication to the MN 104 and in turn, the MN 104 transmits an RRC reconfiguration message including the full C-SN configuration to the UE 102. In some implementations, the UE 102 may transmit 310 an RRC reconfiguration complete message to the MN 104 in response to the RRC reconfiguration message. The MN 104 may send 312 a SN Reconfiguration Complete message to the SN 106A in response to the RRC reconfiguration complete message.

The UE 102 detects 314 a condition (or conditions) for connecting to the C-PSCell 126A is met and initiates a random access procedure on the C-PSCell 126A in response to the detection. For convenience, the discussion below refers to the condition or a configuration in singular, but it will be understood that it can be one or multiple conditions or include one or multiple configuration parameters. In response to the initiation, the UE 102 performs 316 the random access procedure with the SN 106A via the C-PSCell 126A using a random access configuration in the full C-SN configuration. The UE 102 may disconnect from the PSCell in response to the initiation or the detection. In some implementations, the random access procedure can be a 4-step random access procedure or a 2-step random access procedure. In other implementations, the random access procedure can be a contention-based random access procedure or a contention-free random access procedure. After the UE 102 successfully completes the random access procedure 316, the UE 102 in DC with the MN 104 and the SN 106A communicates 318 with the SN 106A via the C-PSCell 126A (i.e., new PSCell 126A) by using the full C-SN configuration. The UE 102 releases 320 the SN configuration in response to the full configuration indication. The SN 106A may release 322 the SN configuration if the SN 106A identifies the UE 102 in the random access procedure 316. In some implementations, the SN 106A identifies the UE 102 if the SN 106A finds an identity of the UE 102 in a medium access control (MAC) protocol data unit (PDU) received from the UE 102 in the random access procedure 316. The SN 106A includes the identity of the UE 102 in the full C-SN configuration. In other implementations, the SN 106A identifies the UE 102 if the SN 106A receives a dedicated random access preamble from the UE 102 in the random access procedure 316. The SN 106A includes the dedicated random access preamble in the full C-SN configuration.

The "full" C-SN configuration is a complete and self-contained configuration (i.e. full configuration). The full configuration indication (an information element (IE)) indicates the "full" C-SN configuration is a complete and self-contained configuration (i.e. full configuration). The UE 102 can directly use the full C-SN configuration to communicate with the SN 106A without referring to the SN configuration according to the full configuration indication. The full C-SN configuration can include multiple configuration parameters for the UE 102 to communicate with the SN 106A via the C-PSCell 126A. The multiple configuration parameters may configure radio resources for the UE 102 to communicate with the SN 106A via the C-PSCell 126A and zero, one, or more candidate secondary cells (C-SCells) of the SN 106A. The multiple configuration parameters may configure zero, one, or more radio bearers. The one or more radio bearers can include an SRB and/or data radio bearer(s) (DRB(s)).

The SN configuration can include multiple configuration parameters for the UE 102 to communicate with the SN 106A via the PSCell and zero, one, or more secondary cells (SCells) of the SN 106A. The multiple configuration parameters may configure radio resources for the UE 102 to communicate with the SN 106A via the PSCell and zero, one, or more SCells of the SN 106A. The multiple configuration parameters may configure zero, one, or more radio bearers. The one or more radio bearers can include an SRB and/or DRB(s).

In some implementations, the SN 106A can include the full C-SN configuration in the SN Addition Modification Acknowledge message responding to a SN Modification Request message received from the MN 104 and send the SN Modification Request Acknowledge message to the MN 104 at event 306. In other implementations, the SN 106A can include the full C-SN configuration in a SN Modification Required message and send the SN Modification Required message to the MN 104 at event 306. In some implementations, the SN 106A may indicate the SN Modification Request Acknowledge message or the SN Modification Required message is for conditional PSCell change.

In some implementations, the SN 106A includes a condition configuration configuring the condition that the UE 102 detects at event 314 in the full C-SN configuration. In other implementations, the MN 104 can include the full C-SN configuration and a condition configuration configuring the condition in the RRC reconfiguration message 308. The MN 104 may generate the condition configuration or receive the condition configuration from the SN 106A, e.g., at event 306.

In some implementations, the full configuration indication can be a new field/IE newly defined in 3GPP TS 36.331 or 38.331. The new field/IE indicates the UE 102 to release the SN configuration and use the full C-SN configuration directly if the UE 102 detects that the condition for connecting to the C-PSCell 126A is satisfied. In other implementations, the full configuration indication can be an existing field/IE defined in 3GPP TS 36.331 or 38.331.

In some implementations, the full C-SN configuration can include a group configuration (CellGroupConfig) IE that configures the C-PSCell 126A and may configure zero, one, or more C-SCells of the SN 106A. In one implementation, the full C-SN configuration can be a RRCReconfiguration message, RRCReconfiguration-IEs or the CellGroupConfig) IE conforming to 3GPP TS 38.331. The full configuration indication may be a field or an IE conforming to 3GPP TS 38.331. In other implementations, the full C-SN configuration can include a SCG-ConfigPartSCG-r12 IE that configures the C-PSCell 126A and may configure zero, one, or more C-SCells of the SN 106A. In one implementation, the full C-SN configuration can be a RRCConnectionReconfiguration message, RRCConnectionReconfiguration-IEs or the ConfigPartSCG-r12 IE conforming to 3GPP TS 36.331. The full configuration indication may be a field or an IE conforming to 3GPP TS 36.331.

In some implementations, the SN configuration can include a CellGroupConfig IE that configures the PSCell and may configure zero, one, or more SCells of the SN 106A. In one implementation, the SN configuration can be a RRCReconfiguration message, RRCReconfiguration-IEs or the CellGroupConfig IE conforming to 3GPP TS 38.331. In other implementations, the SN configuration can include a SCG-ConfigPartSCG-r12 IE that configures the PSCell and may configure zero, one, or more SCells of the SN 106A. In one implementation, the SN configuration can be a RRC- ConnectionReconfiguration message, RRCConnectionReconfiguration-IEs or the ConfigPartSCG-r12 IE conforming to 3GPP TS 36.331.

In some cases, the UE 102 may receive one or more conditions (discussed below in singular for convenience) in the RRC reconfiguration message or the full C-SN configuration at event 308. The UE 102 may use the one or more conditions to determine whether to connect to the C-PSCell 126A. If the UE 102 determines that the condition is satisfied, the UE 102 connects to the C-PSCell 126A. If the UE 102 does not determine that the condition is satisfied, the UE 102 does not connect to the C-PSCell 126A.

In some implementations, the SN 106A may consist of CU 172 and one or more DU 174 as shown in FIG. 2. The DU 174 may generate the full C-SN configuration or part of the full C-SN configuration and send the full C-SN configuration or part of the full C-SN configuration to the CU 172. In case the DU 174 generates part of the full C-SN configuration, the CU 172 may generate rest of the full C-SN configuration. In one implementation, the DU 174 can perform the random access procedure 316 with the UE 102 and identify the UE 102 in the random access procedure. In another implementation, the DU 174 can perform the random access procedure 316 with the UE 102 and forward the identity of the UE 102 received in the MAC PDU in the random access procedure to the CU 172. The CU 172 identifies the UE 102 according to the identity of the UE 102. In response to the identification, the CU 172 and DU 174 communicates with the UE 102 using the full C-SN configuration.

If the SN 106A identifies the UE 102 on the C-PSCell 126A at event 316, the SN 106A begins to transmit downlink control information (DCI) command(s) on physical downlink control channel(s) (PDCCH(s)), reference signal(s) or data to the UE 102 via the C-PSCell 126A and/or one or more C-SCells (if configured in the full C-SN configuration) according to some configuration parameters in the full C-SN configuration. If the SN 106A identifies the UE 102 on the C-PSCell 126A at event 316, the SN 106A may receive signal(s) on physical uplink control channel(s) (PUCCH(s)), sounding reference signal(s) or data from the UE 102 via the C-PSCell 126A and/or one or more C-SCells (if configured in the full C-SN configuration) according to some configuration parameters in the full C-SN configuration. The UE 102 receives the DCI command(s) on PDCCH(s), reference signal(s) or data from the SN 106A via the C-PSCell 126A and/or one or more C-SCells (if configured in the full C-SN configuration) according to some configuration parameters in the full C-SN configuration. The UE 102 may transmit signal(s) on PUCCH(s), sounding reference signal(s) or data to the SN 106A via the C-PSCell 126A and one or more C-SCells (if configured in the full C-SN configuration) according to some configuration parameters in the full C-SN configuration.

As described above, the SN 106A configures the C-PSCell 126A to the UE 102 at events 306 and 308 in advance, before the C-PSCell 126A becomes suitable for the UE 102. When the C-PSCell 126A becomes suitable for the UE 102 (i.e., the UE 102 detects the corresponding condition), the UE 102 performs the random access procedure with the C-PSCell 126A to quickly change PSCell. In contrast to the immediate PSCell change procedure, the conditional PSCell change technique discussed in this disclosure significantly reduces latency associated with DC configuration.

If the MN 104 is a gNB, the RRC reconfiguration message and the RRC reconfiguration complete message are a RRCReconfiguration message and a RRCConnectionReconfigurationComplete message respectively. If the MN 104 is an eNB or a ng-eNB, the RRC reconfiguration message and the RRC reconfiguration complete message are a RRCReconfiguration message and a RRCConnectionReconfigurationComplete message respectively.

Figure 3B:
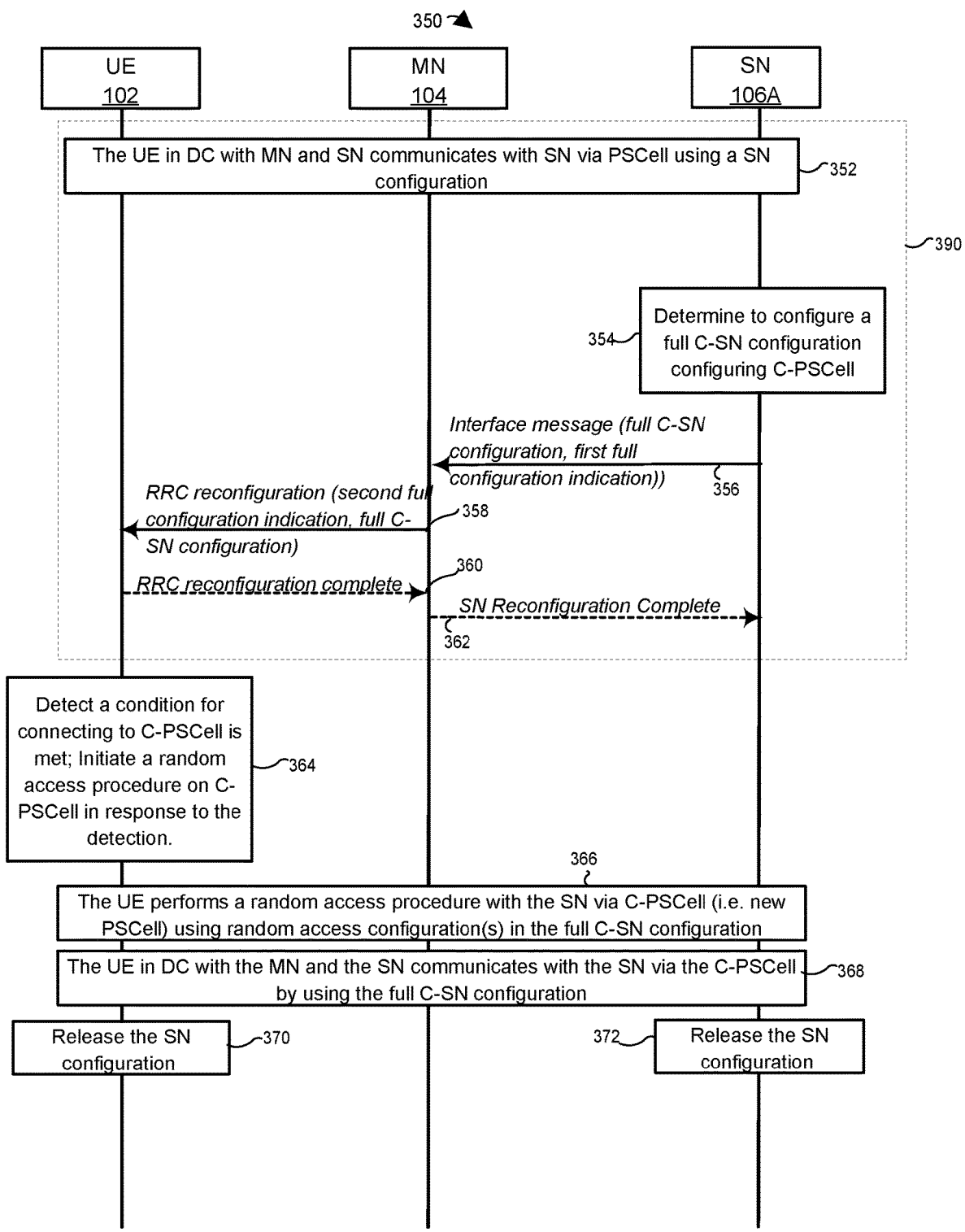
FIG. 3B is a messaging diagram of an example scenario in which the SN of FIG. 1A or 1B initiates a conditional PSCell change procedure using a full configuration and a full configuration indication, via the MN of FIG. 1A or 1B, in accordance with the techniques of this disclosure.

Next, FIG. 3B illustrates a scenario that involves a conditional C-PSCell Change without SN change, i.e., a conditional change of a PSCell of an SN when the UE is already in DC with the MN and SN. In this scenario, the BS 104 operates as a MN and the BS 106A operates as a SN. Events 352, 354, 356, 358, 360, 362, 364, 366, 368, 370 and 372 in this scenario are similar to events 302, 304, 306, 308, 310, 312, 314, 316, 318, 320 and 322 discussed with reference to FIG. 3A. The differences between the scenarios of FIG. 3A and FIG. 3B are discussed below.

In the scenario 350 of FIG. 3B, the SN 106A includes the full C-SN configuration and a first full configuration indication in an interface message (e.g., the SN Modification Request Acknowledge message or the SN Modification Required message described above) instead of including the full configuration indication in the full C-SN configuration. That is, the SN 106A does not include a full configuration indication in the full C-SN configuration. The SN 106A sends 356 the interface message to the MN 104. Then the MN 104 includes a second full configuration indication in the RRC reconfiguration message in response to the first full configuration indication and includes the full C-SN configuration in the RRC reconfiguration message. Then the MN 104 sends 358 the RRC reconfiguration message to the UE 102.

In some implementations, the first full configuration indication may be an IE included in the interface message. For example, the IE may conform to 3GPP TS 36.423 or 38.423. The second full configuration indication may be an IE conforming to 3GPP TS 36.331 or 38.331. In some implementations, the second full configuration indication can be a new field/IE newly defined in 3GPP TS 36.331 or 38.331. The new field/IE indicates the UE 102 to release the SN configuration and use the full C-SN configuration directly if the UE 102 detects that the condition for connecting to the C-PSCell 126A is satisfied.

Figure 4:
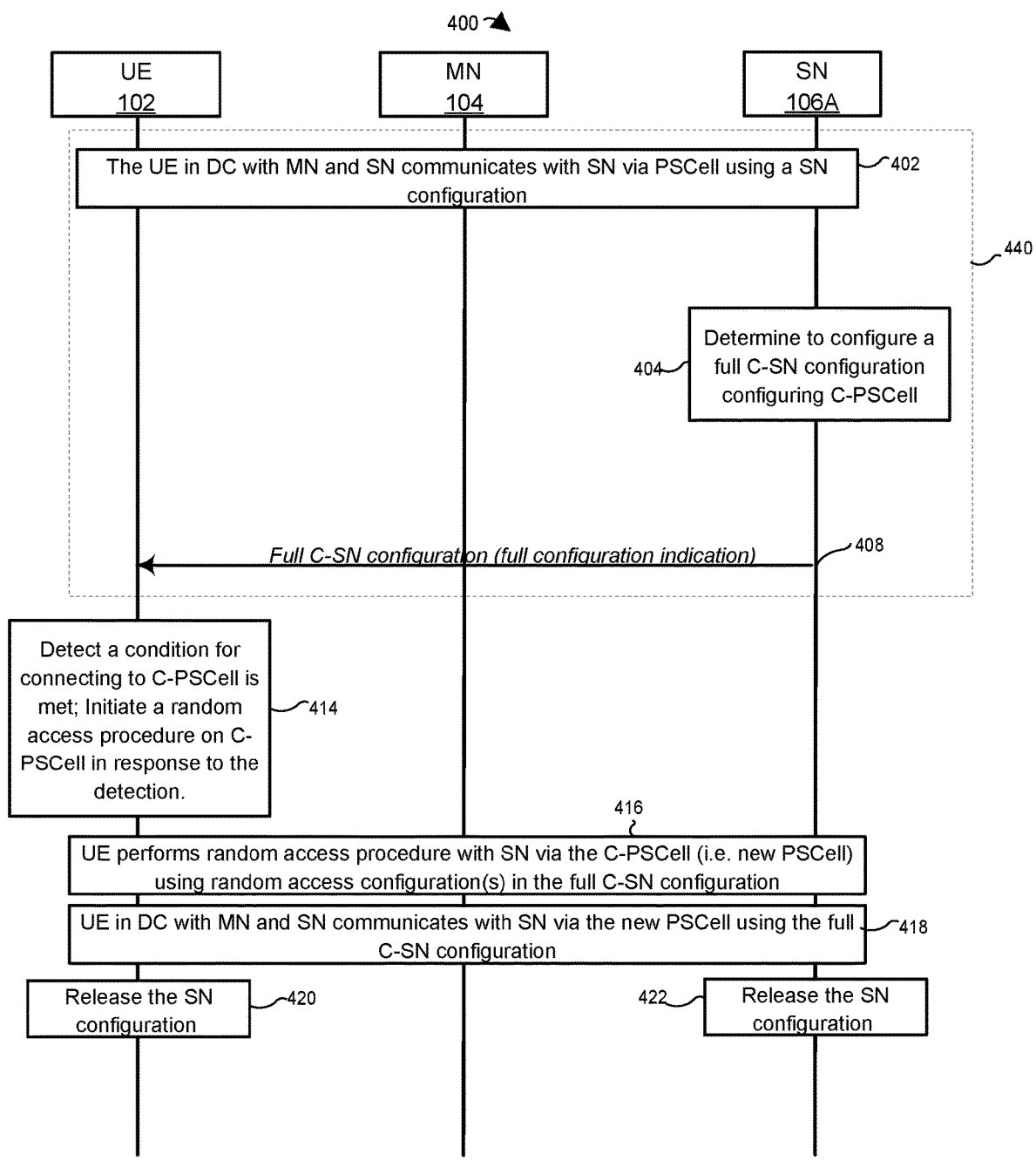
FIG. 4 is a messaging diagram of an example scenario in which the SN of FIG. 1A or 1B initiates a conditional PSCell change procedure using a full configuration including a full configuration indication, in accordance with the techniques of this disclosure.

Turning to FIG. 4 which illustrates a scenario that involves a conditional C-PSCell Change without SN change, i.e., a conditional change of a PSCell of an SN when the UE is already in DC with the MN and SN. In this scenario, the BS 104 operates as a MN and the BS 106A operates as a SN. Events 402, 404, 414, 416, 418, 420 and 422 in this scenario are similar to events 302, 304, 310, 312, 314, 316, 318, 320 and 322 discussed with reference to FIG. 3A. The differences between the scenarios of FIG. 3A and FIG. 4 are discussed below.

In the scenario 400 of FIG. 4, the SN 106A directly transmits 408 the full C-SN configuration including the full configuration indication to the UE 102 instead of sending it to the UE via the MN 104. In some implementations, the SN 106A configures a first SRB to the UE 102 via the MN 104 and transmits the full C-SN configuration via the first SRB to the UE 102. In response to receiving the full configuration indication, if the UE 102 detects that the condition for connecting to the C-PSCell 126A is satisfied, the UE 102 may replace the SN configuration with the full C-SN configuration. For example, the SN 106A send an SRB configuration configuring the first SRB (e.g., SRB3) to the MN 104 and the MN 104 transmits the SRB configuration to the UE via a second SRB (e.g., SRB1) between the MN 104 and the UE 102. The UE 102 may replace the SRB configuration in the SN configuration with an SRB configuration in the full C-SN configuration if the full C-SN configuration includes the SRB configuration and the UE 102 connects to the C-PSCell 126A. In another example, the UE 102 may replace a DRB configuration in the SN configuration with a DRB configuration in the full C-SN configuration if the full C-SN configuration includes the DRB configuration and the UE 102 connects to the C-PSCell 126A. In some implementations, the UE 102 may transmit an RRC reconfiguration complete message via the first SRB to the SN 106A in response to the full C-SN configuration.

Figure 5A:
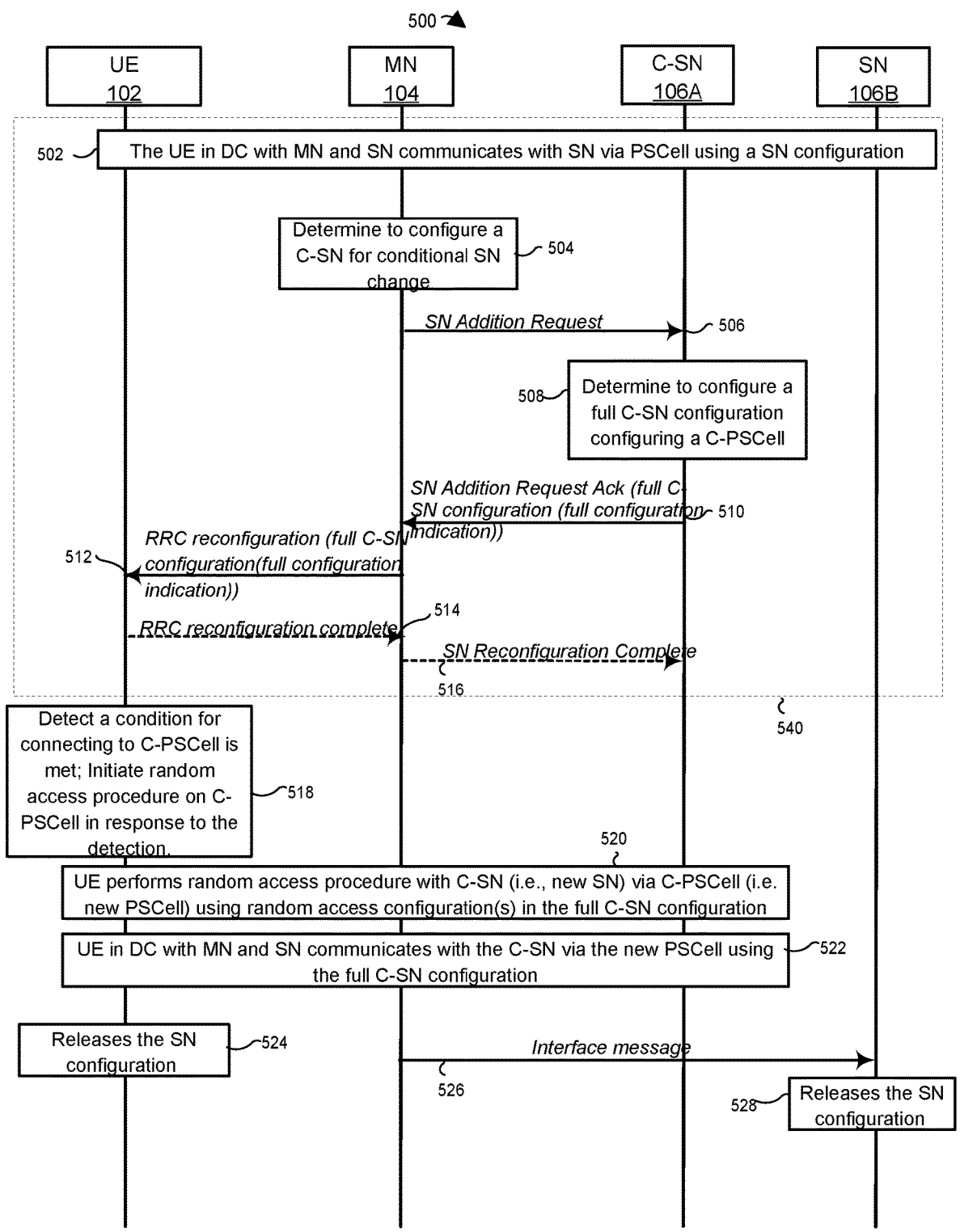
FIG. 5A is a messaging diagram of an example scenario in which the MN of FIG. 1A or 1B initiates a conditional SN change procedure using a full configuration including a full configuration indication, in accordance with the techniques of this disclosure.

Next, FIG. 5A illustrates another scenario 500 that involves a conditional SN Change. In this scenario, the BS 104 operates as a MN, the BS 106A operates as a C-SN and the BS 106B in operates as a SN. Some events in the scenario 500 is similar to events in the scenario 300. The differences between the scenarios of FIG. 3A and FIG. 5A are discussed below.

In the beginning, the UE 102 in DC with the MN 104 and SN 106A communicates 302 UL Data PDUs and/or DL Data PDUs with MN 104 via a PCell and communicates 302 UL Data PDUs and/or DL Data PDUs with SN 106A via a PSCell (i.e., a cell other than cell 126A). The MN 104 determines 504 to configure the base station 106A as a C-SN for conditional SN change from the SN 106B to the C-SN 106A for the UE 102. The MN 104 may determine to do so based on measurement result(s) from the UE 102 or in response to a conditional SN change required message (e.g., SN Change Required message) from the SN 106B to the C-SN 106A for the UE 102. In response to the determination, the MN 104 sends 506 a SN Addition Request message to the C-SN 106A for the purposes of the conditional SN Change procedure. In response to the SN Addition Request message, the C-SN 106A determines 508 to configure a full C-SN configuration for the conditional SN change from the SN 106B to the C-SN 106A. The C-SN 106A includes a full configuration indication in the full C-SN configuration and includes the full C-SN configuration in an SN Addition Request Acknowledge message. The SN 106A sends 510 the SN Addition Request Acknowledge message to the MN 104 in response to the SN Addition Request message. The full C-SN configuration configure a C-PSCell and may configure zero, one, or more C-SCells. Then the MN 104 transmits 512 an RRC reconfiguration message including the full C-SN configuration to the UE 102. In some implementations, the UE 102 may transmit 514 an RRC reconfiguration complete message to the MN 104 in response to the RRC reconfiguration message. The MN 104 may send 516 a SN Reconfiguration Complete message to the C-SN 106A in response to the RRC reconfiguration complete message.

In some implementations, the MN 104 may indicate to the base station 106A in the SN Addition Request message that the base station 106A is requested to be a C-SN for the UE 102.

The UE 102 detects 518 a condition (or conditions) for connecting to the C-PSCell 126A is met and initiates a random access procedure on the C-PSCell 126A in response to the detection. For convenience, the discussion below refers to the condition or a configuration in singular, but it will be understood that it can be one or multiple conditions or include one or multiple configuration parameters. In response to the initiation, the UE 102 performs 520 the random access procedure with the C-SN 106A via the C-PSCell 126A using a random access configuration in the full C-SN configuration. The UE 102 may disconnect from the SN 106B (i.e., the PSCell and all of SCell(s) of the SN 106B if configured) in response to the initiation or the detection. In some implementations, the random access procedure can be a 4-step random access procedure or a 2-step random access procedure. In other implementations, the random access procedure can be a contention-based random access procedure or a contention-free random access procedure. After the UE 102 successfully completes the random access procedure 520, the UE 102 in DC with the MN 104 and the SN 106A communicates 522 with the SN 106A via the C-PSCell 126A (i.e., new PSCell 126A) by using the full C-SN configuration. The UE 102 releases 524 the SN configuration in response to the full configuration indication. The MN 104 may send 526 an interface message to the SN 106B after receiving the SN Addition Request Acknowledge message. The SN 106B may release 524 the SN configuration in response to the interface message 526. In some implementations, the interface message can be a SN Release Request message, a SN Status Transfer message or a UE Context Release message.

In some implementations, the UE 102 may transmit to the MN 104 an RRC message indicating that the UE 102 connected to the C-SN 106A, and the MN 104 sends 526 the interface message to the SN 106B in response to the RRC message. In other implementations, the C-SN 106A may send to the MN 104 an interface message indicating the UE 102 has connected to the C-SN 106A, and the MN 104 sends 526 the interface message to the SN 106B in response to the interface message.

In some implementations, the SN 106A identifies the UE 102 if the SN 106A finds an identity of the UE 102 in a MAC PDU received from the UE 102 in the random access procedure 520. The SN 106A includes the identity of the UE 102 in the full C-SN configuration. In other implementations, the SN 106A identifies the UE 102 if the SN 106A receives a dedicated random access preamble from the UE 102 in the random access procedure. The SN 106A includes the dedicated random access preamble in the full C-SN configuration.

In some implementations, the C-SN 106A may be pre-configured to generate a complete configuration for a C-SN configuration and include a full configuration indication in the C-SN configuration. In other implementations, the C-SN 106A may determine to generate a complete configuration for a C-SN configuration and include a full configuration indication in the C-SN configuration if the C-SN 106A identifies the SN 106B operates in a different vendor. In yet other implementations, the C-SN 106A may determine to generate a complete configuration for a C-SN configuration and include a full configuration indication in the C-SN configuration if the C-SN 106A is not able to generate a delta configuration for a C-SN configuration according to the SN configuration received in the SN Addition Request message. The C-SN 106A may determine to generate a delta C-SN configuration in a SN Addition Request Acknowledge message in a conditional SN Change procedure if the C-SN 106A identifies the SN 106B operates in the same vendor or is able to do so.

Figure 5B:
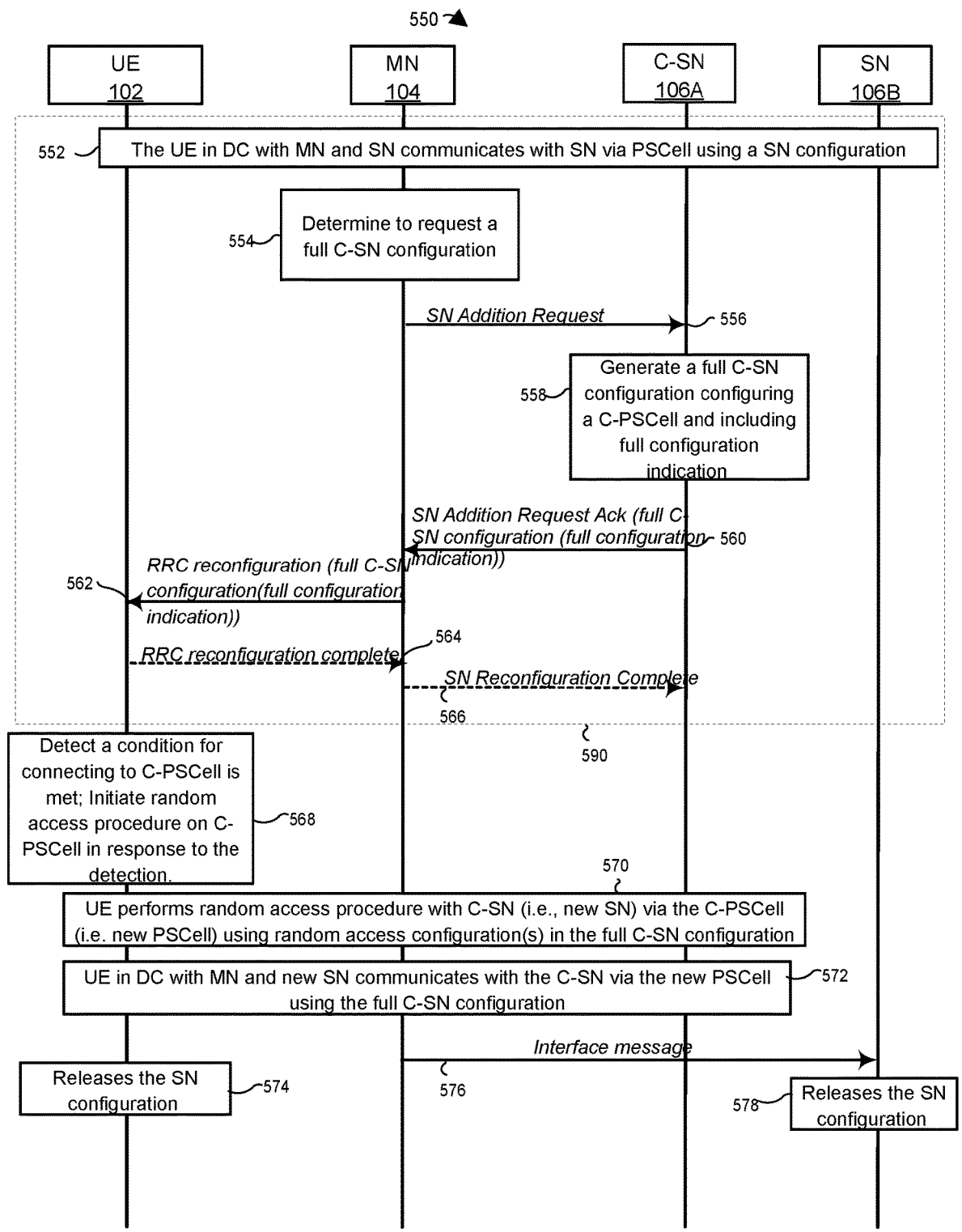
FIG. 5B is a messaging diagram of an example scenario in which the MN of FIG. 1A or 1B initiates a conditional SN change procedure using a full configuration including a full configuration indication, via a request to a C-SN, in accordance with the techniques of this disclosure.

Next, FIG. 5B illustrates yet another scenario 550 that involves a conditional SN Change similar to FIG. 5A. In this scenario, the BS 104 operates as a MN, the BS 106A operates as a C-SN and the BS 106B operates as a SN. Events 552, 554, 556, 558 560, 562, 564, 5666, 568, 570, 572, 574, 576 and 578 are similar to events 502, 504, 506, 508, 510, 512, 514, 516, 518, 520, 522, 524, 526 and 528 discussed with reference to FIG. 5A. The differences between the FIG. 5A and FIG. 5B are discussed below.

In the scenario 550, the MN 104 determines 554 to request a full C-SN configuration and sends 556 a SN Addition Request message to request a full C-SN configuration in response to the determination. In response to the SN Addition Request message, the C-SN 106A generates 558 a full C-SN configuration which configures the C-PSCell 126A and includes the full configuration indication. Then the C-SN 106A sends 560 the SN Addition Request Acknowledge message including the full C-SN configuration to the MN 104.

In some implementations, the MN 104 may be preconfigured to request a full C-SN configuration in the SN Addition Request message in the conditional SN Change procedure. In other implementations, the MN 104 may determine to request a full C-SN configuration in the SN Addition Request message in the conditional SN Change procedure if the MN 104 identifies the SN 106B operates in a different vendor from the C-SN 106A. The MN 104 may determine to request a delta C-SN configuration in a SN Addition Request message in a conditional SN Change procedure with a a C-SN other than the C-SN 106A if the MN 104 identifies that the SN 106B is operated by the same vendor as the C-SN.

Figure 6A:
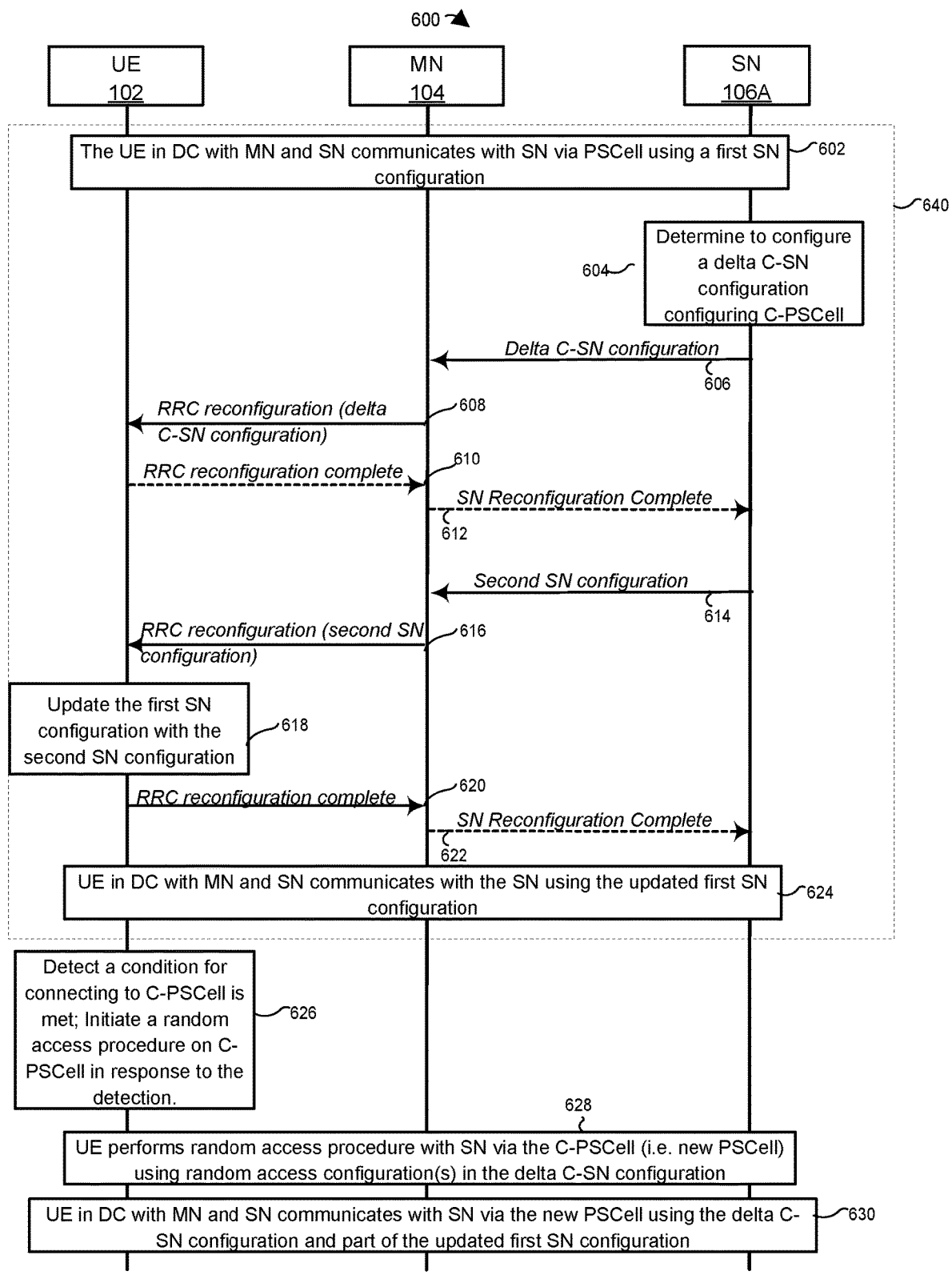
FIG. 6A is a messaging diagram of an example scenario in which the SN of FIG. 1A or 1B initiates a conditional PSCell change procedure using a delta configuration, via the MN of FIG. 1A or 1B, in accordance with the techniques of this disclosure.

Next, FIG. 6A illustrates another scenario 600 that involves a conditional PSCell change. In this scenario, the BS 104 operates as a MN and the BS 106A operates as a SN. Initially, the UE 102 in DC with the MN 104 and SN 106A communicates 602 UL Data PDUs and/or DL Data PDUs with MN 104 via a PCell and communicates 602 UL Data PDUs and/or DL Data PDUs with SN 106A via a PSCell (i.e., a cell other than cell 126A) using a first SN configuration. The SN 106A determines 604 to configure a delta C-SN configuration configuring C-PSCell 126A. The SN 106A can determine to configure the C-PSCell 126A based on one or more measurement results received from the UE 102 via the MN 104, from the UE 102 directly (e.g., via a signaling radio bearer (SRB) established between the UE 102 and the SN 106A or via a physical control channel), or obtained by the SN 106A from measurements on signals, control channels or data channels received from the UE 102, for example, or another suitable event, for example, or another suitable event. In response to this determination, the SN 106A sends 606 the delta C-SN configuration to the MN 104 and in turn, the MN 104 transmits 608 an RRC reconfiguration message including the delta C-SN configuration to the UE 102. In some implementations, the UE 102 may transmit 610 an RRC reconfiguration complete message to the MN 104 in response to the RRC reconfiguration message. The MN 104 may send 612 a SN Reconfiguration Complete message to the SN 106A in response to the RRC reconfiguration complete message.

Later on, the SN 106A determines to update the first SN configuration. In some embodiments, the SN 106A determines to update the first SN configuration based on the SN 106A detecting a triggering event. The triggering event can be related to radio resource management. In one implementation, the triggering event can be that one or more measurement results received from the UE 102 that indicates a cell is suitable to be a SCell for the UE 102. In another implementation, the triggering event can be one or more measurement results received from the UE 102 that indicates a SCell of the UE 102 is not suitable for the UE 102. In yet another implementation, the triggering event can be that the SN 106A determines to configure the UE 102 using one or more reference signals for measurements and reporting.

In response to the determination, the SN 106A generates a second SN configuration which adds a new configuration parameter not in the first SN configuration, modifies a configuration parameter in the first SN configuration, or releases a configuration parameter in the first SN configuration. The second SN configuration can be a delta SN configuration or a full SN configuration. In some embodiments, the parameters of the second SN configuration may not overlap with the parameters of the delta C-SN configuration, so that the SN 106A need not spend resources to consequently update the delta C-SN configuration that was previously provided to the UE 102 after generating the second SN configuration. In other embodiments, the parameters of the second SN configuration may overlap with the parameters of the delta C-SN configuration. The SN 106A in some implementations can use the delta C-SN configuration to modify the updated first SN configuration (e.g., remove a new configuration parameter included in the second SN configuration when the triggering event that initially caused the SN 106A to transmit the second SN configuration no longer applies). In this way, when the UE 102 uses the delta C-SN configuration and updated first SN configuration to communicate with the SN 106A via the C-PSCell 126A, the UE 102 needs to only use a portion of the updated first SN configuration (e.g., the UE 102 need not use the new configuration parameter that was removed by the delta C-SN configuration).

The SN 106A sends 614 the second SN configuration to the MN 104 to update the first SN configuration and in turn the MN 104 sends 616 an RRC reconfiguration including the second SN configuration to the UE 102. The UE 102 updates 618 the first SN configuration according to the second SN configuration and transmits 620 an RRC reconfiguration complete message to the MN 104 in response to the RRC reconfiguration message 616. If the second SN configuration is a delta SN configuration to update the first SN configuration, the UE 102 may add one or more new configuration parameters in the first SN configuration, or release one or more configuration parameters in the first SN configuration according to the second SN configuration. If the second SN configuration is a full SN configuration, the UE 102 replaces the first SN configuration with the second SN configuration to update the first SN configuration. The MN 104 may transmit 622 a SN Reconfiguration Complete message to the SN 106A in response to receiving the RRC reconfiguration complete message. The UE 102 in DC with the MN 104 and the SN 106A uses 624 the updated first SN configuration to communicate with the SN 106A. That is, the UE 102 uses the second SN configuration to communicate with the SN 106A. If the second SN configuration includes a new configuration parameter not in the first SN configuration, the UE 102 adds the new configuration parameter to the first SN configuration. If the second SN configuration modifies a configuration parameter relative to the first SN configuration, the UE 102 updates the configuration parameter in the first SN configuration to a modified configuration parameter in accordance with the second SN configuration. If the second SN configuration releases a configuration parameter in the first SN configuration, the UE 102 releases the configuration parameter in the first SN configuration.

The UE 102 detects 626 a condition (or conditions) for connecting to the C-PSCell 126A is satisfied and initiates a random access procedure on the C-PSCell 126A in response to the detection For convenience, the discussion below refers to the condition or a configuration in singular, but it will be understood that it can be one or multiple conditions or include one or multiple configuration parameters. In response to the initiation, the UE 102 performs 628 the random access procedure with the SN 106A via the C-PSCell 126A using a random access configuration in the delta C-SN configuration. The UE 102 may disconnect from the PSCell in response to the initiation or the detection 626. In some implementations, the random access procedure can be a 4-step random access procedure or a 2-step random access procedure. In other implementations, the random access procedure can be a contention-based random access procedure or a contention-free random access procedure. After the UE 102 successfully complete the random access procedure 628, the UE 102 in DC with the MN 104 and the SN 106A communicates 630 with the SN 106A via the C-PSCell 126A (i.e., new PSCell 126A) by using the delta C-SN configuration and at least a portion of the updated first SN configuration. In some implementations, the UE 102 may release the rest of the updated first SN configuration parameters before event 630 so that the UE 102 does not use the rest of the updated first SN configuration parameters to communicate with the SN 106A in event 630. In other implementations, the UE 102 may also use the rest of the updated first SN configuration parameters to communicate with the SN 106A in event 630.

The "delta" C-SN configuration is not a complete configuration and does not include a full configuration indication. The UE 102 cannot only use the delta C-SN configuration to communicate with the SN 106A; the UE 102 must also refer to the updated first SN configuration stored in the UE 102. The delta C-SN configuration can include one or multiple configuration parameters for the UE 102 to communicate with the SN 106A via the C-PSCell 126A. The multiple configuration parameters may configure radio resources for the UE 102 to communicate with the SN 106A via the C-SCell 126A and zero, one, or more C-PSCells of the SN 106A. The multiple configuration parameters may or may not configure zero, one, or more radio bearers. The one or more radio bearers can include an SRB and/or DRB(s). The multiple configuration parameters may or may not include a measurement configuration and/or a security configuration.

The first SN configuration can include multiple configuration parameters for the UE 102 to communicate with the SN 106A via the PSCell and zero, one, or more secondary cells (SCells) of the SN 106A. The multiple configuration parameters may configure radio resources for the UE 102 to communicate with the SN 106A via the PSCell and zero, one, or more SCells of the SN 106A. The multiple configuration parameters may configure zero, one, or more radio bearers. The one or more radio bearers can include an SRB and/or data radio bearer(s) (DRB(s)). In some cases, the second SN configuration can modify or release one of the multiple configuration parameters. In other cases, the second SN configuration may add a new configuration parameter not in the first SN configuration.

In some implementations, the SN 106A can include the delta C-SN configuration in the SN Addition Modification Acknowledge message responding to a SN Modification Request message received from the MN 104 and send the SN Modification Request Acknowledge message to the MN 104 at event 606. In other implementations, the SN 106A can include the delta C-SN configuration in a SN Modification Required message and send the SN Modification Required message to the MN 104 at event 606. In some implementations, the SN 106A may indicate the SN Modification Request Acknowledge message or the SN Modification Required message is for conditional PSCell change.

In some implementations, the SN 106A includes a condition configuration configuring the condition 626 in the delta C-SN configuration. In other implementations, the MN 104 can include the delta C-SN configuration and a condition configuration configuring the condition 626 in the RRC reconfiguration message 608. The MN 104 may generate the condition configuration or receive the condition configuration from the SN 106A, e.g. at event 606.

In some implementations, the delta C-SN configuration can include a group configuration (CellGroupConfig) IE that configures the C-PSCell 126A and may configure zero, one, or more C-SCells of the SN 106A. In one implementation, the delta C-SN configuration can be a RRCReconfiguration message, RRCReconfiguration-IEs or the CellGroupConfig IE conforming to 3GPP TS 38.331. In other implementations, the delta C-SN configuration can include a SCG-ConfigPartSCG-r12 IE that configures the C-PSCell and may configure zero, one, or more C-SCells of the SN 106A. In one implementation, the delta C-SN configuration can be a RRCConnectionReconfiguration message, RRCConnectionReconfiguration-IEs or the ConfigPartSCG-r12 IE conforming to 3GPP TS 36.331.

In some implementations, the first/second SN configuration can include a CellGroupConfig IE that configures the PSCell and may configure zero, one, or more SCells of the SN 106A. In one implementation, the first/second SN configuration can be a RRCReconfiguration message, RRCReconfiguration-IEs or the CellGroupConfig IE conforming to 3GPP TS 38.331. In other implementations, the first/second SN configuration can include a SCG-ConfigPartSCG-r12 IE that configures the PSCell and may configure zero, one, or more SCells of the SN 106A. In one implementation, the first/second SN configuration can be a RRCConnectionReconfiguration message, RRCConnectionReconfiguration-IEs or the ConfigPartSCG-r12 IE conforming to 3GPP TS 36.331.

In some cases, the UE 102 may receive one or more conditions (discussed below in singular for convenience) in the RRC reconfiguration message or the delta C-SN configuration at event 608. The UE 102 may use the one or more conditions to determine whether to connect to the C-PSCell 126A. If the UE 102 determines that the condition is satisfied, the UE 102 connects to the C-PSCell 126A. If the UE 102 does not determine that the condition is satisfied, the UE 102 does not connect to the C-PSCell 126A.

In some implementations, the SN 106A may consist of CU 172 and one or more DU 174 as shown in FIG. 2. The DU 174 may generate the delta C-SN configuration or at least a portion of the delta C-SN configuration and send the delta C-SN configuration or part of the delta C-SN configuration to the CU 172. In case the DU 174 generates at least a portion of the delta C-SN configuration, the CU 172 may generate rest of the delta C-SN configuration. In one implementation, the DU 174 can perform the random access procedure 628 with the UE 102 and identify the UE 102 in the random access procedure. In another implementation, the DU 174 can perform the random access procedure 628 with the UE 102 and forward the identity of the UE 102 received in the MAC PDU in the random access procedure to the CU 172. The CU 172 identifies the UE 102 according to the identity of the UE 102. In response to the identification, the CU 172 and DU 174 communicates with the UE 102 using the delta C-SN configuration and at least a portion of the updated first SN configuration.

If the SN 106A identifies the UE 102 on the C-PSCell 126A at event 628, the SN 106A begins to transmit downlink control information (DCI) command(s) on physical downlink control channel(s) (PDCCH(s)), reference signal(s) or data to the UE 102 via the C-PSCell 126A and/or one or more C-SCells (if configured in the delta C-SN configuration) according to some configuration parameters in the delta C-SN configuration and/or at least a portion of the updated first SN configuration. If the SN 106A identifies the UE 102 on the C-PSCell 126A at event 628, the SN 106A may receive signal(s) on physical uplink control channel(s) (PUCCH(s)), sounding reference signal(s) or data from the UE 102 via the C-PSCell 126A and/or one or more C-SCells (if configured in the delta C-SN configuration) according to some configuration parameters in the delta C-SN configuration and/or at least a portion of the updated first SN configuration. The UE 102 receives the DCI command(s) on PDCCH(s), reference signal(s) or data from the SN 106A via the C-PSCell 126A and/or one or more C-SCells (if configured in the delta C-SN configuration) according to some configuration parameters in the delta C-SN configuration and/or at least a portion of the updated first SN configuration. The UE 102 may transmit signal(s) on PUCCH(s), sounding reference signal(s) or data to the SN 106A via the C-PSCell 126A and one or more C-SCells (if configured in the delta C-SN configuration) according to some configuration parameters in the delta C-SN configuration and/or at least a portion of the updated first SN configuration.

As described above, the SN 106A configures the C-PSCell 126A to the UE 102 at events 606 and 608 in advance, before the C-PSCell 126A becomes suitable for the UE 102. When the C-PSCell 126A becomes suitable for the UE 102 (i.e., the UE 102 detects the corresponding condition), the UE 102 performs the random access procedure with the C-PSCell to quickly change PSCell. In contrast to the immediate PSCell change procedure, the conditional PSCell change technique discussed in this disclosure significantly reduces latency associated with DC configuration.

If the MN 104 is a gNB, the RRC reconfiguration message and the RRC reconfiguration complete message are a RRCReconfiguration message and a RRCConnectionReconfigurationComplete message respectively. If the MN 104 is an eNB or a ng-eNB, the RRC reconfiguration message and the RRC reconfiguration complete message are a RRCReconfiguration message and a RRCConnectionReconfigurationComplete message respectively.

Figure 6B:
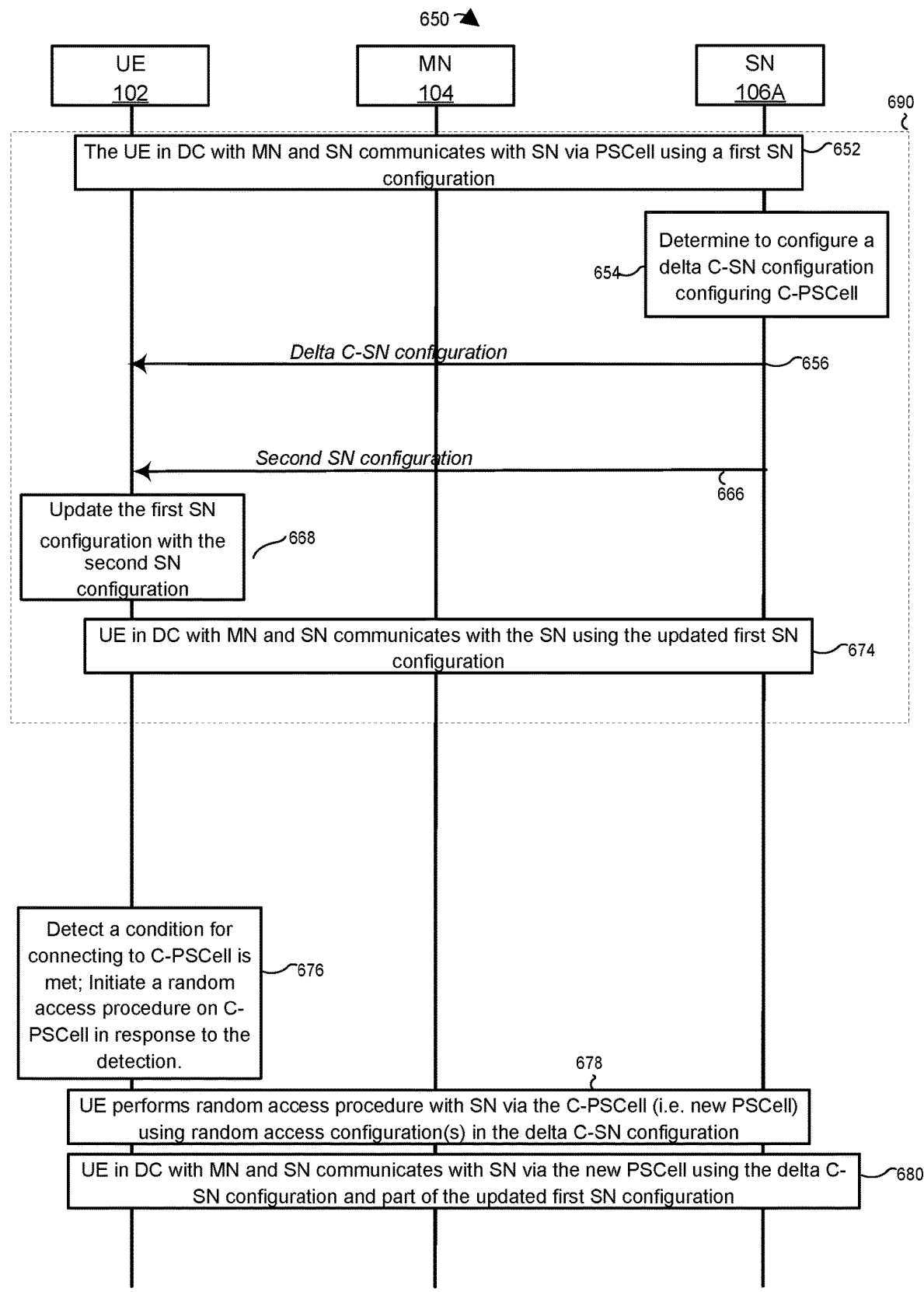
FIG. 6B is a messaging diagram of an example scenario in which the SN of FIG. 1A or 1B initiates a conditional PSCell change procedure using a delta configuration, in accordance with the techniques of this disclosure.

Next, FIG. 6B illustrates a scenario 650 that involves a conditional C-PSCell Change without SN change, i.e., a conditional change of a PSCell of an SN when the UE is already in DC with the MN and SN. In this scenario, the BS 104 operates as a MN and the BS 106A operates as a SN. Events 652, 654, 668, 674, 676, 678 and 680 in this scenario are similar to events 602, 604, 606, 608, 618, 624, 626, 628 and 630 discussed with reference to FIG. 6A. The differences between the scenarios of FIG. 6A and FIG. 6B are discussed below.

In the scenario 650 of FIG. 6B, the SN 106A directly transmits 656 the delta C-SN configuration to the UE 102 in response to the determination 654, instead of sending it to the UE via the MN 104. The UE 102 may transmit an RRC reconfiguration complete message to the SN 106A in response to the delta C-SN configuration. In some implementations, the SN 106A configures a first SRB to the UE 102 via the MN 104 and transmits the delta C-SN configuration via the first SRB to the UE 102. For example, the SN 106A send an SRB configuration configuring the first SRB (e.g., SRB3) to the MN 104 and the MN 104 transmits the SRB configuration to the UE via a second SRB (e.g., SRB1) between the MN 104 and the UE 102. The UE 102 may reconfigure the SRB configuration in the updated first SN configuration with an SRB configuration in the delta C-SN configuration if the delta C-SN configuration includes the SRB configuration and the UE 102 connects to the C-PSCell 126A. In some implementations, the UE 102 may transmit an RRC reconfiguration complete message via the first SRB to the SN 106A in response to the delta C-SN configuration.

After event 656, the SN 106A directly transmits 666 a second SN configuration to the UE 102 instead of sending it to the UE via the MN 104. The UE 102 may transmit an RRC reconfiguration complete message to the SN 106A in response to the second SN configuration. In some implementations, the SN 106A transmits the second SN configuration via the first SRB to the UE 102. The UE 102 may transmit an RRC reconfiguration complete message via the first SRB to the SN 106A in response to the second SN configuration.

Figure 7A:
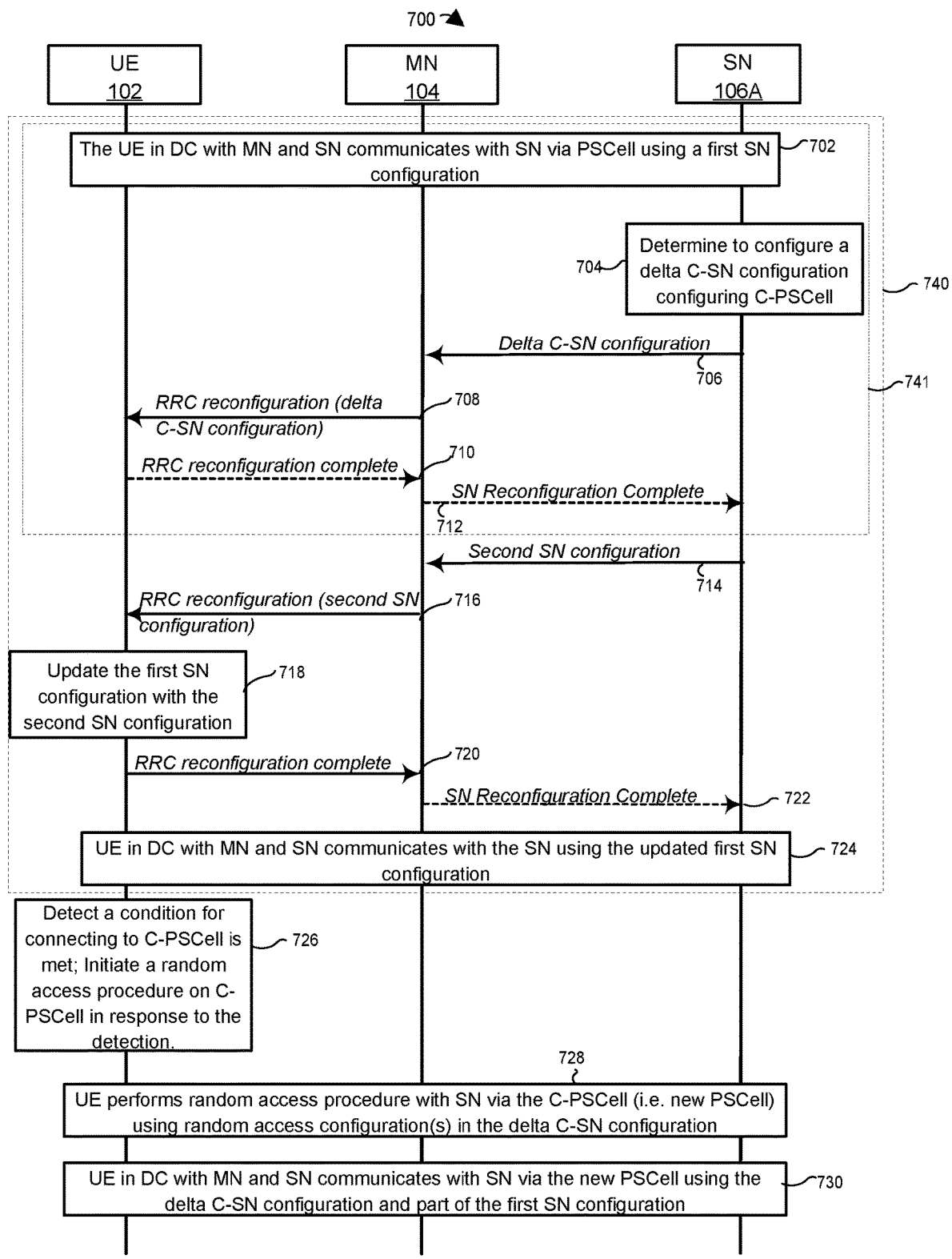
FIG. 7A is a messaging diagram of an example scenario in which the SN of FIG. 1A or 1B initiates a conditional PSCell change procedure using a delta configuration and provides a configuration for updating a previously received configuration at a UE, via the MN of FIG. 1A or 1B, in accordance with the techniques of this disclosure.

Referring to FIG. 7A, a scenario 700 also involves a conditional PSCell change, similar to the scenario 600 of FIG. 6A. In this scenario, the BS 104 operates as a MN and the BS 106A operates as a SN. All the events in FIG. 7A are similar to all the events discussed with reference to FIG. 6A, except for event 730. The UE 102 in DC with the MN 104 and the SN 106A communicates 730 with the SN 106A via the new PSCell using the delta C-SN configuration and at least a portion of the first SN configuration (instead of the updated first SN configuration in accordance with the second SN configuration).

Figure 7B:
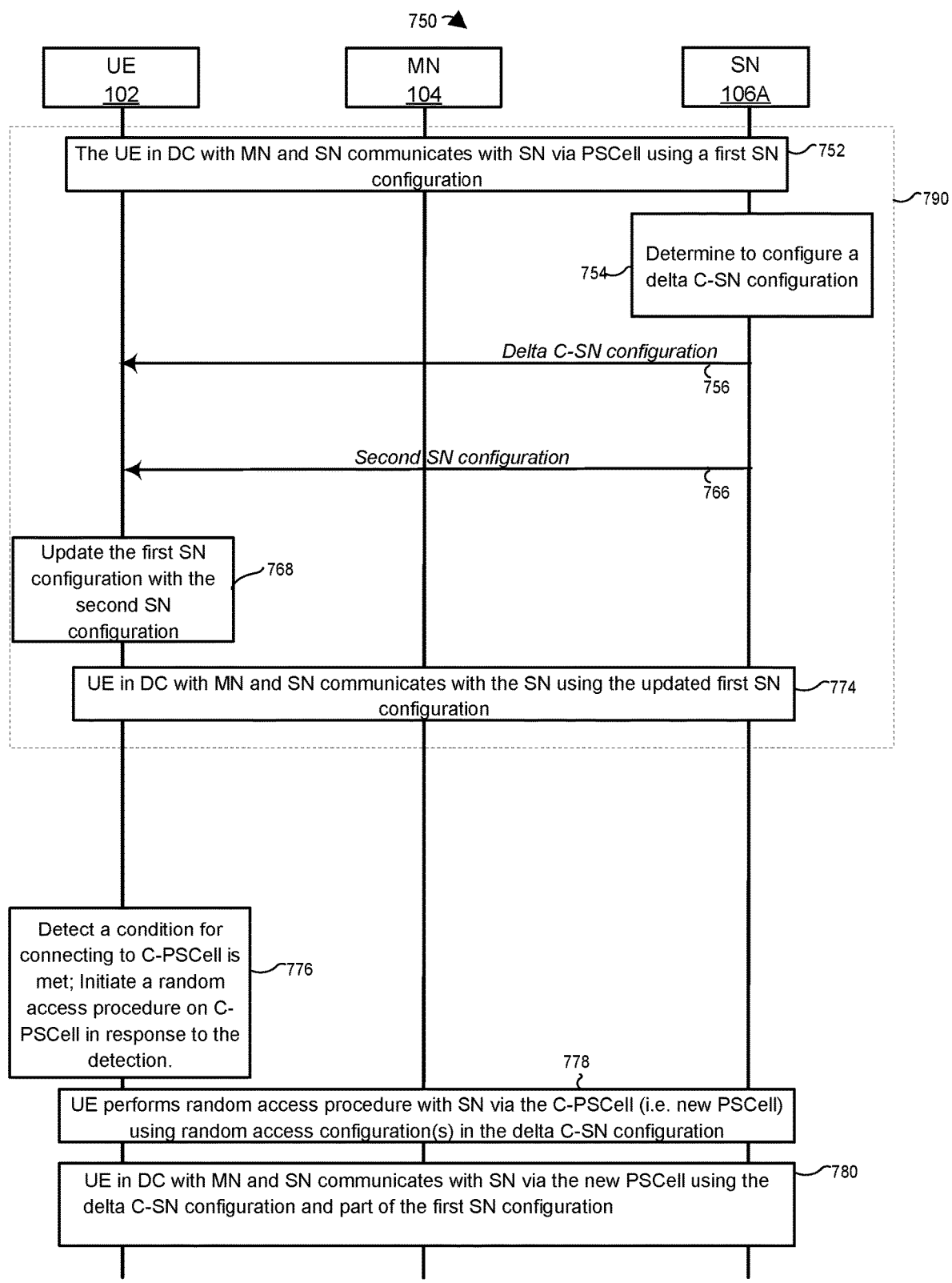
FIG. 7B is a messaging diagram of an example scenario in which the SN of FIG. 1A or 1B initiates a conditional PSCell change procedure using a delta configuration and provides a configuration for updating a previously received configuration at a UE, in accordance with the techniques of this disclosure.

Referring to FIG. 7B, a scenario 750 also involves a conditional PSCell change, similar to the scenario 650 of FIG. 6B. In this scenario, the BS 104 operates as a MN and the BS 106A operates as a SN. All the events in FIG. 7B are similar to all the events discussed with reference to FIG. 6B, except for event 780. The UE 102 in DC with the MN 104 and the SN 106A communicates 780 with the SN 106A via the new PSCell using the delta C-SN configuration and at least a portion of the first SN configuration (instead of the updated first SN configuration in accordance with the second SN configuration).

Figure 8A:
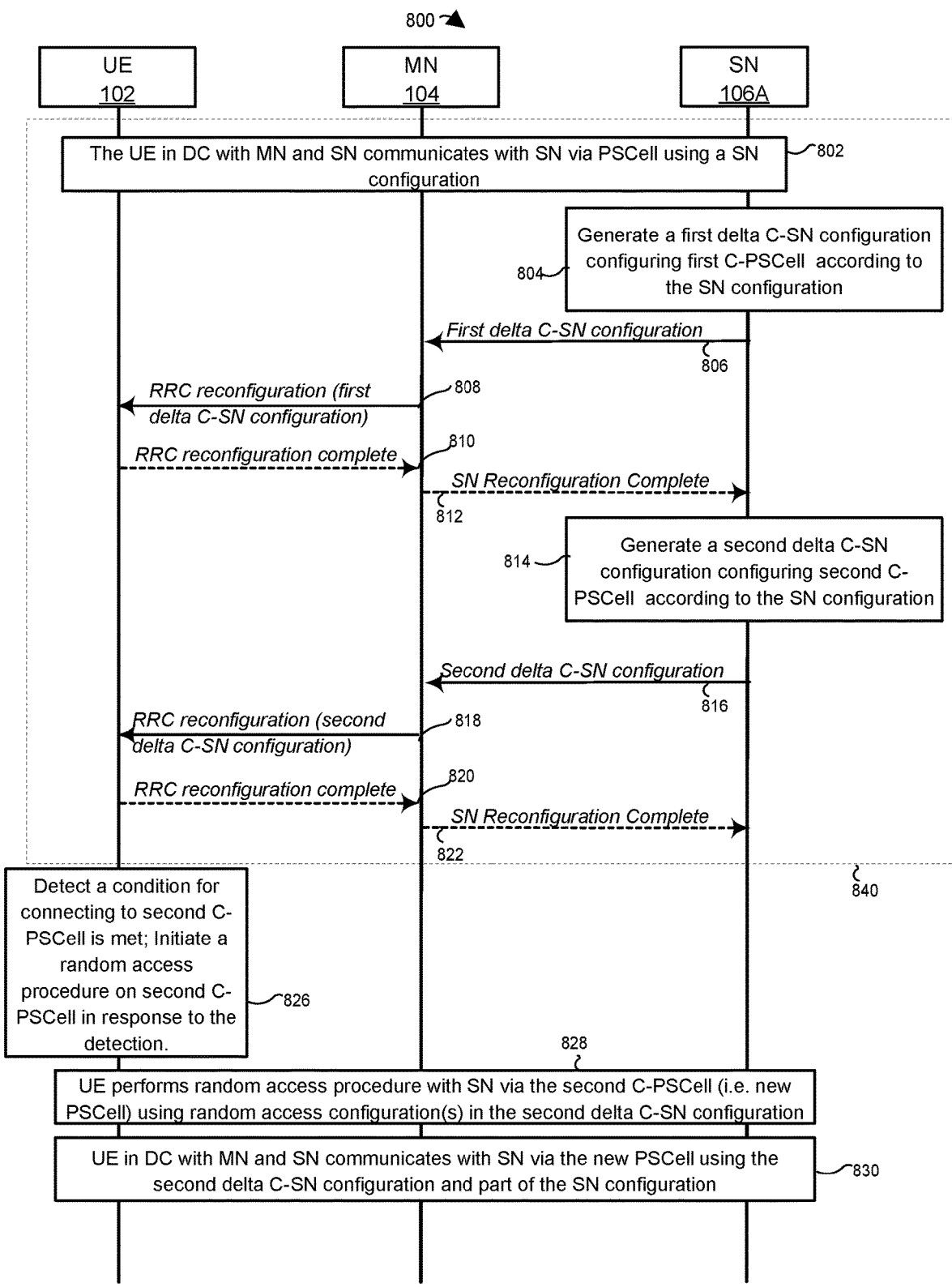
FIG. 8A is a messaging diagram of an example scenario in which the SN of FIG. 1A or 1B initiates a conditional PSCell change procedure using a first delta configuration and a second delta configuration, via the MN of FIG. 1A or 1B, in accordance with the techniques of this disclosure.

Next, FIG. 8A illustrates another scenario 800 that involves a conditional PSCell change. In this scenario, the BS 104 operates as a MN and the BS 106A operates as a SN. Events 802-812 in this scenario are similar to events 602-612, 618, 624, 626, 628 and 630 discussed with reference to FIG. 6A. The differences between the scenarios of FIG. 6A and FIG. 8A are discussed below.

Initially, the UE 102 in DC with the MN 104 and SN 106A communicates 802 with the SN 106A via PSCell using a SN configuration as event 602 of FIG. 6A. The SN 106A determines to configure a first delta C-SN configuration configuring first C-PSCell (i.e., a cell other than cell 126A and not shown in FIG. 1A). The SN 106A generates 804 the first delta C-SN configuration according to the SN configuration. The SN 106A can determine to configure the first C-PSCell based on one or more measurement results received from the UE 102 via the MN 104 or from the UE 102 directly (e.g., via a signaling radio bearer (SRB) established between the UE 102 and the SN 106A or via a physical control channel) or obtained by the SN 106A from measurements on signals, control channels or data channels received from the UE 102, for example, or another suitable event. The SN 106A sends 806 the first delta C-SN configuration to the MN 104 and in turn, the MN 104 transmits 808 an RRC reconfiguration message including the first delta C-SN configuration to the UE 102. In some implementations, the UE 102 may transmit 810 an RRC reconfiguration complete message to the MN 104 in response to the RRC reconfiguration message 810. The MN 104 may send 812 a SN Reconfiguration Complete message to the SN 106A in response to the RRC reconfiguration complete message 810.

Later on, the SN 106A determines to configure a second delta C-SN configuration configuring a second C-PSCell (i.e., cell 126A) of the SN 106A (not shown in FIG. 1). The SN 106A generates 814 the second delta C-SN configuration according to the SN configuration. The SN 106A can determine to configure the second C-PSCell based on one or more measurement results received from the UE 102 via the MN 104 or via a signaling radio bearer (SRB) established between the UE 102 and the SN 106A, for example, or another suitable event. The SN 106A sends 816 the second delta C-SN configuration to the MN 104 and in turn, the MN 104 transmits 818 an RRC reconfiguration message including the second delta C-SN configuration to the UE 102. In some implementations, the UE 102 may transmit 820 an RRC reconfiguration complete message to the MN 104 in response to the RRC reconfiguration message 818. The MN 104 may send 822 a SN Reconfiguration Complete message to the SN 106A in response to the RRC reconfiguration complete message 820.

The UE 102 detects 826 a condition (or conditions) for connecting to the second C-PSCell 126A is met and initiates a random access procedure on the second C-PSCell 126A in response to the detection. For convenience, the discussion below refers to the condition or a configuration in singular, but it will be understood that it can be one or multiple conditions or include one or multiple configuration parameters. In response to the initiation, the UE 102 performs 828 the random access procedure with the SN 106A via the second C-PSCell 126A using a random access configuration in the second delta C-SN configuration. The UE 102 may disconnect from the PSCell in response to the initiation or the detection. In some implementations, the random access procedure can be a 4-step random access procedure or a 2-step random access procedure. In other implementations, the random access procedure can be a contention-based random access procedure or a contention-free random access procedure. After the UE 102 successfully completes the random access procedure 828, the UE 102 in DC with the MN 104 and the SN 106A communicates 830 with the SN 106A via the C-PSCell 126A (i.e., new PSCell 126A) by using the second delta C-SN configuration and at least a portion of the SN configuration. In some implementations, the UE 102 may release the rest of the SN configuration parameters before event 830 so that the UE 102 does not use the rest of the SN configuration parameters to communicate with the SN 106A in event 830. In other implementations, the UE 102 may also use the rest of the SN configuration parameters to communicate with the SN 106A in event 830.

The UE 102 detects 826 a condition (or conditions) for connecting to the second C-PSCell is met and initiates a random access procedure on the second C-PSCell in response to the detection. For convenience, the discussion below refers to the condition or a configuration in singular, but it will be understood that it can be one or multiple conditions or include one or multiple configuration parameters. In response to the initiation, the UE 102 performs 828 the random access procedure with the SN 106A via the second C-PSCell using a random access configuration in the second delta C-SN configuration. The UE 102 may disconnect from the PSCell in response to the initiation or the detection 826. In some implementations, the random access procedure can be a 4-step random access procedure or a 2-step random access procedure. In other implementations, the random access procedure can be a contention-based random access procedure or a contention-free random access procedure. After the UE 102 successfully completes the random access procedure 828, the UE 102 in DC with the MN 104 and the SN 106A communicates 830 with the SN 106A via the second C-PSCell 126 (i.e., new PSCell) by using the second delta C-SN configuration and at least a portion of the SN configuration. In some implementations, the UE 102 may release the rest of the SN configuration parameters before event 830 so that the UE 102 does not use the rest of the SN configuration to communicate with the SN 106A in event 830. In other implementations, the UE 102 may also use the rest of the SN configuration to communicate with the SN 106A in event 830. In some implementations, the UE 102 may release the first delta SN configuration if the UE 102 connects to the second C-PSCell. In other implementations, the UE 102 may still keep the first delta SN configuration and the SN configuration if UE 102 connects to the second C-PSCell. By keeping the first delta SN configuration, the UE, the UE 102 can connect to the first C-PSCell and communicate with the SN 106A via the first C-PSCell according to the first delta SN configuration and at least a portion of the SN configuration if the UE 102 detects a condition for connecting to the first C-PSCell while the UE 102 is connected to the second C-PSCell. In one implementation, the UE 102 may use the rest of the SN configuration parameters to communicate with the SN 106A via the first C-PSCell, e.g., if the first delta SN configuration neither releases nor modifies the rest of the SN configuration parameters or if the UE 102 is required to do so as specified by a 3GPP specification. In another implementation, the UE 102 may release the rest of the SN configuration parameters, e.g., if the first delta SN configuration releases or modifies the rest of the SN configuration parameters or if the UE 102 is required to do so as specified by a 3GPP specification.

The first/second "delta" C-SN configuration is not a complete configuration and does not include a full configuration indication. The UE 102 cannot only use the first/second delta C-SN configuration to communicate with the SN 106A without referring to the SN configuration stored in the UE 102. The first/second delta C-SN configuration can include one or multiple configuration parameters for the UE 102 to communicate with the SN 106A via the first C-PSCell/second C-PSCell. The multiple configuration parameters may configure radio resources for the UE 102 to communicate with the SN 106A via the first C-PSCell/second C-PSCell and zero, one, or more C-SCells of the SN 106A. The multiple configuration parameters may or may not configure zero, one, or more radio bearers. The one or more radio bearers can include an SRB and/or DRB(s). The multiple configuration parameters may or may not include a measurement configuration and/or a security configuration. In some implementations, the SN 106A may include same configuration parameters having same values in the first delta C-SN configuration and the second delta C-SN configuration.

The SN configuration can include multiple configuration parameters for the UE 102 to communicate with the SN 106A via the PSCell and zero, one, or more secondary cells (SCells) of the SN 106A. The multiple configuration parameters may configure radio resources for the UE 102 to communicate with the SN 106A via the PSCell and zero, one, or more SCells of the SN 106A. The multiple configuration parameters may configure zero, one, or more radio bearers. The one or more radio bearers can include an SRB and/or data radio bearer(s) (DRB(s)).

In some implementations, the SN 106A can include the first delta C-SN configuration in the SN Addition Modification Acknowledge message responding to a SN Modification Request message received from the MN 104 and send the SN Modification Request Acknowledge message to the MN 104 at event 806. In other implementations, the SN 106A can include the first delta C-SN configuration in a SN Modification Required message and send the SN Modification Required message to the MN 104 at event 806. In some implementations, the SN 106A may indicate the SN Modification Request Acknowledge message or the SN Modification Required message is for conditional PSCell change.

In some implementations, the SN 106A can include the second delta C-SN configuration in a SN Addition Modification Acknowledge message responding to a SN Modification Request message received from the MN 104 and send the SN Modification Request Acknowledge message to the MN 104 at event 816. In other implementations, the SN 106A can include the second delta C-SN configuration in a SN Modification Required message and send the SN Modification Required message to the MN 104 at event 816. In some implementations, the SN 106A may indicate the SN Modification Request Acknowledge message or the SN Modification Required message is for conditional PSCell change.

In some implementation, the SN 106A includes a condition configuration configuring the condition 826 in the second delta C-SN configuration. In other implementations, the MN 104 can include the second delta C-SN configuration and a condition configuration configuring the condition 826 in the RRC reconfiguration message 818. In some implementation, the SN 106A includes a condition configuration configuring a condition for the UE 102 to detect (or evaluate) in the first delta C-SN configuration. If the UE 102 detects the condition is satisfied, the UE 102 may connect to the second C-PSCell 126A. The UE may perform a random access procedure on the second C-PSCell 126A to connect to the second C-PSCell 126A. In other implementations, the MN 104 can include the first delta C-SN configuration and a condition configuration configuring the condition in the RRC reconfiguration message 808. The MN 104 may generate the condition configuration or receive the condition configuration from the SN 106A, e.g., at event 806.

In some implementations, the first/second delta C-SN configuration can include a group configuration (CellGroupConfig) IE that configures the second C-PSCell 126A and may configure zero, one, or more C-SCells of the SN 106A. In one implementation, the delta C-SN configuration can be a RRCReconfiguration message, RRCReconfiguration-IEs or the CellGroupConfig IE conforming to 3GPP TS 38.331. In other implementations, the delta C-SN configuration can include a SCG-ConfigPartSCG-r12 IE that configures the C-PSCell and may configure zero, one, or more C-SCells of the SN 106A. In one implementation, the delta C-SN configuration can be a RRCConnectionReconfiguration message, RRCConnectionReconfiguration-IEs or the ConfigPartSCG-r12 IE conforming to 3GPP TS 36.331.

In some implementations, the SN configuration can include a CellGroupConfig IE that configures the PSCell and may configure zero, one, or more SCells of the SN 106A. In one implementation, the SN configuration can be a RRCReconfiguration message, RRCReconfiguration-IEs or the CellGroupConfig IE conforming to 3GPP TS 38.331. In other implementations, the SN configuration can include a SCG-ConfigPartSCG-r12 IE that configures the PSCell and may configure zero, one, or more SCells of the SN 106A. In one implementation, the SN configuration can be a RRCConnectionReconfiguration message, RRCConnectionReconfiguration-IEs or the ConfigPartSCG-r12 IE conforming to 3GPP TS 36.331.

In some cases, the UE 102 may receive one or more conditions (discussed below in singular for convenience) in the RRC reconfiguration message or the first/second delta C-SN configuration at event 808/818. The UE 102 may use the one or more conditions to determine whether to connect to the first C-PSCell/second C-PSCell. If the UE 102 determines that the condition is satisfied for the first C-PSCell/second C-PSCell, the UE 102 connects to the first C-PSCell/second C-PSCell. If the UE 102 does not determine that the condition is satisfied for the first C-PSCell/second C-PSCell, the UE 102 does not connect to the first C-PSCell/second C-PSCell. If the UE 102 simultaneously detects the condition for the first C-PSCell and the condition for the second C-PSCell are satisfied, the UE 102 either connects to the first C-PSCell or the second C-PSCell. In some implementations, the UE 102 may connect to one of the first C-PSCell and the second C-PSCell if the one has better signal strength/quality than the other. In other implementations, the UE 102 may connect to one of the first C-PSCell and the second C-PSCell if the one has a wider frequency bandwidth than the other. In yet other implementations, the UE 102 may connect to one of the first C-PSCell and the second C-PSCell if the one provides higher data rate than the other.

In some implementations, the SN 106A may consist of CU 172 and one or more DU 174 as shown in FIG. 2. A first DU 174 may generate the first delta C-SN configuration or at least a portion of the first delta C-SN configuration and send the first delta C-SN configuration or at least a portion of the first delta C-SN configuration to the CU 172. In case the first DU 174 generates at least a portion of the first delta C-SN configuration, the CU 172 may generate rest of the first delta C-SN configuration. A second DU 174 may generate the second delta C-SN configuration or at least a portion of the second delta C-SN configuration and send the second delta C-SN configuration or at least a portion of the second delta C-SN configuration to the CU 172. In case the second DU 174 generates at least a portion of the second delta C-SN configuration, the CU 172 may generate rest of the second delta C-SN configuration. In one implementation, the second DU 174 can perform the random access procedure 828 with the UE 102 and identify the UE 102 in the random access procedure. In another implementation, the second DU 174 can perform the random access procedure 828 with the UE 102 and forward the identity of the UE 102 received in the MAC PDU in the random access procedure to the CU 172. The CU 172 identifies the UE 102 according to the identity of the UE 102. In response to the identification, the CU 172 and second DU 174 communicates with the UE 102 using the second delta C-SN configuration and at least a portion of the first SN configuration.

If the SN 106A identifies the UE 102 on the second C-PSCell at event 828, the SN 106A begins to transmit downlink control information (DCI) command(s) on physical downlink control channel(s) (PDCCH(s)), reference signal(s) or data to the UE 102 via the second C-PSCell and/or one or more C-SCells (if configured in the second delta C-SN configuration) according to some configuration parameters in the second delta C-SN configuration and/or at least a portion of the SN configuration. If the SN 106A identifies the UE 102 on the second C-PSCell at event 828, the SN 106A may receive signal(s) on PUCCH(s), sounding reference signal(s) or data from the UE 102 via the second C-PSCell and/or one or more C-SCells (if configured in the second delta C-SN configuration) according to some configuration parameters in the second delta C-SN configuration and/or at least a portion of the SN configuration. The UE 102 receives the DCI command(s) on PDCCH(s), reference signal(s) or data from the SN 106A via the second C-PSCell and/or one or more C-SCells (if configured in the second delta C-SN configuration) according to some configuration parameters in the second delta C-SN configuration and/or at least a portion of the SN configuration. The UE 102 may transmit signal(s) on PUCCH(s), sounding reference signal(s) or data to the SN 106A via the second C-PSCell and one or more C-SCells (if configured in the delta C-SN configuration) according to some configuration parameters in the second delta C-SN configuration and/or at least a portion of the SN configuration.

As described above, the SN 106A configures the first C-PSCell and the second C-PSCell to the UE 102 respectively at events 806, 808 and events 816, 1818 in advance, before the first C-PSCell and/or the second C-PSCell becomes suitable for the UE 102. When the second C-PSCell becomes suitable for the UE 102 (i.e., the UE 102 detects the corresponding condition), the UE 102 performs the random access procedure with the second C-PSCell to quickly change PSCell. In contrast to the immediate PSCell change procedure, the conditional PSCell change technique discussed in this disclosure significantly reduces latency associated with DC configuration.

If the MN 104 is a gNB, the RRC reconfiguration message and the RRC reconfiguration complete message are a RRCReconfiguration message and a RRCConnectionReconfigurationComplete message respectively. If the MN 104 is an eNB or a ng-eNB, the RRC reconfiguration message and the RRC reconfiguration complete message are a RRCReconfiguration message and a RRCConnectionReconfigurationComplete message respectively.

Figure 8B:
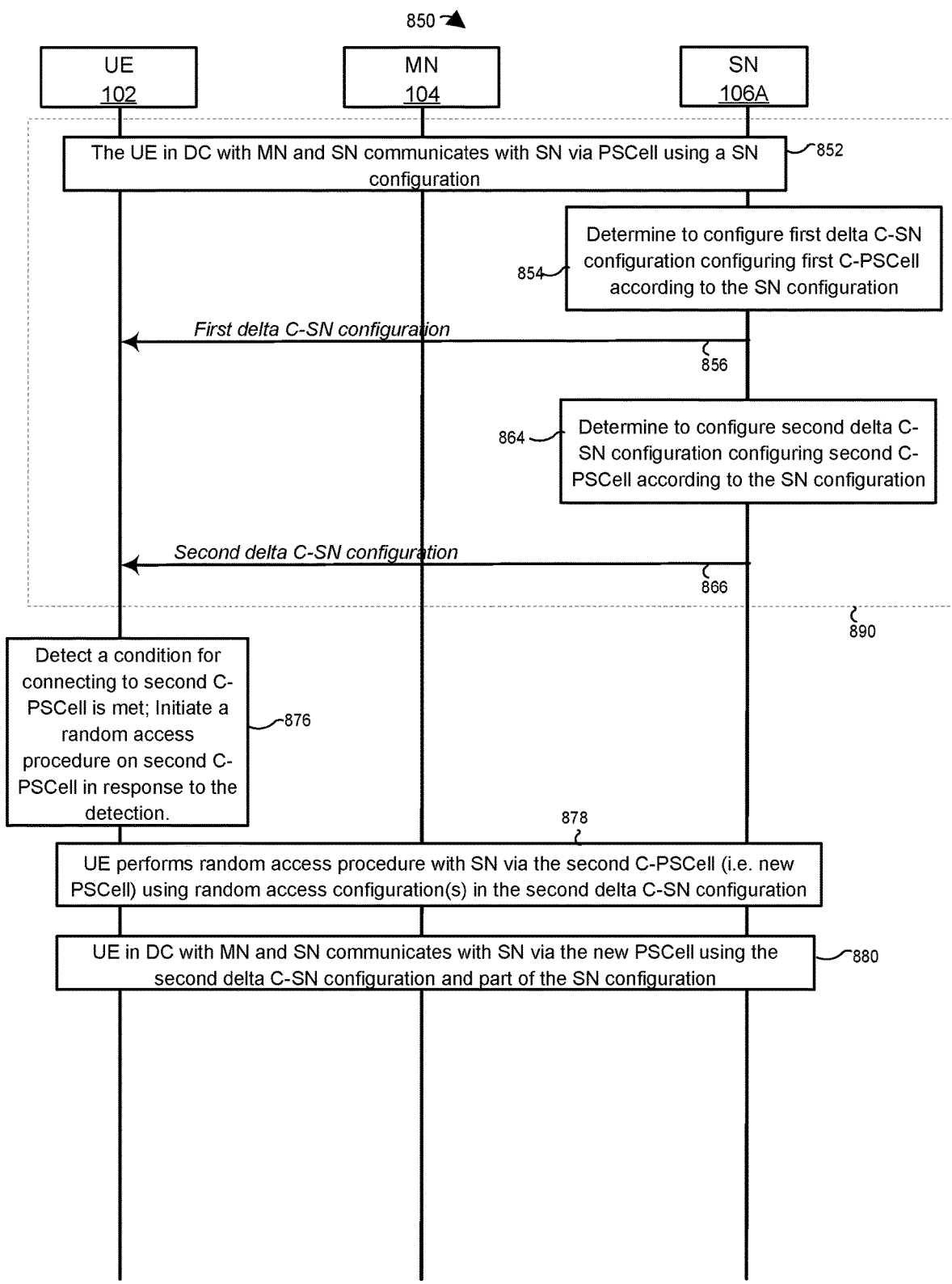
FIG. 8B is a messaging diagram of an example scenario in which the SN of FIG. 1A or 1B initiates a conditional PSCell change procedure using a first delta configuration and a second delta configuration, in accordance with the techniques of this disclosure.

Next, FIG. 8B illustrates a scenario 850 that involves a conditional C-PSCell Change without SN change, i.e., a conditional change of a PSCell of an SN when the UE is already in DC with the MN and SN. In this scenario, the BS 104 operates as a MN and the BS 106A operates as a SN. Events 852, 854, 864, 868, 876, 878 and 880 in this scenario are similar to events 802, 804, 814, 818, 826, 828, and 830 discussed with reference to FIG. 8A. The differences between the scenarios of FIG. 8A and FIG. 8B are discussed below.

In the scenario 850 of FIG. 8B, the SN 106A directly transmits 856 the first delta C-SN configuration to the UE 102 instead of sending it to the UE via the MN 104. The UE 102 may transmit an RRC reconfiguration complete message to the SN 106A in response to the first delta C-SN configuration. In some implementations, the SN 106A configures a first SRB to the UE 102 via the MN 104 and transmits the first delta C-SN configuration via the first SRB to the UE 102. For example, the SN 106A send an SRB configuration configuring the first SRB (e.g., SRB3) to the MN 104 and the MN 104 transmits the SRB configuration to the UE via a second SRB (e.g., SRB1) between the MN 104 and the UE 102. In some implementations, the UE 102 may transmit an RRC reconfiguration complete message via the first SRB to the SN 106A in response to the first delta C-SN configuration.

After event 856, the SN 106A directly transmits 866 the second delta C-SN configuration, (e.g., via the first SRB) to the UE 102 instead of sending it to the UE via the MN 104. The UE 102 may transmit an RRC reconfiguration complete message (e.g., via the first SRB) to the SN 106A in response to the second delta C-SN configuration. The UE 102 may reconfigure the SRB configuration in the SN configuration with an SRB configuration in the second delta C-SN configuration if the second delta C-SN configuration includes the SRB configuration and the UE 102 connects to the second C-PSCell.

Figure 9A:
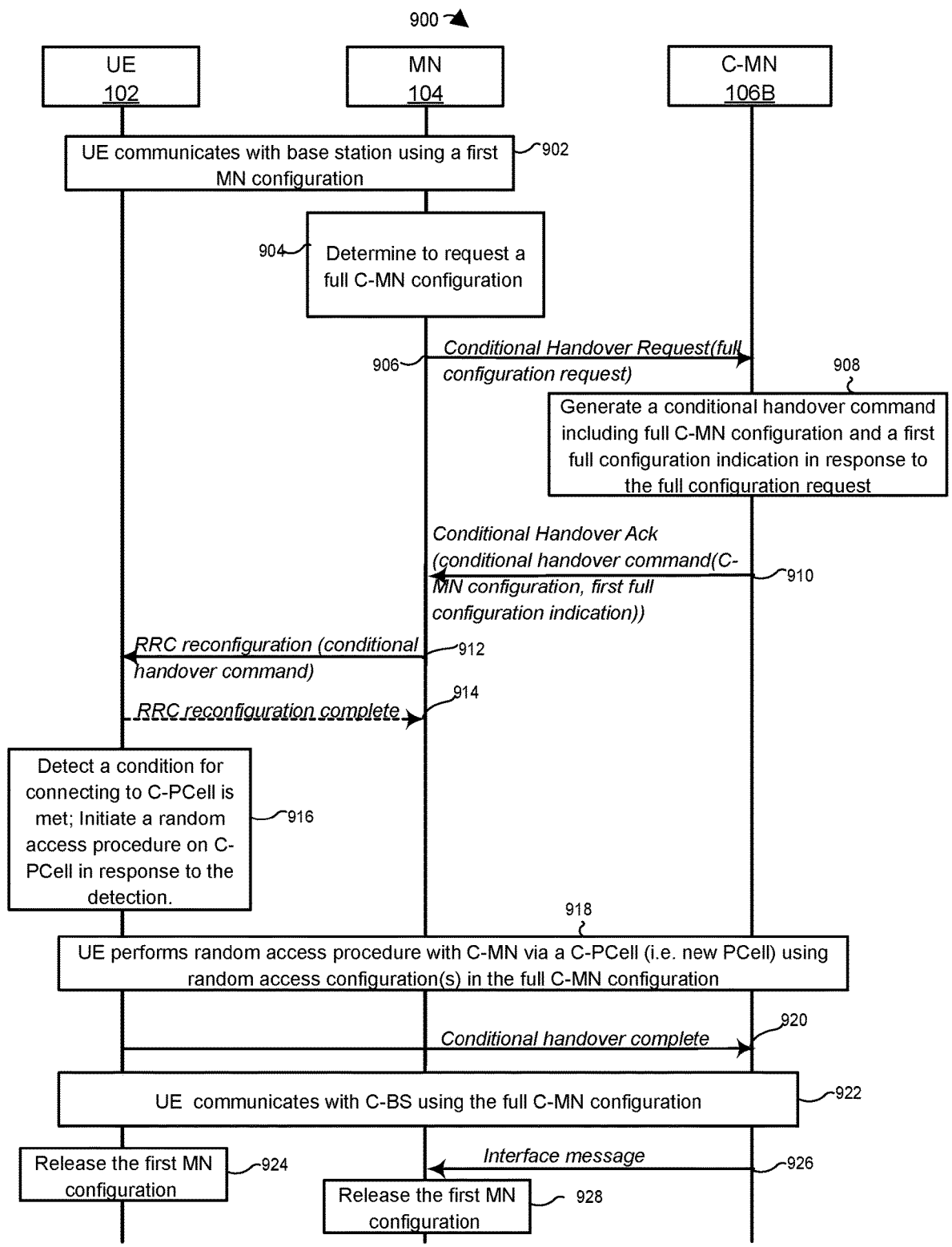
FIG. 9A is a messaging diagram of an example scenario in which the MN of FIG. 1A or 1B initiates a conditional handover procedure using a full configuration, via a request to a C-MN, in accordance with the techniques of this disclosure.

Next, FIG. 9A illustrates another scenario 900 that involves conditional handover. In this scenario, the base station (BS) 104 operates as a MN and the BS 106B operates as a candidate BS (C-MN) for the conditional handover.

In the scenario 900 of the FIG. 9A, the UE 102 communicates 902 with the MN 104 by using a first MN configuration. The UE 102 may be in single connectivity (SC) with the MN 104 or in DC with the MN 104 and SN 106A. The MN 104 determines 904 to request a full C-MN configuration for the UE 102. The full C-MN configuration configures a candidate PCell (C-PCell) 126B of the C-MN 106B. The MN 104 can make this determination based on one or more measurement results received from the UE directly (e.g., via a signaling radio bearer (SRB) established between the UE 102 and the MN 104 or via a physical control channel), or obtained by the MN 104 from measurements on signals, control channels or data channels received from the UE 102, for example, or another suitable event. In response to the determination, the MN 104 sends 906 a Conditional Handover Request message including a full configuration request indication) to the C-MN 106B. In response to the Conditional Handover Request message, the C-MN 106B generates a conditional handover command message including a full C-MN configuration and a first full configuration indication. Then the C-MN 106B sends a 910 Conditional Handover Request Acknowledge message including the conditional handover command message to the MN 104. The MN 104 sends 912 an RRC reconfiguration message including the conditional handover command message to the UE 102. The UE 102 may send 914 an RRC reconfiguration complete message to the MN 104 in response to the RRC reconfiguration message 912. In some implementations, the first full configuration indication can be a new field/IE newly defined in 3GPP TS 36.331 or 38.331. The new field/IE indicates the UE 102 to release the MN configuration and use the full C-MN configuration directly if the UE 102 detects that the condition for connecting to the C-PCell 126B is satisfied. In other implementations, the first full configuration can be an existing field/IE in 3GPP TS 36.331 or 38.331. The existing field/IE indicates the UE 102 to release the MN configuration and use the full C-MN configuration directly if the UE 102 detects that the condition for connecting to the C-PCell 126B is satisfied.

In some alternative implementations, the C-MN 106B may include the first full configuration indication in the Conditional Handover Request Acknowledge message instead of the full C-MN configuration. In this case, the MN 104 may include a second full configuration indication in the RRC reconfiguration message 912. In some implementations, the second full configuration indication can be a new field/IE newly defined in 3GPP TS 36.331 or 38.331. The new field/IE indicates the UE 102 to release the MN configuration and use the full C-MN configuration directly if the UE 102 detects that the condition for connecting to the C-PCell 126B is satisfied. In other implementations, the second full configuration can be an existing field/IE in 3GPP TS 36.331 or 38.331. The existing field/IE indicates the UE 102 to release the MN configuration and use the full C-MN configuration directly if the UE 102 detects that the condition for connecting to the C-PCell 126B is satisfied.

In some implementations, the Conditional Handover Request message can be a Handover Request message defined in 3GPP TS 36.423 or TS 38.423 and the MN 104 may include a conditional handover request indication in the Handover Request message. In some implementations, the MN 104 may include the first MN configuration in the Handover Request message. In other implementations, the MN 104 may not include the first MN configuration in the Handover Request message. In this case, the MN 104 may not include the full configuration request indication in the Handover Request message. The C-MN 106B includes the first full configuration indication in the full C-MN configuration if the C-MN 106B finds no MN configuration included in the Handover Request message.

Later on, UE 102 detects 916 a condition (or conditions) for connecting to the C-PCell 126B is met and initiates a random access procedure on the C-PCell 126B in response to the detection. For convenience, the discussion below refers to the condition or a configuration in singular, but it will be understood that it can be one or multiple conditions or include one or multiple configuration parameters. In response to the initiation, the UE 102 performs 918 the random access procedure with the C-MN 106B via the C-PCell 126B using a random access configuration in the full C-MN configuration. The UE 102 may disconnect from the PCell of the MN 104 in response to the initiation or the detection. In some implementations, the random access procedure can be a 4-step random access procedure or a 2-step random access procedure. In other implementations, the random access procedure can be a contention-based random access procedure or a contention-free random access procedure. The UE 102 may transmit 920 a conditional handover complete message via the C-PCell 126B to the C-MN 106B in/after 918 the random access procedure in response to the conditional handover command message.

After the UE 102 successfully complete the random access procedure 918 or transmitting the conditional handover complete, the UE 102 communicates 922 with the C-MN 106B via the C-PCell 126B (i.e., new PCell 126B) by using the full C-MN configuration. The UE 102 releases 924 the first MN configuration in response to the first (or the second) full configuration indication. The C-MN 106B identifies the UE 102 if the C-MN 106B finds an identity of the UE 102 in a MAC PDU received from the UE 102 in the random access procedure 918. The C-MN 106B includes the identity of the UE 102 in the full C-MN configuration. In other implementations, the C-MN 106B identifies the UE 102 if the C-MN 106B receives a dedicated random access preamble from the UE 102 in the random access procedure 918. The C-MN 106B includes the dedicated random access preamble in the full C-MN configuration. The C-MN 106B sends 926 an interface message to the MN 104 in response to identifying the UE 102. The MN 104 releases 928 the first MN configuration in response to or after receiving the interface message.

In some implementations, the interface message 926 can be a Handover Success message or a UE Context Release message. The MN 104 may send a SN Status Transfer message to the C-MN 106B in response to or after receiving the interface message and releases 928 the first MN configuration after transmitting the SN Status Transfer message. In some implementations, the conditional handover command message can be an RRC reconfiguration message and the conditional handover complete message can be an RRC reconfiguration complete message.

The "full" C-MN configuration is a complete and self-contained configuration (i.e. full configuration). The first/second full configuration indication (an information element (IE)) indicates the "full" C-MN configuration is a complete and self-contained configuration (i.e. full configuration). The UE 102 can directly use the full C-MN configuration to communicate with the C-MN 106B without referring to the first MN configuration according to the first/second full configuration indication. The full C-MN configuration can include multiple configuration parameters for the UE 102 to communicate with the C-MN 106B via the C-PCell 126B. The multiple configuration parameters may configure radio resources for the UE 102 to communicate with the C-MN 106B via the C-PCell 126B and zero, one, or more candidate secondary cells (C-SCells) of the C-MN 106B. The multiple configuration parameters may configure zero, one, or more radio bearers. The one or more radio bearers can include SRB(s) and/or DRB(s). The SRB(s) may include SRB1 and/or SRB2.

The first MN configuration can include multiple configuration parameters for the UE 102 to communicate with the MN 104 via the PCell and zero, one, or more secondary cells (SCells) of the MN 104. The multiple configuration parameters may configure radio resources for the UE 102 to communicate with the MN 104 via the PCell and zero, one, or more SCells of the MN 104. The multiple configuration parameters may configure zero, one, or more radio bearers. The one or more radio bearers can include SRB(s) and/or DRB(s). The SRB(s) may include SRB1 and/or SRB2.

In some implementation, the MN 104 can include the full C-MN configuration and a condition configuration configuring the condition 916 in the RRC reconfiguration message 912.

In some implementations, the full C-MN configuration can include a group configuration (CellGroupConfig) IE that configures the C-PCell 126B and may configure zero, one, or more C-SCells of the C-MN 106B. In one implementation, the full C-MN configuration can be a RRCReconfiguration message, RRCReconfiguration-IEs or the CellGroupConfig IE conforming to 3GPP TS 38.331. The first/second full configuration indication may be a field or an IE conforming to 3GPP TS 38.331. In other implementations, the full C-MN configuration can include a RadioResourceConfigDedicated IE and/or a MobilityControlInfo IE configuring the C-PCell 126B and may or may not include SCellToAddModList IE configuring one or more C-SCells of the C-MN 106B. In one implementation, the full C-MN configuration can be a RRCConnectionReconfiguration message or RRCConnectionReconfiguration-IEs conforming to 3GPP TS 36.331. The first/second full configuration indication may be a field or an IE conforming to 3GPP TS 36.331.

In some implementations, the first MN configuration can include a CellGroupConfig IE that configures the PCell and may configure zero, one, or more SCells of the MN 104. In one implementation, the MN configuration can be a RRCReconfiguration message, RRCReconfiguration-IEs or the CellGroupConfig IE conforming to 3GPP TS 38.331. In other implementations, the first MN configuration can include a RadioResourceConfigDedicated IE and/or a MobilityControlInfo IE configuring the PCell and may or may not include SCellToAddModList IE configuring one or more SCells of the MN 104.

In some cases, the UE 102 may receive one or more conditions (discussed below in singular for convenience) in the RRC reconfiguration message at event 912. The UE 102 may use the one or more conditions to determine whether to connect to the C-PCell 126B. If the UE 102 determines that the condition is satisfied, the UE 102 connects to the C-PCell 126B. If the UE 102 does not determine that the condition is satisfied, the UE 102 does not connect to the C-PCell 126B.

In some implementations, the C-MN 106B may consist of CU 172 and one or more DU 174 as shown in FIG. 2. The CU 172 receives the Conditional Handover Request message from the MN 104 and sends the Conditional Handover Request Acknowledge message. The DU 174 may generate the full C-MN configuration or at least a portion of the full C-MN configuration and send the full C-MN configuration or at least a portion of the full C-MN configuration to the CU 172. In case of the DU 174 generates at least a portion of the full C-MN configuration, the CU 172 may generate rest of the full C-MN configuration. In one implementation, the DU 174 can perform the random access procedure 918 with the UE 102 and identify the UE 102 in the random access procedure. In another implementation, the DU 174 can perform the random access procedure 918 with the UE 102 and forward the identity of the UE 102 received in the MAC PDU in the random access procedure to the CU 172. The CU 172 identifies the UE 102 according to the identity of the UE 102. In response to the identification, the CU 172 and DU 174 communicates with the UE 102 using the full C-MN configuration.

If the C-MN 106B identifies the UE 102 on the C-PCell 126B at event 918, the C-MN 106B (i.e., becoming the MN 106B) begins to transmit downlink control information (DCI) command(s) on physical downlink control channel(s) (PDCCH(s)), reference signal(s) or data to the UE 102 via the C-PCell 126B and/or one or more C-SCells (if configured in the full C-MN configuration) according to some configuration parameters in the full C-MN configuration. If the C-MN 106B identifies the UE 102 on the C-PCell 126B at event 918, the MN 106B may receive signal(s) on physical uplink control channel(s) (PUCCH(s)), sounding reference signal(s) or data from the UE 102 via the C-PCell 126B and/or one or more C-SCells (if configured in the full C-MN configuration) according to some configuration parameters in the full C-MN configuration. The UE 102 receives the DCI command(s) on PDCCH(s), reference signal(s) or data from the MN 106B via the C-PCell 126B and/or one or more C-SCells (if configured in the full C-MN configuration) according to some configuration parameters in the full C-MN configuration. The UE 102 may transmit signal(s) on PUCCH(s), sounding reference signal(s) or data to the MN 106B via the C-PCell 126B and one or more C-SCells (if configured in the full C-SN configuration) according to some configuration parameters in the full C-MN configuration.

As described in FIG. 9A, the MN 104 and C-MN 106B performs the conditional handover preparation procedure to configure C-PCell 126B for the UE 102 at events 904-912 in advance, before the C-PCell 126B becomes suitable for the UE 102. When the C-PCell 126B becomes suitable for the UE 102 (i.e., the UE 102 detects the corresponding condition), the UE 102 performs the random access procedure with the C-PCell 126B to quickly hand over to the C-PCell 126B. In contrast to the immediate handover procedure, the conditional handover technique discussed in this disclosure significantly reduces latency associated with handover configuration. More specifically, the MN 104 can request the C-MN 106B to generate a full MN configuration so that the MN 104 does not need to perform another conditional handover preparation procedure with the C-MN 106B due to transmitting a second MN configuration to the UE 102.

If the MN 104 is a gNB, the RRC reconfiguration message and the RRC reconfiguration complete message are a RRCReconfiguration message and a RRCConnectionReconfigurationComplete message respectively. If the MN 104 is an eNB or a ng-eNB, the RRC reconfiguration message and the RRC reconfiguration complete message are a RRCReconfiguration message and a RRCConnectionReconfigurationComplete message respectively.

Figure 9B:
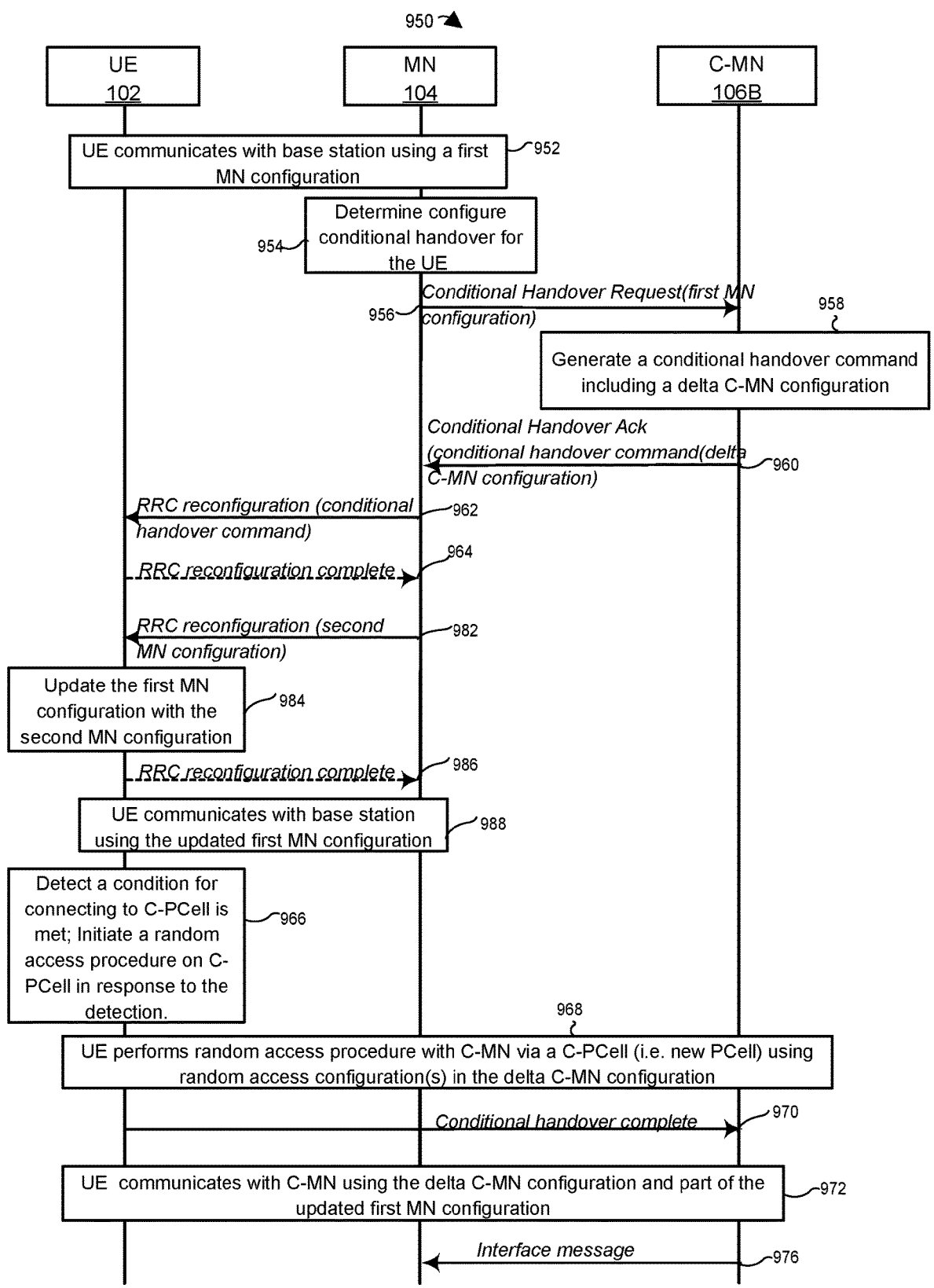
FIG. 9B is a messaging diagram of an example scenario in which the MN of FIG. 1A or 1B initiates a conditional handover procedure using a delta configuration, via a request to a C-MN, in accordance with the techniques of this disclosure.

Next, FIG. 9B illustrates a scenario 950 that involves conditional handover. In this scenario, the base station (BS) 104 operates as a MN and the BS 106B operates as a C-MN for the conditional handover. Events 952, 954, 956, 958, 960, 962, 964, 966, 968, 970, 972 and 976 in this scenario are similar to events 902, 904, 906, 908, 910, 912, 914, 916, 918, 920, 922 and 926 discussed with reference to FIG. 9A. The differences between the scenarios of FIG. 9A and FIG. 9B are discussed below.

The MN 104 determines 954 to configure conditional handover to the C-SN 106B for the UE 102. In response to the determination, the MN 104 sends 956 a Conditional Handover Request message including the first MN configuration to the C-MN 106B. The MN 104 does not request a full C-MN configuration in the Conditional Handover Request message. In response to the Conditional Handover Request message, the C-MN 106B generates a conditional handover command message including a delta C-MN configuration configuring a C-PCell and then sends 960 a Conditional Handover Request Acknowledge including the delta C-MN configuration to the MN 104. The MN 104 may generate the delta C-MN configuration according to the first MN configuration. The MN 104 transmits 962 an RRC reconfiguration message including the conditional handover command message to the UE 102.

Later on, the MN 104 determines to update the first MN configuration. In response to the determination, the MN 104 generates a second MN configuration which adds a new configuration parameter not in the first MN configuration, modifies a configuration parameter in the first MN configuration or releases a configuration parameter in the first MN configuration. The second MN configuration can be a delta MN configuration or a full MN configuration. The MN 104 sends 982 an RRC reconfiguration including the second MN configuration to the UE 102. The UE 102 updates 984 the first MN configuration according to the second MN configuration and transmits 986 an RRC reconfiguration complete message to the MN 104 in response to the RRC reconfiguration message 982. The UE 102 uses 988 the updated first MN configuration to communicate with the MN 104.

If the second MN configuration is a full MN configuration, the UE 102 replaces the first MN configuration with the second MN configuration to update the first MN configuration. If the second MN configuration is a delta MN configuration and includes a new configuration parameter not in the first MN configuration, the UE 102 adds the new configuration parameter to the first MN configuration. If the second MN configuration is a delta MN configuration and modifies a configuration parameter relative to the first MN configuration, the UE 102 updates the configuration parameter in the first MN configuration to a modified configuration parameter in accordance with the second MN configuration. If the second MN configuration is a delta MN configuration and releases a configuration parameter in the first MN configuration, the UE 102 releases the configuration parameter in the first MN configuration.

The UE 102 detects 966 a condition (or conditions) for connecting to the C-PCell 126B is met and initiates a random access procedure on the C-PCell 126B in response to the detection. For convenience, the discussion below refers to the condition or a configuration in singular, but it will be understood that it can be one or multiple conditions or include one or multiple configuration parameters. In response to the initiation, the UE 102 performs 968 a random access procedure with the C-MN 106B via the C-PCell 126B (i.e. new PCell) using a random access configuration in the delta C-MN configuration.

The UE 102 may disconnect from the PCell in response to the initiation or the detection 966. After the UE 102 successfully complete the random access procedure 968, the UE 102 communicates 972 with the MN 106B using the delta C-MN configuration and at least a portion of the updated first MN configuration. In some implementations, the UE 102 may release the rest of the updated first MN configuration parameters before event 972 so that the UE 102 does not use the rest of the updated first MN configuration parameters to communicate with the MN 106B at event 972. In other implementations, the UE 102 may also use the rest of the updated first MN configuration parameters to communicate with the MN 106B at event 972.

The "delta" C-MN configuration is not a complete configuration and does not include a full configuration indication. The UE 102 cannot only use the delta C-MN configuration to communicate with the MN 106B; the UE 102 must also refer to the updated first SN configuration stored in the UE 102. The delta C-SN configuration can include one or multiple configuration parameters for the UE 102 to communicate with the MN 106B via the C-PCell 126B. The multiple configuration parameters may configure radio resources for the UE 102 to communicate with the MN 106B via the C-PCell 126B and zero, one, or more C-SCells of the MN 106B. The multiple configuration parameters may or may not configure zero, one, or more radio bearers. The one or more radio bearers can include an SRB and/or DRB(s). The multiple configuration parameters may or may not include a measurement configuration and/or a security configuration.

The first MN configuration can include multiple configuration parameters for the UE 102 to communicate with the MN 104 via the PCell and zero, one, or more secondary cells (SCells) of the MN 104. The multiple configuration parameters may configure radio resources for the UE 102 to communicate with the MN 104 via the PSCell and zero, one, or more SCells of the MN 104. The multiple configuration parameters may configure zero, one, or more radio bearers. The one or more radio bearers can include an SRB and/or data radio bearer(s) (DRB(s)). In some cases, the second MN configuration can modify or release one of the multiple configuration parameters. In other cases, the second MN configuration may add a new configuration parameter not in the first MN configuration.

In some implementation, the MN 104 can include the delta C-MN configuration and a condition configuration configuring the condition 966 in the RRC reconfiguration message 962.

Figure 10A:
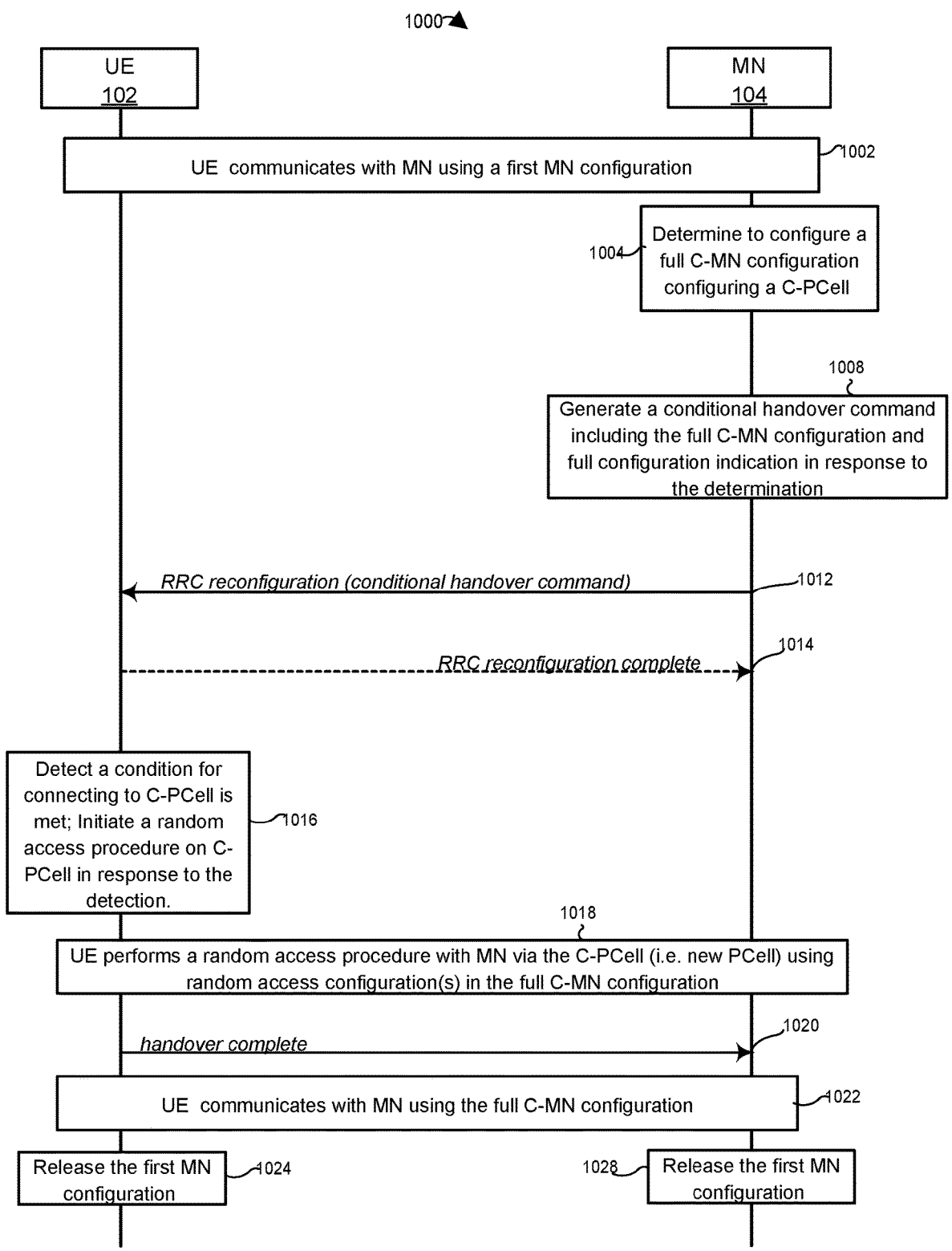
FIG. 10A is a messaging diagram of an example scenario in which the MN of FIG. 1A or 1B initiates a conditional handover procedure using a full configuration, in accordance with the techniques of this disclosure.

Next, FIG. 10A illustrates another scenario 1000 that involves conditional handover, similar to FIG. 9A. In this scenario, the base station (BS) 104 operates as a MN for the conditional handover. The differences between the scenarios of FIG. 9A and FIG. 10A are discussed below.

In the scenario 1000 of the FIG. 10A, the UE 102 communicates 1002 with the MN 104 via a PCell (not shown in FIG. 1) by using a first MN configuration. The UE 102 may be in single connectivity (SC) with the MN 104 or in DC with the MN 104 and SN 106A. The MN 104 determines 1004 to configure a full C-MN configuration for the UE 102. The full C-MN configuration configures C-PCell 124 of the MN 104. The MN 104 can make this determination based on one or more measurement results received from the UE directly (e.g., via an SRB established between the UE 102 and the MN 104 or via a physical control channel), or obtained by the MN 104 from measurements on signals, control channels or data channels received from the UE 102, for example, or another suitable event. In response to the determination, the MN 104 generates a condition handover command message including the full C-MN configuration and a first full configuration indication. Then the MN 104 transmits 1012 an RRC reconfiguration message including the conditional handover command message to the UE 102.

The UE 102 may transmit 1014 an RRC reconfiguration complete message to the MN 104 in response to the RRC reconfiguration message 1012. In some alternative implementations, the MN 104 may include the first full configuration indication in the RRC reconfiguration message 1012 instead of the full C-MN configuration.

Later on, UE 102 detects 1016 a condition (or conditions) for connecting to the C-PCell 124 is met and initiates a random access procedure on the C-PCell 124 in response to the detection. For convenience, the discussion below refers to the condition or a configuration in singular, but it will be understood that it can be one or multiple conditions or include one or multiple configuration parameters. In response to the initiation, the UE 102 performs 1018 the random access procedure with the MN 104 via the C-PCell 124 using a random access configuration in the full C-MN configuration. The UE 102 may disconnect from the PCell of the MN 104 in response to the initiation or the detection 1016. In some implementations, the random access procedure can be a 4-step random access procedure or a 2-step random access procedure. In other implementations, the random access procedure can be a contention-based random access procedure or a contention-free random access procedure. The UE 102 may transmit 1020 a conditional handover complete message via the C-PCell 124 to the MN 104 in/after 1018 the random access procedure in response to the conditional handover command message.

After the UE 102 successfully completes the random access procedure 1018 or transmitting the conditional handover complete message, the UE 102 communicates 1022 with the MN 104 via the C-PCell 124 (i.e., new PCell 124) by using the full C-MN configuration. The UE 102 releases 1024 the first MN configuration in response to the first full configuration indication. The MN 106B identifies the UE 102 connects to the C-PCell 124 if the MN 104 finds an identity of the UE 102 in a MAC PDU received from the UE 102 in the random access procedure 1018. The MN 104 includes the identity of the UE 102 in the full C-MN configuration. In other implementations, the MN 104 identifies the UE 102 connects to the C-PCell 124 if the MN 104 receives a dedicated random access preamble from the UE 102 in the random access procedure 1018. The MN 104 includes the dedicated random access preamble in the full C-MN configuration. The MN 104 releases 1028 the first MN configuration in response to or after identifying the UE 102 connects to the C-PCell 124.

The "full" C-MN configuration is a complete and self-contained configuration (i.e. full configuration). The first/second full configuration indication (an information element (IE)) indicates the "full" C-MN configuration is a complete and self-contained configuration (i.e. full configuration). The UE 102 can directly use the full C-MN configuration to communicate with the MN 104 without referring to the first MN configuration according to the first full configuration indication. The full C-MN configuration can include multiple configuration parameters for the UE 102 to communicate with the MN via the C-PCell 124. The multiple configuration parameters may configure radio resources for the UE 102 to communicate with the MN 104 via the C-PCell 124 and zero, one, or more candidate secondary cells (C-SCells) of the MN 104. The multiple configuration parameters may configure zero, one, or more radio bearers. The one or more radio bearers can include SRB(s) and/or DRB(s). The SRB(s) may include SRB1 and/or SRB2. Examples of the first MN configuration, the second MN configuration and the full C-MN configuration can refer to the description for FIG. 9A.

In some implementation, the MN 104 can include the full C-MN configuration and a condition configuration configuring the condition 1016 in the RRC reconfiguration message 1012.

In some cases, the UE 102 may receive one or more conditions (discussed below in singular for convenience) in the RRC reconfiguration message at event 1012. The UE 102 may use the one or more conditions to determine whether to connect to the C-PCell 124. If the UE 102 determines that the condition is satisfied, the UE 102 connects to the C-PCell 124. If the UE 102 does not determine that the condition is satisfied, the UE 102 does not connect to the C-PCell 124.

In some implementations, the MN 104 may consist of CU 172 and one or more DU 174 as shown in FIG. 2. A first DU may generate the first MN configuration and the second MN configuration. A second DU 174 may generate the full C-MN configuration or at least a portion of the full C-MN configuration and send the full C-MN configuration or at least a portion of the full C-MN configuration to the CU 172. In case of the second DU 174 generates at least a portion of the full C-MN configuration, the CU 172 may generate rest of the full C-MN configuration. In one implementation, the second DU 174 can perform the random access procedure 1018 with the UE 102 and identify the UE 102 in the random access procedure 1018. In another implementation, the second DU 174 can perform the random access procedure 1018 with the UE 102 and forward the identity of the UE 102 received in the MAC PDU in the random access procedure to the CU 172. The CU 172 identifies the UE 102 according to the identity of the UE 102. In response to the identification, the CU 172 and second DU 174 communicates with the UE 102 using the full C-MN configuration.

If the MN 104 identifies the UE 102 on the C-PCell 124 at event 1018, the MN 104 begins to transmit downlink control information (DCI) command(s) on PDCCH(s), reference signal(s) or data to the UE 102 via the C-PCell 124 and/or one or more C-SCells (if configured in the full C-MN configuration) according to some configuration parameters in the full C-MN configuration. If the MN 104 identifies the UE 102 on the C-PCell 124 at event 1018, the MN 104 may receive signal(s) on PUCCH(s), sounding reference signal(s) or data from the UE 102 via the C-PCell 124 and/or one or more C-SCells (if configured in the full C-MN configuration) according to some configuration parameters in the full C-MN configuration. The UE 102 receives the DCI command(s) on PDCCH(s), reference signal(s) or data from the MN 104 via the C-PCell 124 and/or one or more C-SCells (if configured in the full C-MN configuration) according to some configuration parameters in the full C-MN configuration. The UE 102 may transmit signal(s) on PUCCH(s), sounding reference signal(s) or data to the MN 104 via the C-PCell 124 and one or more C-SCells (if configured in the full C-SN configuration) according to some configuration parameters in the full C-MN configuration.

As described in FIG. 10A, the MN 104 configures C-PCell 124 for the UE 102 at events 1004-1012 in advance, before the C-PCell 124 becomes suitable for the UE 102. When the C-PCell 124 becomes suitable for the UE 102 (i.e., the UE 102 detects the corresponding condition), the UE 102 performs the random access procedure with the C-PCell 124 to quickly hand over to the C-PCell 124. In contrast to the immediate handover procedure, the conditional handover technique discussed in this disclosure significantly reduces latency associated with handover configuration. More specifically, the MN 104 can generate a full MN configuration for the conditional handover so that the MN 104 does not need to send another RRC reconfiguration message updating a delta C-MN configuration stored in the UE due to transmitting a second MN configuration to the UE 102.

If the MN 104 is a gNB, the RRC reconfiguration message and the RRC reconfiguration complete message are a RRCReconfiguration message and a RRCConnectionReconfigurationComplete message respectively. If the MN 104 is an eNB or a ng-eNB, the RRC reconfiguration message and the RRC reconfiguration complete message are a RRCReconfiguration message and a RRCConnectionReconfigurationComplete message respectively.

Figure 10B:
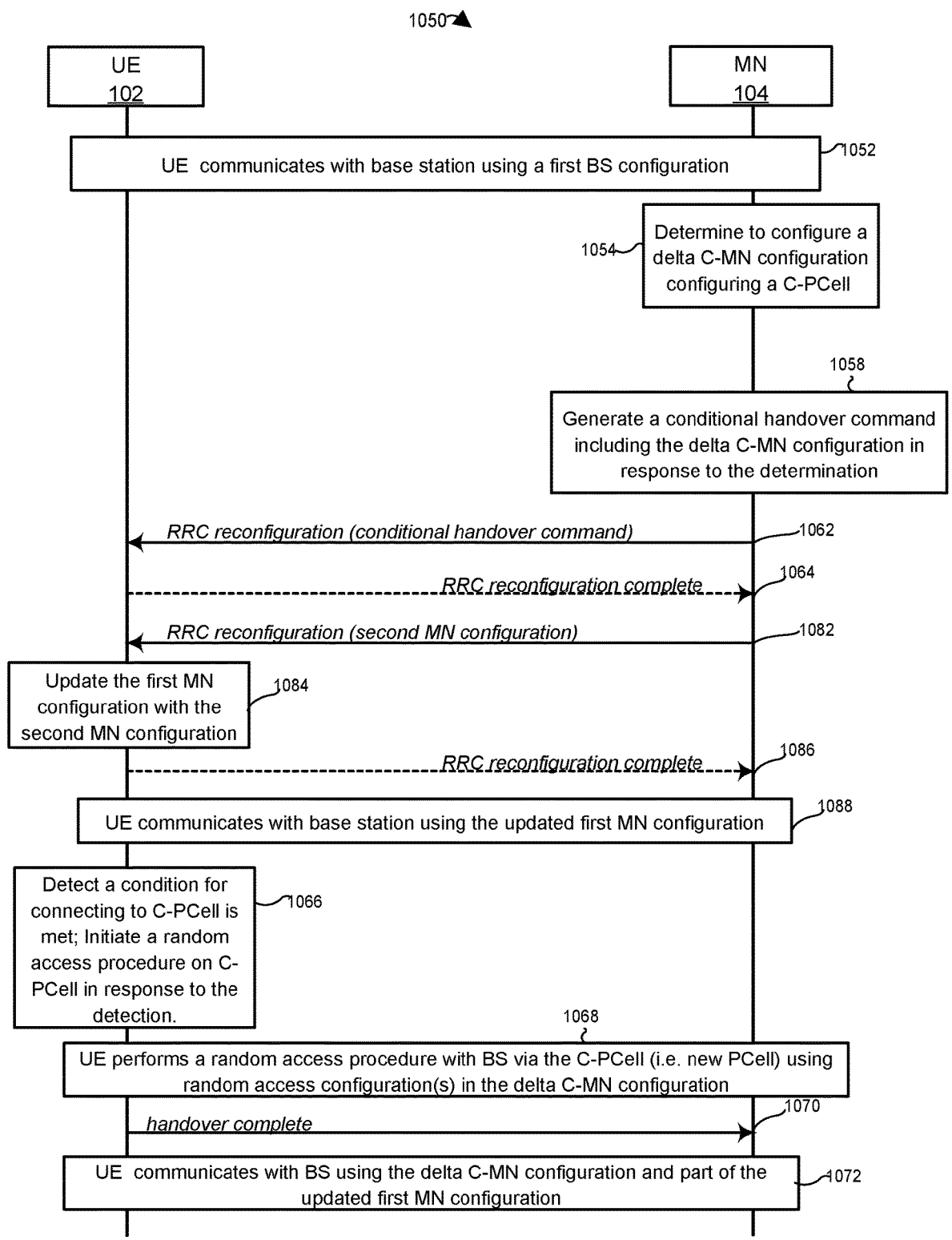
FIG. 10B is a messaging diagram of an example scenario in which the MN of FIG. 1A or 1B initiates a conditional handover procedure using a delta configuration, in accordance with the techniques of this disclosure.

Next, FIG. 10B illustrates another scenario 1050 that involves conditional handover, similar to FIG. 10A and FIG. 9B. In this scenario, the base station (BS) 104 operates as a MN for the conditional handover. Events in this scenario are similar to events discussed with reference to FIG. 9B and FIG. 10A. The differences between the scenarios of FIG. 9A and FIGS. 9B and 10A are discussed below.

In the scenario 1050 of the FIG. 10B, the UE 102 communicates 1052 with the MN 104 via a PCell (not shown in FIG. 1) by using a first MN configuration. The UE 102 may be in single connectivity (SC) with the MN 104 or in DC with the MN 104 and SN 106A. The MN 104 determines 1054 to configure a delta C-MN configuration for the UE 102. The delta C-MN configuration configures C-PCell 124 of the MN 104. The MN 104 can make this determination based on one or more measurement results received from the UE directly (e.g., via an SRB established between the UE 102 and the MN 104 or via a physical control channel), or obtained by the MN 104 from measurements on signals, control channels or data channels received from the UE 102, for example, or another suitable event. In response to the determination, the MN 104 generates 1058 a condition handover command message including the delta C-MN configuration. The MN 104 generates the delta C-MN configuration according to the first MN configuration. Then the MN 104 transmits 1062 an RRC reconfiguration message including the conditional handover command message to the UE 102. The UE 102 may transmit 1014 an RRC reconfiguration complete message to the MN 104 in response to the RRC reconfiguration message 1012.

Later on, the MN 104 determines to update the first MN configuration. In response to the determination, the MN 104 generates a second MN configuration which adds a new configuration parameter not in the first MN configuration, modifies a configuration parameter in the first MN configuration, or releases a configuration parameter in the first MN configuration. The MN 104 sends 1082 an RRC reconfiguration including the second MN configuration to the UE 102. The UE 102 updates 1084 the first SN configuration according to the second SN configuration and transmits 1086 an RRC reconfiguration complete message to the MN 104 in response to the RRC reconfiguration message 1082. The UE 102 uses 1088 the updated first MN configuration to communicate with the MN 104.

If the second MN configuration includes a new configuration parameter not in the first MN configuration, the UE 102 adds the new configuration parameter to the first MN configuration. If the second MN configuration modifies a configuration parameter relative to the first MN configuration, the UE 102 updates the configuration parameter in the first MN configuration to a modified configuration parameter in accordance with the second MN configuration. If the second MN configuration releases a configuration parameter in the first MN configuration, the UE 102 releases the configuration parameter in the first MN configuration.

The UE 102 detects 1066 the fulfillment of a condition (or conditions) for connecting to the C-PCell 126B and initiates a random access procedure on the C-PCell 124 in response to the detection. For convenience, the discussion below refers to the condition or a configuration in singular, but it will be understood that it can be one or multiple conditions or include one or multiple configuration parameters. In response to the initiation, the UE 102 performs 1068 a random access procedure with the MN 104 via the C-PCell 124 (i.e. new PCell) using a random access configuration in the delta C-MN configuration.

The UE 102 may disconnect from the PCell in response to the initiation or the detection 1066. After the UE 102 successfully complete the random access procedure 1068, the UE 102 communicates 1072 with the MN 104 using the delta C-MN configuration and at least a portion of the updated first MN configuration. In some implementations, the UE 102 may release the rest of the updated first MN configuration parameters before event 1072 so that the UE 102 does not use the rest of the updated first MN configuration to communicate with the MN 104 at event 1072. In other implementations, the UE 102 may also use the rest of the updated first MN configuration parameters to communicate with the MN 104 at event 1072.

The "delta" C-MN configuration is not a complete configuration and does not include a full configuration indication. The UE 102 cannot use the delta C-MN configuration alone to communicate with the MN 104. Instead, the UE 102 needs to refer to both the delta C-MN configuration and the updated first SN configuration stored in the UE 102. The delta C-SN configuration can include one or multiple configuration parameters for the UE 102 to communicate with the MN 104 via the C-PCell 124. The multiple configuration parameters may configure radio resources for the UE 102 to communicate with the MN 104 via the C-PCell 124 and zero, one, or more C-SCells of the MN 104. The multiple configuration parameters may or may not configure zero, one, or more radio bearers. The one or more radio bearers can include an SRB and/or DRB(s). The multiple configuration parameters may or may not include a measurement configuration and/or a security configuration.

The first MN configuration can include multiple configuration parameters for the UE 102 to communicate with the MN 104 via the PCell and zero, one, or more secondary cells (SCells) of the MN 104. The multiple configuration parameters may configure radio resources for the UE 102 to communicate with the MN 104 via the PSCell and zero, one, or more SCells of the MN 104. The multiple configuration parameters may configure zero, one, or more radio bearers. The one or more radio bearers can include an SRB and/or data radio bearer(s) (DRB(s)). In some cases, the second MN configuration can modify or release one of the multiple configuration parameters. In other cases, the second MN configuration may add a new configuration parameter not in the first MN configuration.

In some implementations, the MN 104 can include the delta C-MN configuration and a condition configuration configuring the condition 1066 in the RRC reconfiguration message 1062.

Figure 11A:
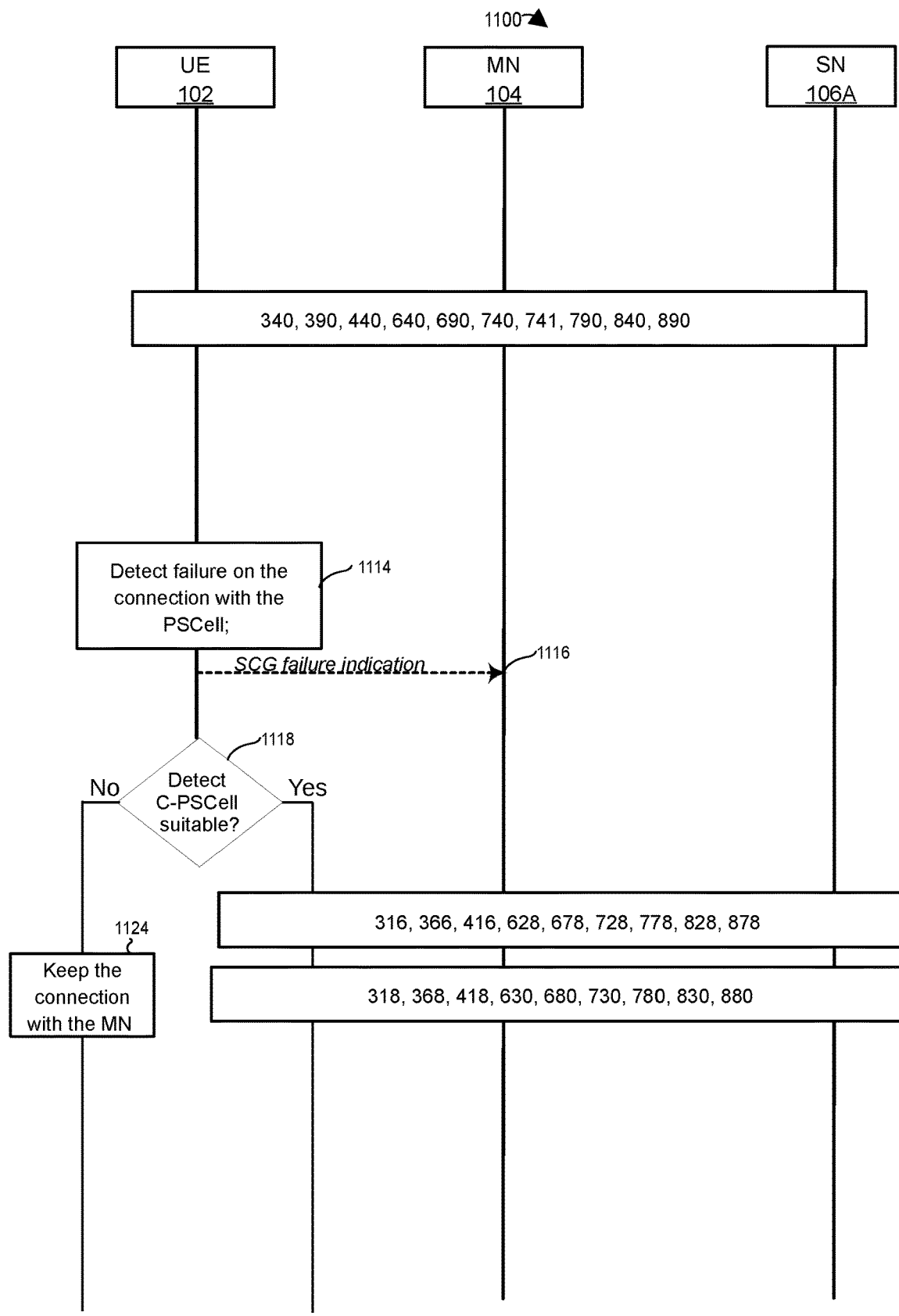
FIG. 11A is a messaging diagram of an example scenario in which the SN of FIG. 1A or 1B initiates a conditional PSCell change procedure prior to the UE detecting failure on a connection with the PSCell, in accordance with the techniques of this disclosure.

Next, FIG. 11A illustrates an example scenario involving a conditional PSCell change procedure prior to UE 102 detecting failure on a connection with the PSCell.

Referring first to FIG. 11A, in scenario 1100, the UE 102 is in DC with the MN 104 and SN 106A, communicates with the SN 106A via a PSCell using an SN configuration, and receives, from the SN 106A or MN 104, a C-SN configuration (e.g., a full C-SN configuration, a delta C-SN configuration) for configuring a C-PSCell and any condition(s) associated with conditional PSCell change, similar to events 340, 390, 440, 640, 690, 740, 741, 790, 840, and 890.

Subsequently, the UE 102 detects 1114 a failure on the connection with the PSCell. In some embodiments, the UE 102 sends 1116 an SCG failure indication to the MN 104. In some embodiments, the UE 102 consistently sends 1116 an SCG failure indication. And in other embodiments, the UE 102 omits sending an SCG failure indication when the UE 102 has an available C-PSCell to recover the connection.

In response to detecting the failure, the UE 102 detects 1118 whether the C-PSCell is suitable. That is, if the UE 102 detects that condition(s) for connecting to the C-PSCell are satisfied, the UE 102 performs random access procedure with the SN 106A via the C-PSCell using random access configuration(s) in the C-SN configuration, similar to events 316, 366, 416, 628, 728, 778, 828, and 878. As a result, the UE 102 is in DC with the MN 104 and the SN 106A via C-PSCell by using the C-SN configuration, similar to events 318, 368, 418, 630, 730, 780, 830, and 880.

If the UE 102 detects that condition(s) for connecting to the C-PSCell are not satisfied, the UE 102 keeps 1124 the connection with the MN 104. In some embodiments, the UE 102 starts a timer at event 1118 to set a time period for connecting to a suitable C-PSCell. If no suitable C-PSCell is detected and connected within the preconfigured time period, then the UE 102 discontinues its search for a suitable C-PSCell and keeps 1124 the connection with the MN 104.

Figure 11B:
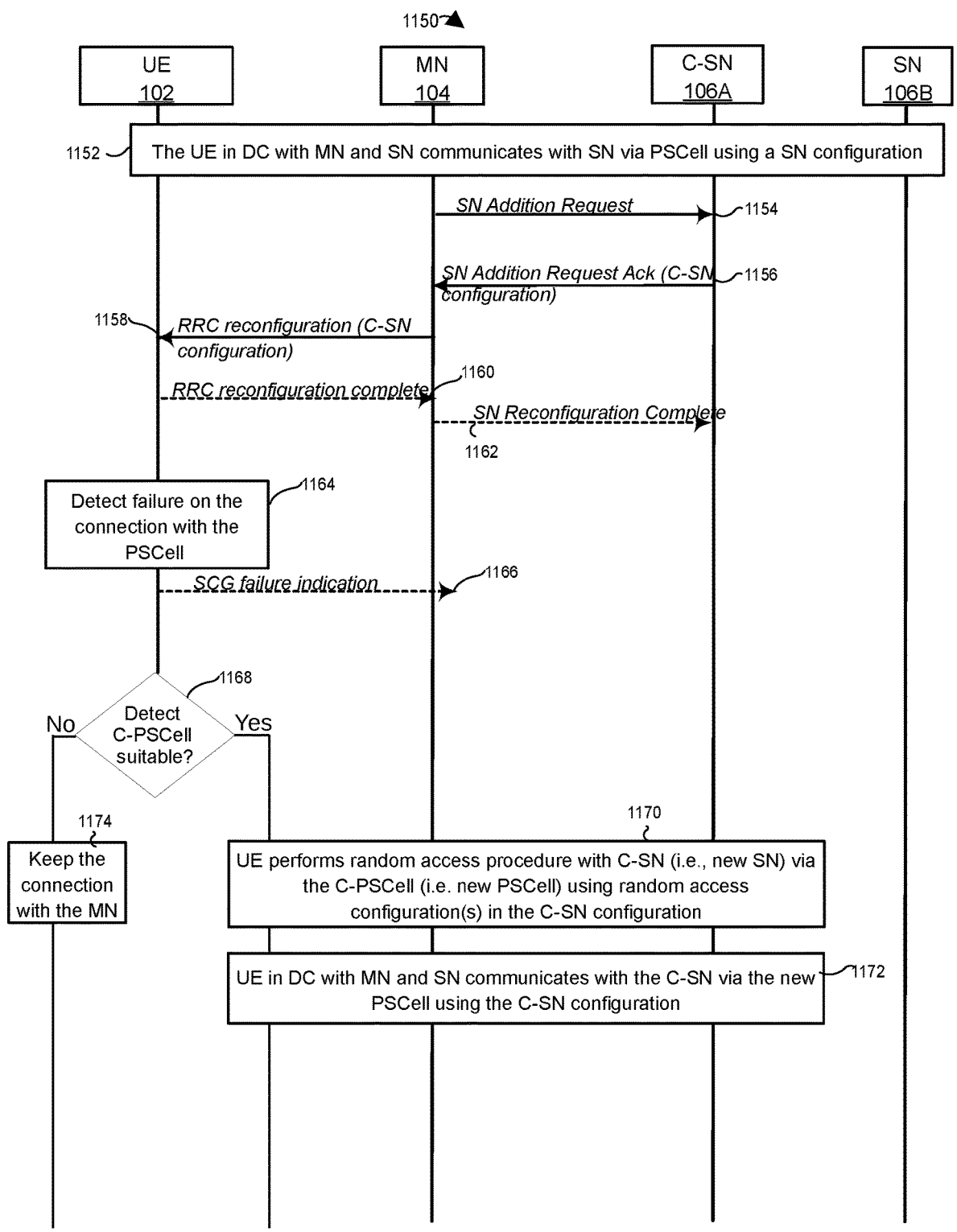
FIG. 11B is a messaging diagram of an example scenario in which the MN of FIG. 1A or 1B initiates a conditional SN change procedure prior to the UE detecting failure on a connection with the PSCell, in accordance with the techniques of this disclosure.

Next, FIG. 11B illustrates an example scenario involving a conditional SN change procedure prior to UE 102 detecting failure on a connection with a PSCell.

In the beginning, the UE 102 in DC with the MN 104 and SN 106A communicates 1152 data with MN 104 via a PCell and communicates 1152 data with SN 106A via a PSCell (i.e., a cell other than cell 126A), similar to event 502 and 552. The MN 104 sends 1154 an SN Addition Request message to the C-SN 106A for the purposes of the conditional SN change procedure, similar to events 506 and 556. In response to the SN Addition Request message, the C-SN 106A generates a full C-SN configuration for the conditional SN change from the SN 106B to the C-SN 106A, includes a full configuration indication in the full C-SN configuration, and includes the full C-SN configuration in an SN Addition Request Acknowledge message. The SN 106A sends 1156 the SN Addition Request Acknowledge message to the MN 104 in response to the SN Addition Request message, similar to events 510 and 560. Then the MN 104 transmits 1158 an RRC reconfiguration message including the full C-SN configuration to the UE 102, similar to events 512 and 562. In some implementations, the UE 102 may transmit 1160 an RRC reconfiguration complete message to the MN 104 in response to the RRC reconfiguration message, similar to events 514 and 564. The MN 104 may send 1162 an SN Reconfiguration Complete message to the C-SN 106A in response to the RRC reconfiguration complete message, similar to events 516 and 566.

Subsequently, the UE 102 detects 1164 a failure on the connection with the PSCell, similar to event 1114. In some embodiments, the UE 102 sends 1166 an SCG failure indication to the MN 104, similar to event 1116

In response to detecting the failure, the UE 102 detects 1168 whether the C-PSCell is suitable, similar to event 1118 That is, if the UE 102 detects that condition(s) for connecting to the C-PSCell are satisfied, the UE 102 performs 1170 random access procedure with the C-SN 106A via the C-PSCell using random access configuration(s) in the C-SN configuration. As a result, the UE 102 is 1172 in DC with the MN 104 and the C-SN 106A via C-PSCell by using the C-SN configuration.

Figure 12:
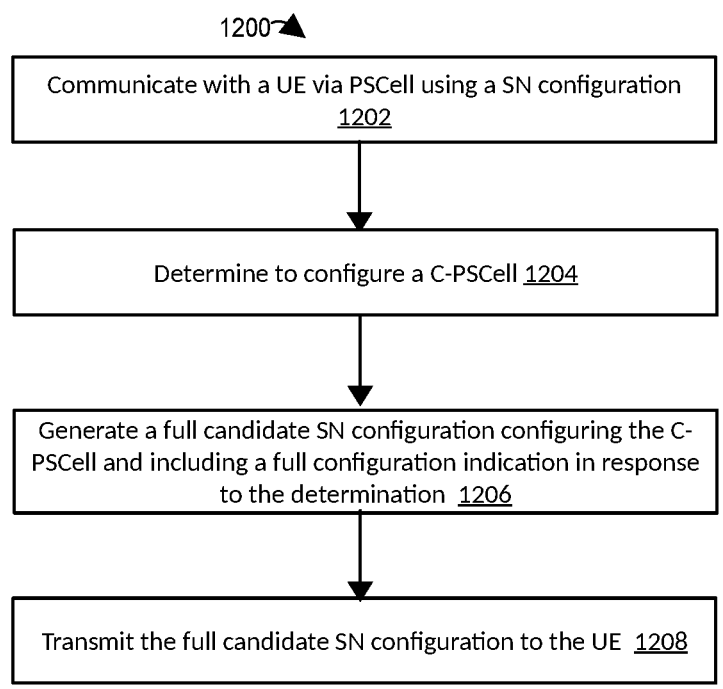
FIG. 12 is a flow diagram of an example method for initiating a conditional PSCell change procedure, which can be implemented in the SN of FIG. 1A or 1B, in accordance with the techniques of this disclosure.

FIG. 12 depicts an example method 1200 for initiating a conditional PSCell change procedure, which SN 106A or another suitable SN can implement.

The method 1200 begins at block 1202, where the SN 106A communicates with the UE 102 via PSCell using an SN configuration (event 302). The SN 106A at block 1204 then determines to configure a C-PSCell (event 304, 404, 508), and at block 1206 generates a full C-SN configuration configuring the C-PSCell and a full configuration indication. Subsequently, the SN 106A at block 1208 transmits the full C-SN configuration and the full configuration indication to the UE 102 (events 306, 356, 408, 510, 560).

Figure 13A:
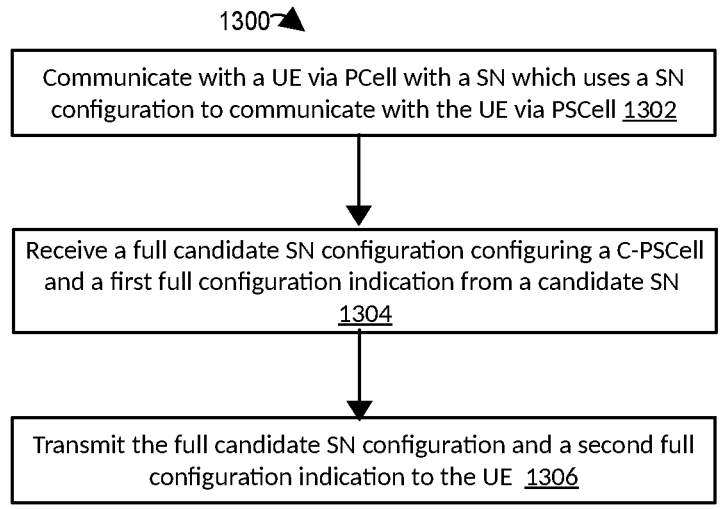
FIG. 13A is a flow diagram of an example method for initiating a conditional PSCell change procedure, which can be implemented in the MN of FIG. 1A or 1B, in accordance with the techniques of this disclosure.

FIG. 13A depicts an example method 1300 for initiating a conditional PSCell change procedure, which MN 104 or another suitable MN can implement.

The method 1300 begins at block 1302, where the MN 104 communicates with the UE 102 via PCell, and the UE 102 communicates with an SN 106A via PSCell using an SN configuration (event 302, 352, 502, 552). The MN 104 at block 1304 then receives, from the SN 106A or C-SN 106A, a full C-SN configuration configuring the C-PSCell and a full configuration indication (event 306, 356, 510). Subsequently, the MN 104 at block 1306 transmits the full C-SN configuration and a second full configuration indication to the UE 102 (events 308, 358, 512).

Figure 13B:
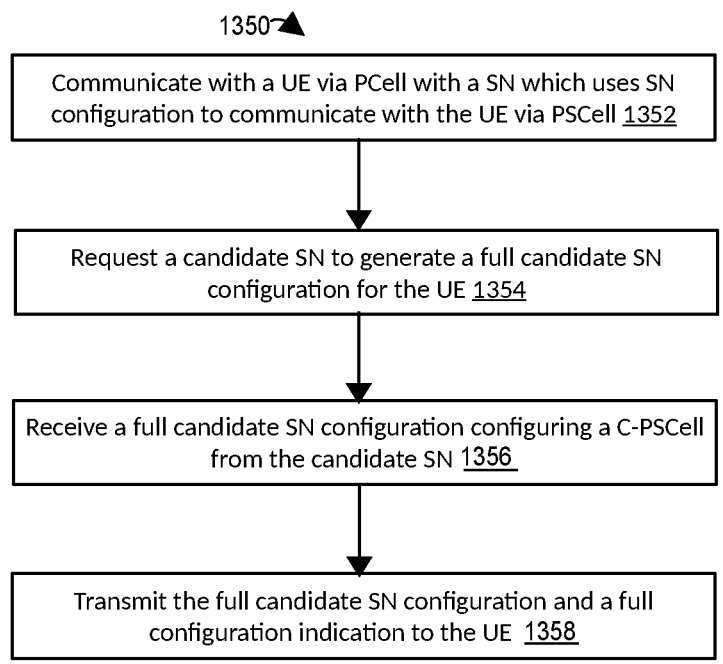
FIG. 13B is a flow diagram of another example method for initiating a conditional PSCell change procedure, which can be implemented in the MN of FIG. 1A or 1B, in accordance with the techniques of this disclosure.

FIG. 13B depicts an example method 1350 for initiating a conditional PSCell change procedure, which MN 104 or another suitable MN can implement.

The method 1350 begins at block 1352, where the MN 104 communicates with the UE 102 via PCell, and the UE 102 communicates with an SN 106A via PSCell using an SN configuration (event 302, 352, 502, 552). The MN 104 at block 1354 requests C-SN 106A to generate a full C-SN configuration for the UE 102 (event 554). The MN 104 at block 1356 then receives, from the C-SN 106A, a full C-SN configuration configuring the C-PSCell and a full configuration indication (event 560). Subsequently, the MN 104 at block 1356 transmits the full C-SN configuration and a second full configuration indication to the UE 102 (events 562).

Figure 14:
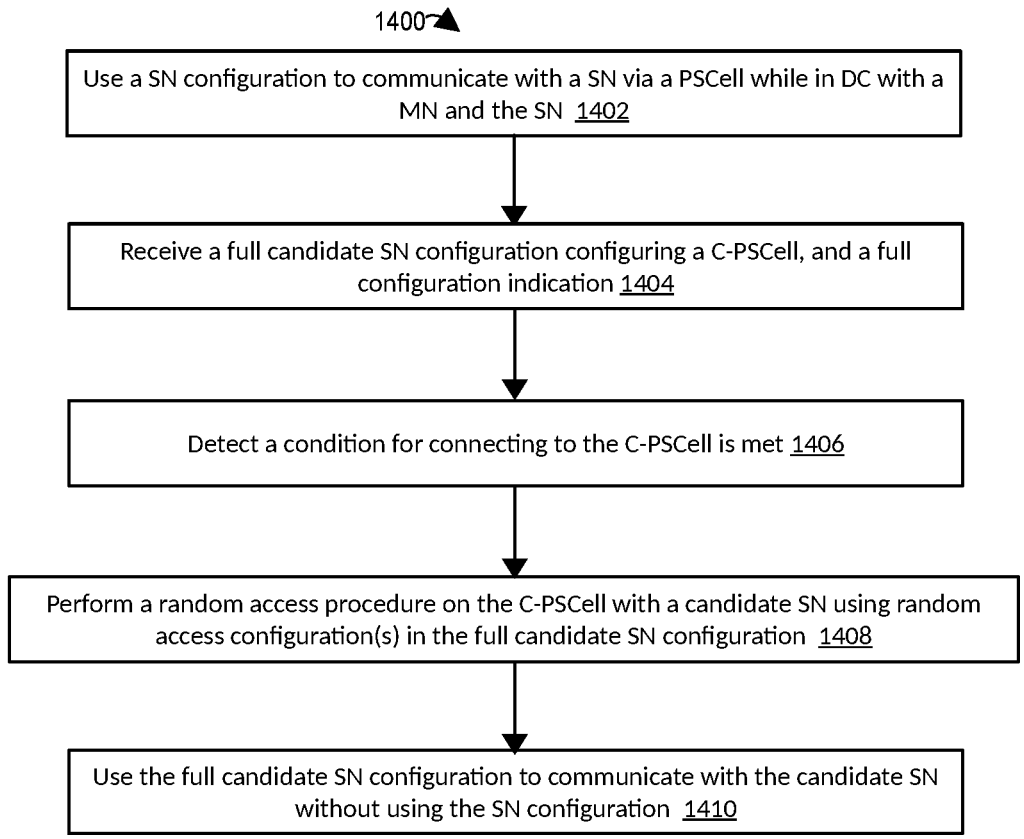
FIG. 14 is a flow diagram of an example method for initiating a conditional PSCell change procedure, which can be implemented in the UE of FIG. 1A or 1B, in accordance with the techniques of this disclosure.

FIG. 14 depicts an example method 1400 for initiating a conditional PSCell change procedure, which UE 102 or another suitable UE can implement.

The method 1400 begins at block 1402, where the UE 102 communicates with the SN 106A via PCell using an SN configuration while in DC with MN 104 (events 502, 552). The UE 102 at block 1404 then receives a full C-SN configuration configuring the C-PSCell and a full configuration indication (events 512, 562). Subsequently, the UE 102 at block 1406 detects that condition(s) for connecting to the C-PSCell are satisfied (events 518, 568). The UE 102 at block 1408 then performs a random access procedure on the C-PSCell with the C-SN 106A using random access configuration(s) in the full C-SN configuration (events 520, 570). The UE 102 at block 1410 then uses the full C-SN configuration to communicate with the C-SN 106A without using the SN configuration (events 522, 572).

Figure 15:
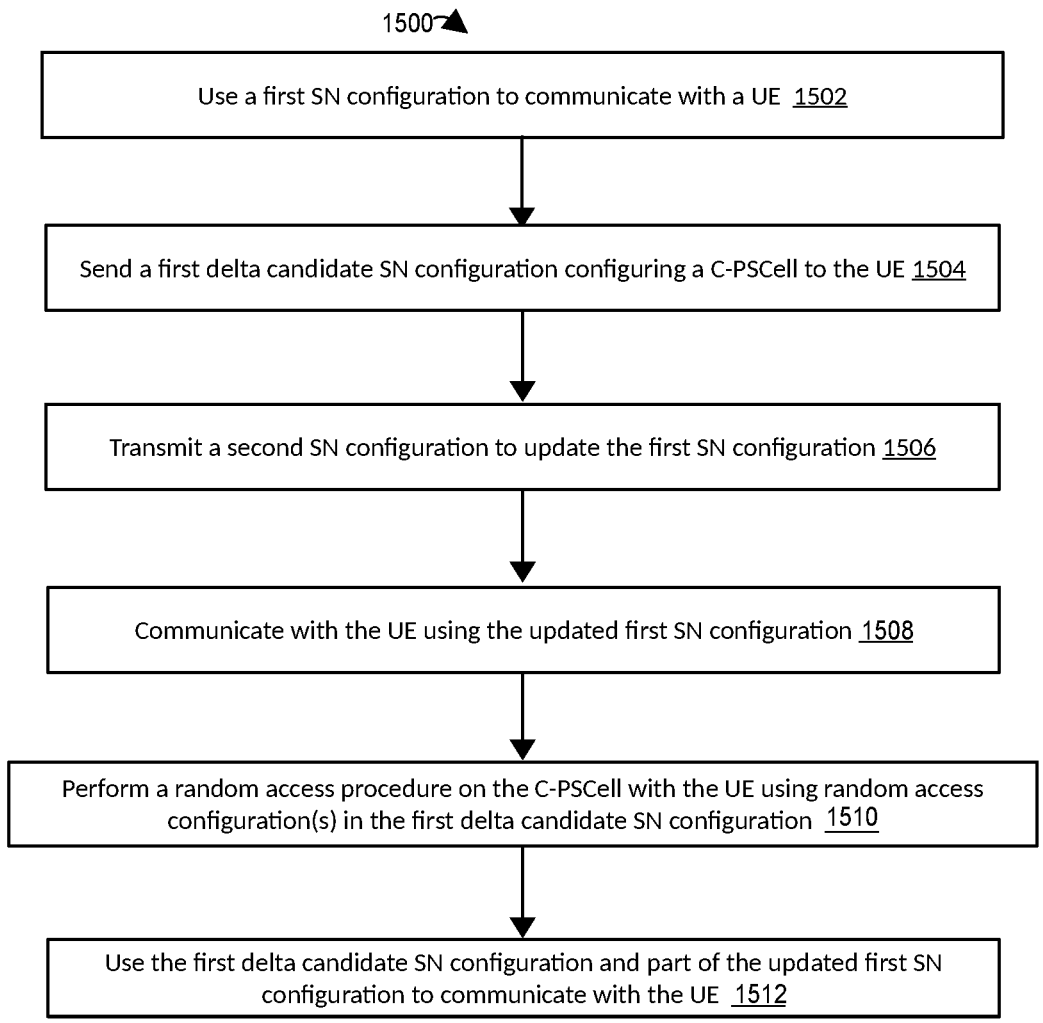
FIG. 15 is a flow diagram of another example method for initiating a conditional PSCell change procedure, which can be implemented in the SN of FIG. 1A or 1B, in accordance with the techniques of this disclosure.

FIG. 15 depicts an example method 1500 for initiating a conditional PSCell change procedure, which SN 106A or another suitable SN can implement.

The method 1500 begins at block 1502, where the SN 106A communicates with the UE 102 via PSCell using a first SN configuration (events 602, 652). The SN 106A at block 1504 then sends a first delta C-SN configuration configuring a C-PSCell to the UE 102 (events 606, 656). The SN 106A then at block 1506 transmits a second SN configuration (events 614, 666) to the UE 102 to update the first SN configuration, causing the UE 102 to update the first SN configuration in accordance with the second SN configuration (events 618, 668). The SN 106A at block 1508 communicates with the UE 102 using the updated first SN configuration (events 624, 674). Subsequently, the SN 106A at block 1510 performs a random access procedure on the C-PSCell with the UE 102 using random access configuration(s) in the first delta C-SN configuration (events 628, 678). The SN 106A at block 1512 uses the first delta C-SN configuration and at least a portion of the updated first SN configuration to communicate with the UE 102 (events 630, 680).

Figure 16:
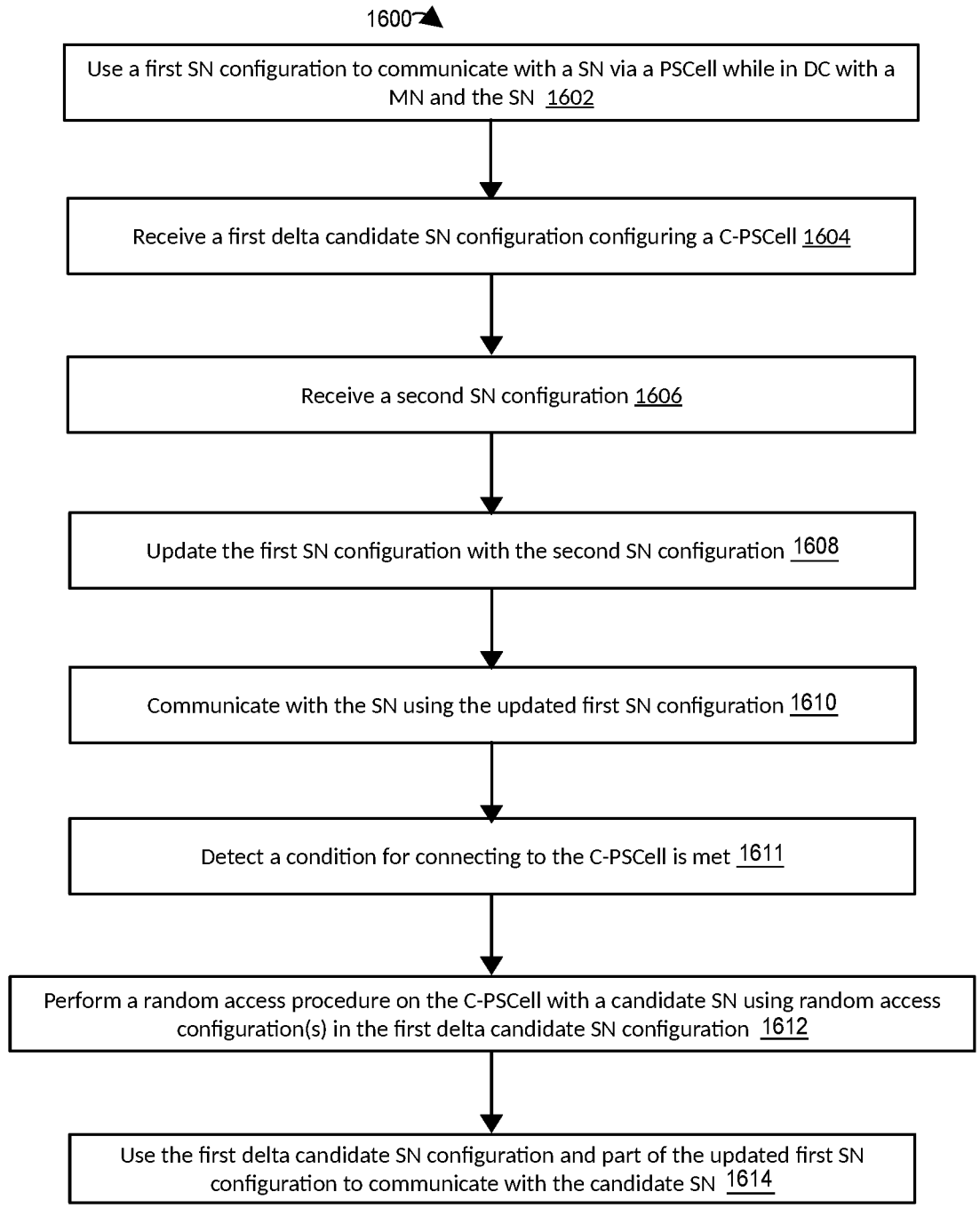
FIG. 16 is a flow diagram of an example method for initiating a conditional PSCell change procedure, which can be implemented in the UE of FIG. 1A or 1B, in accordance with the techniques of this disclosure.

FIG. 16 depicts an example method 1600 for initiating a conditional PSCell change procedure, which UE 102 or another suitable UE can implement.

The method 1600 begins at block 1602, where the UE 102 communicates with the SN 106A via PSCell using a first SN configuration while in DC with MN 104 (events 602, 652). The UE 102 at block 1604 then receives a first delta C-SN configuration configuring a C-PSCell (events 608, 656). The UE 102 then at block 1606 receives a second SN configuration configuring the C-PSCell (events 616, 666), causing the UE 102 to update the first SN configuration in accordance with the second SN configuration at block 1608 (events 618, 668). The UE 102 at block 1610 communicates with the SN 106A using the updated first SN configuration (events 624, 674). Subsequently, the UE 102 at block 1611 detects that a condition for connecting to the C-PSCell is satisfied (events 626, 676), and in response, at block 1612 performs a random access procedure on the C-PSCell with the UE 102 using random access configuration(s) in the first delta C-SN configuration (events 628, 678). The UE 102 at block 1614 uses the first delta C-SN configuration and at least a portion of the updated first SN configuration to communicate with the SN 106A (events 630, 680).

Figure 17:
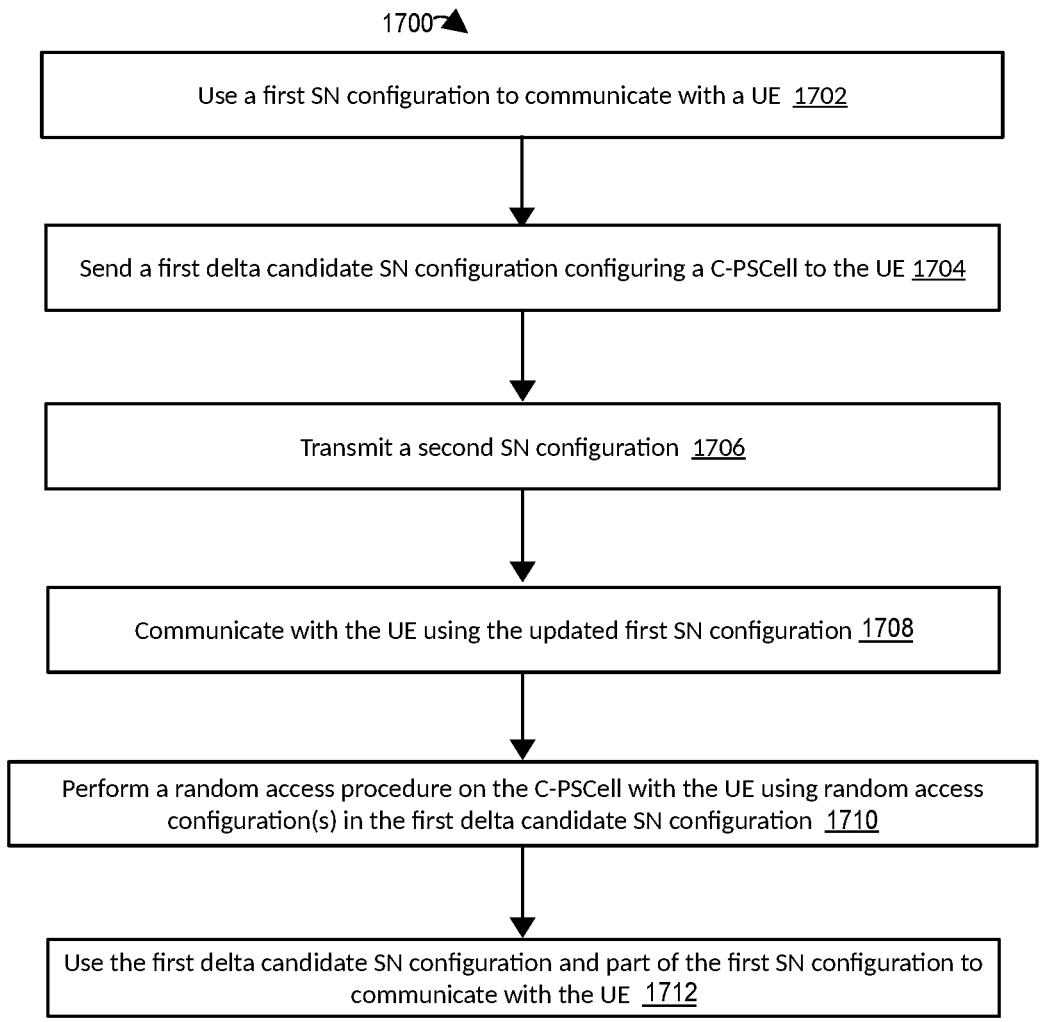
FIG. 17 is a flow diagram of another example method for initiating a conditional PSCell change procedure, which can be implemented in the SN of FIG. 1A or 1B, in accordance with the techniques of this disclosure.

FIG. 17 depicts an example method 1700 for initiating a conditional PSCell change procedure, which SN 106A or another suitable SN can implement.

The method 1700 begins at block 1702, where the SN 106A communicates with the UE 102 via PSCell using a first SN configuration (events 702, 752). The SN 106A at block 1704 then sends a first delta C-SN configuration configuring a C-PSCell to the UE 102 (events 706, 756). The SN 106A then at block 1706 transmits a second SN configuration (events 714, 766) to the UE 102 to update the first SN configuration, causing the UE 102 to update the first SN configuration in accordance with the second SN configuration (events 718, 768). The SN 106A at block 1708 communicates with the UE 102 using the updated first SN configuration (events 724, 774). Subsequently, the SN 106A at block 1710 performs a random access procedure on the C-PSCell with the UE 102 using random access configuration(s) in the first delta C-SN configuration (events 728, 778). The SN 106A at block 1712 uses the first delta C-SN configuration and at least a portion of the first SN configuration to communicate with the UE 102 (events 730, 780).

Figure 18:
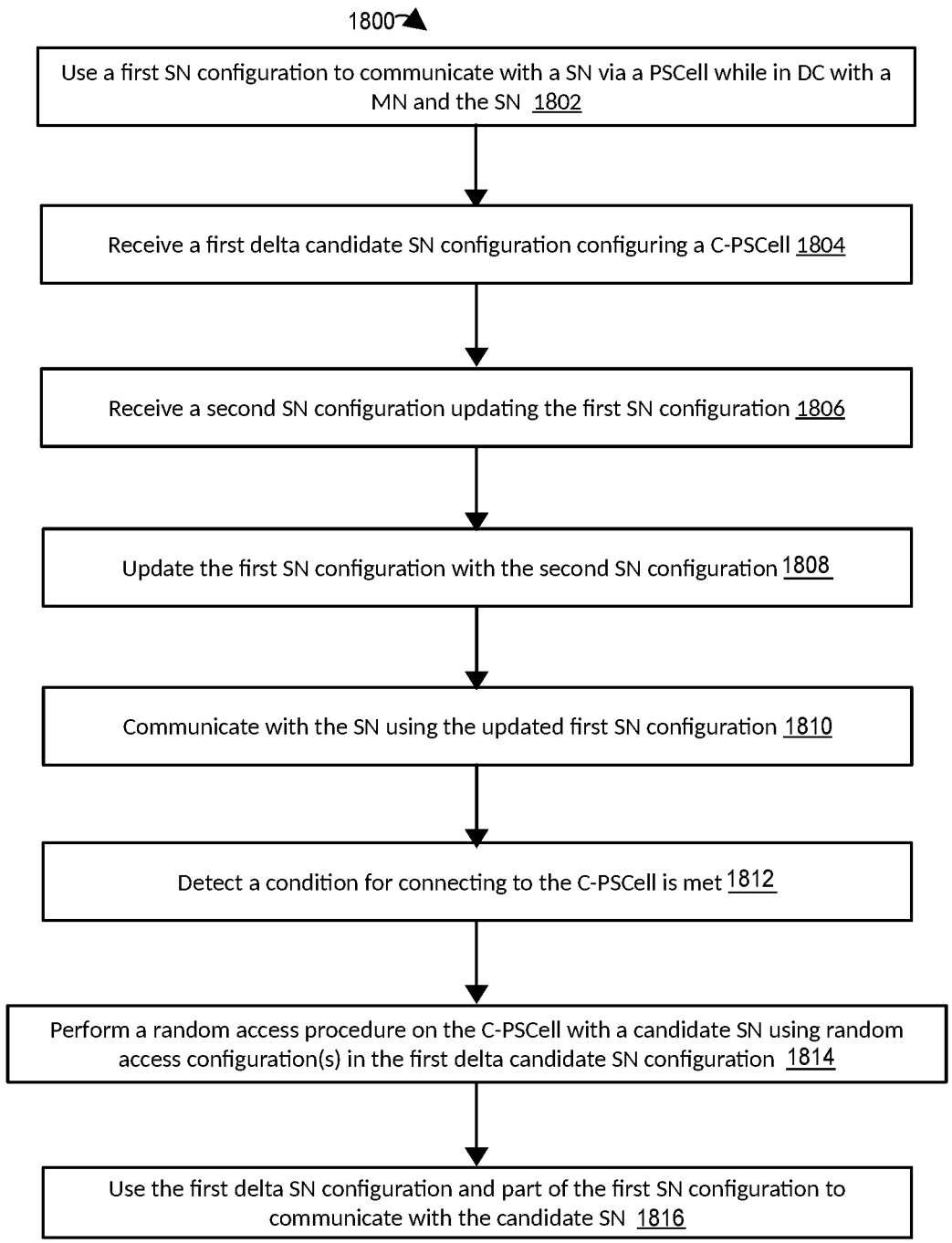
FIG. 18 is a flow diagram of an example method for initiating a conditional PSCell change procedure, which can be implemented in the UE of FIG. 1A or 1B, in accordance with the techniques of this disclosure.

FIG. 18 depicts an example method 1800 for initiating a conditional PSCell change procedure, which UE 102 or another suitable UE can implement.

The method 1800 begins at block 1802, where the UE 102 communicates with the SN 106A via PSCell using a first SN configuration while in DC with MN 104 (events 702, 752). The UE 102 at block 1804 then receives a first delta C-SN configuration configuring a C-PSCell (events 708, 756). The UE 102 then at block 1806 receives a second SN configuration updating the first SN configuration (events 716, 766), causing the UE 102 to update the first SN configuration in accordance with the second SN configuration at block 1808 (events 718, 768). The UE 102 at block 1810 communicates with the SN 106A using the updated first SN configuration (events 724, 774). Subsequently, the UE 102 at block 1812 detects that a condition for connecting to the C-PSCell is satisfied (events 726, 776), and in response, at block 1814 performs a random access procedure on the C-PSCell with the UE 102 using random access configuration(s) in the first delta C-SN configuration (events 728, 778). The UE 102 at block 1816 uses the first delta C-SN configuration and at least a portion of the first SN configuration to communicate with the SN 106A (events 730, 780).

Figure 19:
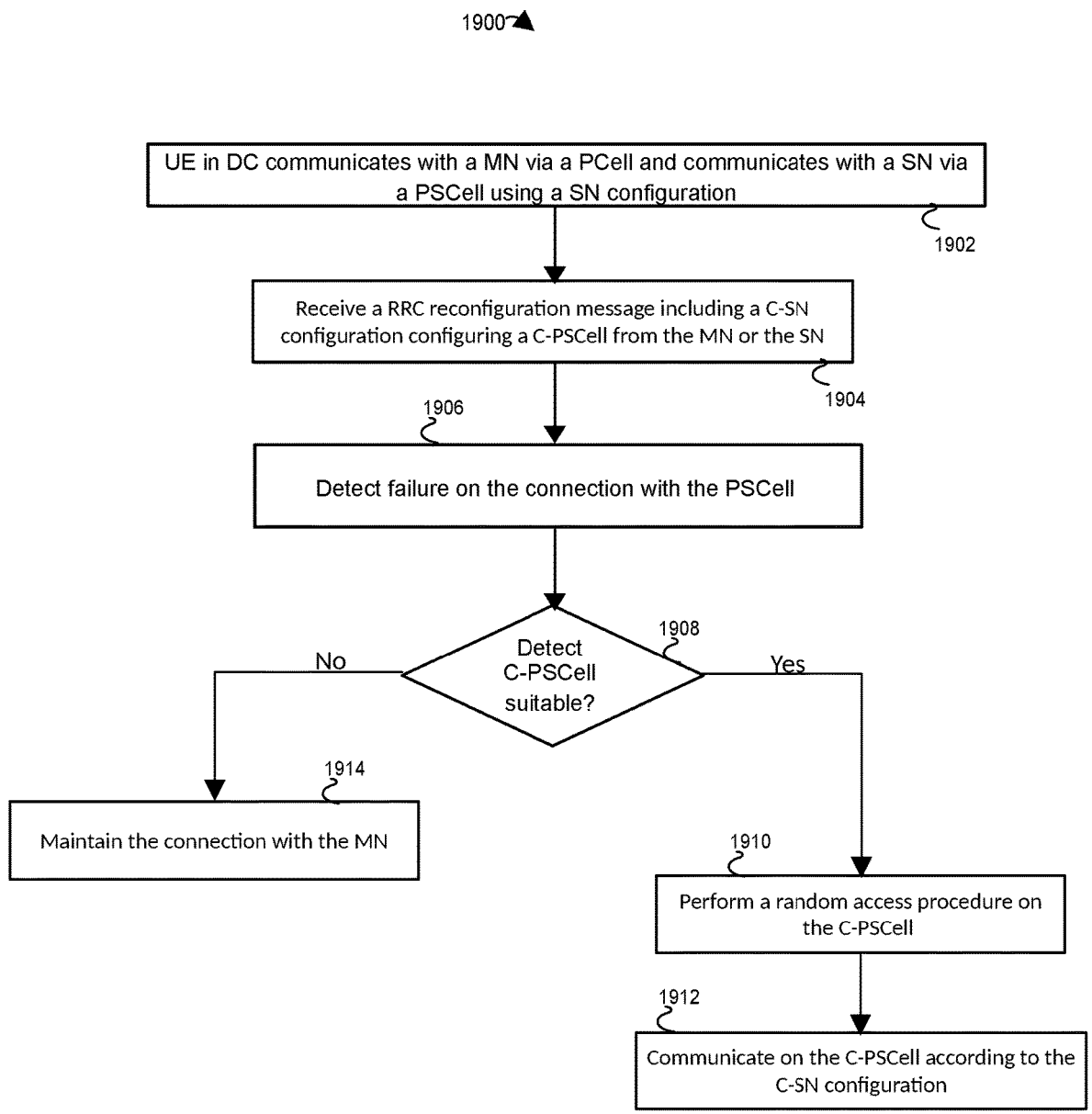
FIG. 19 is a flow diagram of an example method for initiating a conditional PSCell change procedure, prior to the UE detecting failure on a connection with the PSCell, in accordance with the techniques of this disclosure.

Next, FIG. 19 depicts an example method 1900 for a conditional PSCell change procedure prior to UE 102 detecting failure on a connection with the PSCell.

The method 1900 begins at block 1902, where the UE 102 is in DC with the MN 104 and SN 106A, communicates with the SN 106A via a PSCell using an SN configuration, and receives, at block 1904 via an RRC reconfiguration message from the SN 106A, a C-SN configuration (e.g., a full C-SN configuration, a delta C-SN configuration) for configuring a C-PSCell and any condition(s) associated with conditional PSCell change, similar to events 340, 390, 440, 640, 690, 740, 741, 790, 840, and 890.

Subsequently, the UE 102 at block 1906 detects a failure on the connection with the PSCell.

In response to detecting the failure, the UE 102 detects at block 1908 whether the C-PSCell is suitable. That is, if the UE 102 detects that condition(s) for connecting to the C-PSCell are satisfied, the UE 102 at block 1910 performs random access procedure with the SN 106A via the C-PSCell using random access configuration(s) in the C-SN configuration, similar to events 316, 366, 416, 628, 728, 778, 828, and 878. As a result, the UE 102 at block 1912 communicates with the SN 106A via C-PSCell by using the C-SN configuration, similar to events 318, 368, 418, 630, 730, 780, 830, and 880.

If the UE 102 detects that condition(s) for connecting to the C-PSCell are not satisfied, the UE 102 at block 1914 keeps the connection with the MN 104.

Figure 20:
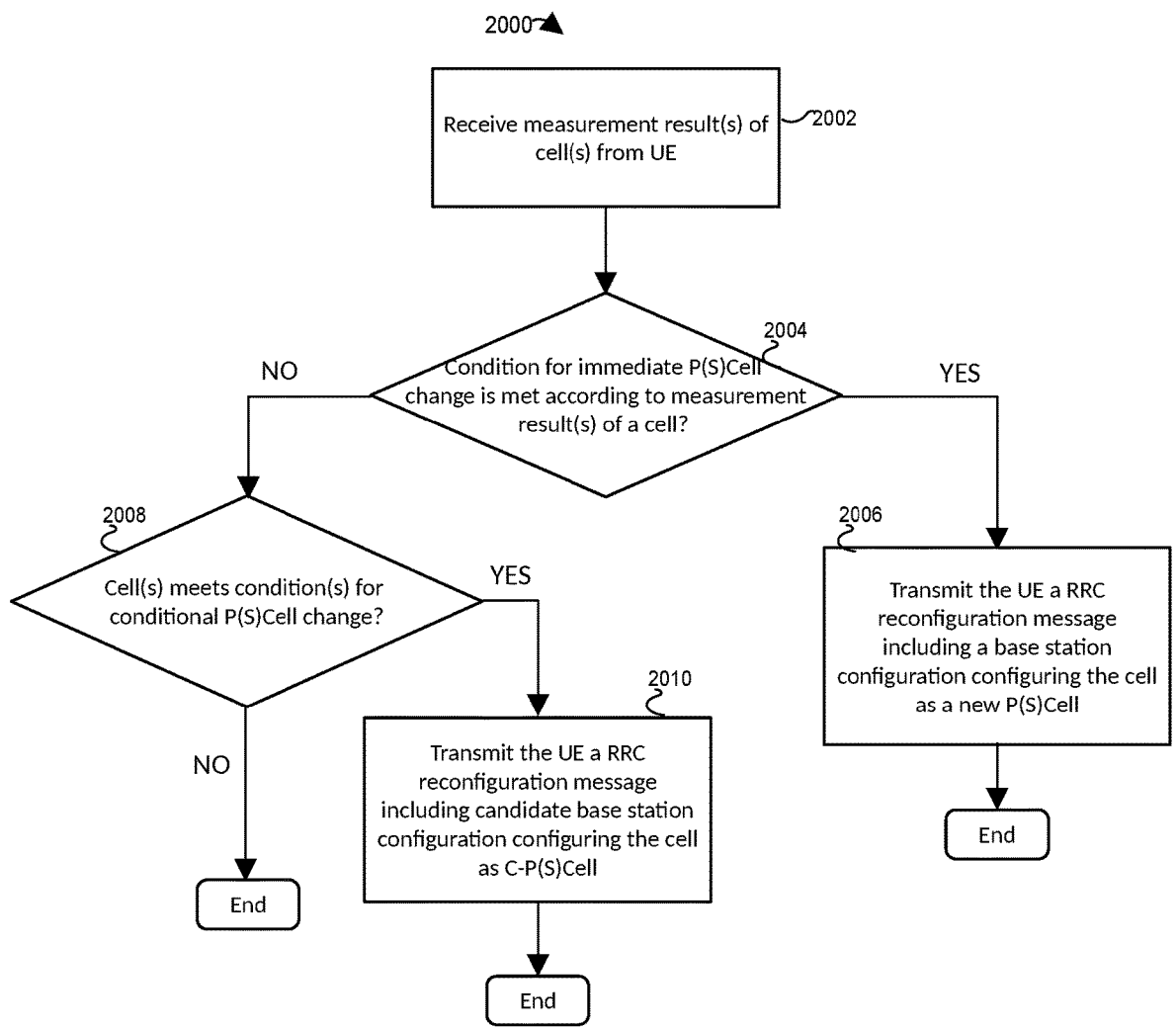
FIG. 20 is a flow diagram of an example method for performing an immediate PCell change, immediate PSCell change, or a conditional PSCell change, in accordance with the techniques of this disclosure.

Next, FIG. 20 depicts an example method 2000 for performing an immediate PCell change (i.e., immediate handover), immediate PSCell change (i.e., immediate SN change), or a conditional PSCell change (with or without SN change), which can be implemented in a suitable base station acting as an MN, an SN, but not a C-SN. For convenience, the method 2000 is discussed below with reference to the MN 104, SN 106A, and the UE 102 operating in the wireless communication system 100.

The method 2000 begins at block 2002, where the MN 104 or SN 106A receives one or more measurement results (measurement result(s)) of at least one cell from the UE 102. At block 2004, the MN 104 or SN 106A determines (i.e., checks or detects) whether the cell satisfies a condition for immediate PCell change or a condition for immediate PSCell change is met according to measurement result(s) of the cell in the received measurement result(s).

If the condition for immediate PCell change is met, the MN 104 at block 2006 transmits to the UE 102 an RRC reconfiguration message including a base station configuration (e.g., MN configuration) configuring the cell as a new PCell. If the condition for immediate PSCell change is met, the MN 104 or SN 106A at block 2006 transmits to the UE 102 an RRC reconfiguration message including a base station configuration (e.g., SN configuration) configuring the cell as a new PSCell. In either case upon receiving the RRC reconfiguration message, the UE 102 connects to a base station (e.g., a C-MN for the immediate handover or the SN 106A/C-SN for the immediate PSCell change) by performing a random access procedure with the base station.

If the condition for immediate PCell change or immediate PSCell change is not met, the MN 104 or SN 106A at block 2008 determines whether the cell satisfies a condition for conditional PCell change or conditional PSCell change according to measurement result(s) of the cell in the received measurement result(s).

If the MN 104 determines that the cell meets a condition for the conditional PCell change (events 1004, 1054), the MN 104 performs a conditional PCell change procedure with at least another base station (e.g., C-MN) that covers the cell to obtain a base station configuration (e.g., C-MN configuration). Subsequently, the MN 104 transmits to the UE 102 an RRC reconfiguration message including the C-MN configuration for configuring the cell as a C-PCell (events 1012, 1062). If the MN 104 or SN 106A determines that the cell meets a condition for the conditional PSCell change, the MN 104 or SN 106A determines to perform a conditional PSCell change procedure with the SN 106A (for a PSCell change procedure without SN change) or with a C-SN (for a PSCell change procedure with SN change) that covers the cell to obtain a base station configuration (e.g., C-SN configuration) (events 304, 354, 404, 504, 508, 554, 558, 604, 654, 704, 754, 804, 854, 864). Subsequently, the MN 104 or SN 106A transmits to the UE 102 an RRC reconfiguration message including the C-SN configuration for configuring the cell as a C-PSCell (event 308, 358, 408, 512, 562, 608, 656, 708, 756, 808, 858, 866). In some embodiments, the MN 104 or SN 106A may include condition(s) for connecting to the C-PCell or C-PSCell in the one or more RRC reconfiguration messages.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional and alternative structural and functional designs for handling mobility between base stations through the principles disclosed herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

Aspect 1. A method in a base station capable of providing a full configuration related to a radio connection to a user device and a delta configuration which the user device can apply to a previously received configuration, the method comprising: determining, by processing hardware of the base station and while the user device is operating in a cell covered by the base station using the previously received configuration, to configure the full configuration for the user device; identifying, by the processing hardware, at least a candidate cell for the full configuration; and transmitting, by the processing hardware and to the user device, the full configuration and an indication of a set of one or more conditions to be satisfied before the user device communicates with the base station via the candidate cell using the full configuration.

Aspect 2. The method of aspect 1, wherein the base station is a secondary node (SN) operating in dual connectivity (DC) with the user device and a master node (MN).

Aspect 3. The method of aspects 1 or 2 wherein the transmitting comprises including an indication of the full configuration to the user device.

Aspect 4. The method of aspects 2 or 3, wherein the transmitting comprises sending the full configuration to the user device via an RRC reconfiguration message from the MN.

Aspect 5. The method of aspects 2 or 3, wherein the transmitting provides the full configuration to the user device directly from the SN.

Aspect 6. The method of any of aspects 1-5, wherein the transmitting further includes providing an indication of a set of one or more conditions to be satisfied before the user device communicates with the base station using the full configuration.

Aspect 7. The method of any of aspects 2-6, wherein the transmitting causes the user device to operate in DC with the MN and the base station via the candidate cell using the full configuration.

Aspect 8. The method of aspect 1, wherein the base station is an MN connected with the user device operating in DC with the MN and an SN.

Aspect 9. The method of aspect 8, wherein the determining comprises sending a request to a candidate SN, causing the candidate SN to generate the full configuration for configuring the candidate cell.

Aspect 10. The method of aspect 8, wherein the determining comprises: configuring a candidate SN for a conditional SN change, and sending a request to the candidate SN, causing the candidate SN to determine to configure the full configuration for the user device.

Aspect 11. The method of aspects 9 or 10, further comprising: receiving the full configuration from the candidate SN; and transmitting the full configuration and an indication of the full configuration to the user device via an RRC reconfiguration message, causing the user device to operate in DC with the base station and the candidate SN via the candidate cell using the full configuration.

Aspect 12. The method of any of aspects 9-11, wherein the transmitting further includes providing an indication of a set of one or more conditions to be satisfied before the user device communicates with the candidate SN via the candidate cell using the full configuration.

Aspect 13. The method of aspect 12, wherein transmitting the full configuration to the user device causes the user device to communicate with the candidate SN via the candidate cell if the user device detects a radio link failure (RLF) with the cell and the user device determines that the set of one or more conditions are satisfied.

Aspect 14. The method of aspect 1, wherein the base station is an MN connected with the user device, and further configured to handover the user device to a candidate MN.

Aspect 15. The method of aspect 14, wherein the determining comprises sending a request to a candidate MN, causing the candidate MN to generate the full configuration for configuring the candidate cell.

Aspect 16. The method of aspect 15, further comprising: receiving the full configuration from the candidate MN; and transmitting the full configuration, an indication of the full configuration, and an indication of a second set of one or more conditions to be satisfied before the user device hands over to the candidate MN and communicates with the candidate MN using the full configuration.

Aspect 17. The method of aspect 1, wherein the base station is an MN connected with the user device, and further configured to handover the user device to the candidate cell.

Aspect 18. The method of aspects 1 or 17, wherein the transmitting comprises including an indication of the full configuration to the user device via an RRC reconfiguration message.

Aspect 19. The method of aspects 1, 17 or 18, wherein the transmitting further includes providing an indication of a second set of one or more conditions to be satisfied before the user device communicates with the base station using the full configuration.

Aspect 20. The method of aspects 18 or 19, wherein the transmitting causes the user device to communicate with the base station via the candidate cell using the full configuration.

Aspect 21. The method of any of aspects 7, 16, or 20 further comprising: releasing the previously received configuration after the user device establishes a connection with the base station via the candidate cell using the full configuration.

Aspect 22. A method in a base station capable of providing a full configuration related to a radio connection to a user device and a delta configuration which the user device can apply to a first configuration received previously, the method comprising: transmitting, by the processing hardware and to the user device, a second configuration for the user device to update the first configuration in accordance with the second configuration to result in an updated first configuration; determining, by processing hardware of the base station and while the user device is operating in a cell covered by the base station using the first configuration, to configure the delta configuration for the user device to modify one or more parameters included in the updated first configuration after the user device communicates with the base station using the updated first configuration; identifying, by the processing hardware, at least a candidate cell for the delta configuration; and transmitting, by the processing hardware and to the user device, the delta configuration and an indication of a set of one or more conditions to be satisfied before the user device communicates with the base station via the candidate cell using the delta configuration, and at least a portion of the updated first configuration when the user device determines that the set of one or more conditions is satisfied.

Aspect 23. The method of aspect 22, wherein parameters of the second configuration overlap with parameters of the delta configuration.

Aspect 24. The method of aspect 22, wherein transmitting the second configuration to the user device is caused by a triggering event detected by the base station, wherein the second configuration includes a new configuration parameter that was not present in the first configuration; wherein the delta configuration causes the user device to release the new configuration parameter when the base station no longer detects the triggering event; and wherein the at least the portion of the updated first configuration excludes the new configuration parameter.

Aspect 25. A method in a base station capable of providing a full configuration related to a radio connection to a user device and a delta configuration which the user device can apply to a first configuration received previously, the method comprising: determining, by processing hardware of the base station and while the user device is operating in a cell covered by the base station using the first configuration, to configure the delta configuration for the user device; identifying, by the processing hardware, at least a candidate cell for the delta configuration; and transmitting, by the processing hardware and to the user device, a second configuration for the user device to update the first configuration in accordance with the second configuration to result in an updated first configuration, wherein the delta configuration and the second configuration do not have overlapping configuration parameters; after transmitting the second configuration to the user device, sending, by the processing hardware and to the user device, the delta configuration and an indication of a set of one or more conditions to be satisfied before the user device communicates with the base station via the candidate cell using the delta configuration and the updated first configuration.

Aspect 26. A base station comprising hardware and configured to perform the method of any one of aspects 1 through 25.

Aspect 27. A method in a user device capable of receiving a full configuration related to a radio connection to a base station and a delta configuration which the user device can apply to a first configuration received previously, the method comprising: receiving, by processing hardware of the user device and from the base station while the user device is operating in a cell covered by the base station using the first configuration, the full configuration providing information for user device operation within a candidate cell; determining, by processing hardware of the user device, whether a set of one or more conditions associated with the full configuration to the candidate cell is satisfied; and connecting, by processing hardware of the user device, to the candidate cell using the full configuration if the user device determines that the set of conditions is satisfied.

Aspect 28. The method of aspect 27, further comprising: detecting a radio link failure (RLF) with the cell; in response to the detecting, determining that the set of one or more conditions associated with the full configuration to the candidate cell is satisfied; and in response to the determining, communicating via the candidate cell.

Aspect 29. A method in a user device capable of receiving a full configuration related to a radio connection to a base station and a delta configuration which the user device can apply to a first configuration received previously, the method comprising: receiving, by processing hardware of the user device and from the base station, while the user device is operating in a cell covered by the base station using the first configuration, a second configuration for updating the first configuration to result in an updated first configuration for operating in the cell covered by the base station; receiving, by processing hardware of the user device and from the base station while the user device is operating in the cell, a first delta configuration providing information for user device operation within a first candidate cell to modify one or more parameters included in the updated first configuration after the user device communicates with the base station using the updated first configuration; determining, by processing hardware of the user device, whether a first set of one or more conditions associated with the first delta configuration to the first candidate cell is satisfied; prior to detecting that the set of one or more conditions associated with the first delta configuration to the first candidate cell is satisfied: updating, by processing hardware of the user device, the first configuration in accordance with the second configuration to result in an updated configuration; and communicating, by processing hardware of the user device, with the base station using the updated configuration; and after detecting that the first set of one or more conditions associated with the first delta configuration to the first candidate cell is satisfied, connecting, by processing hardware of the user device, to the first candidate cell using the first delta configuration and one of at least a portion of the updated first configuration or at least a portion of the first configuration.

Aspect 30. The method of aspect 29, wherein if the second configuration includes a new configuration parameter not in the first configuration, updating the first configuration comprises adding the new configuration parameter to the first configuration.

Aspect 31. The method of aspect 29, wherein if the second configuration modifies a configuration parameter in the first configuration, updating the first configuration comprises modifying the configuration parameter in the first configuration.

Aspect 32. The method of aspect 29, wherein if the second configuration releases a configuration parameter in the first configuration, updating the first configuration comprises releasing the configuration parameter in the first configuration.

Aspect 33. The method of aspects 30-32, wherein the configuration parameter configures radio resources for the user device to communicate with the base station via the cell or a secondary cell.

Aspect 34. A method in a user device capable of receiving a full configuration related to a radio connection to a base station and a delta configuration which the user device can apply to a previously received configuration, the method comprising: receiving, by processing hardware of the user device and from the base station while the user device is operating in a cell covered by the base station using the previously received configuration, a first delta configuration providing information for user device operation within a first candidate cell, wherein the first delta configuration is associated with a first set of one or more conditions; receiving, by processing hardware of the user device and from the base station while the user device is operating in the cell covered by the base station using the previously received configuration, a second delta configuration providing information for user device operation within a second candidate cell; detecting, by processing hardware of the user device, that a second set of one or more conditions associated with the second delta configuration to connect to the second candidate cell is satisfied; and connecting, by processing hardware of the user device, to the second candidate cell using the second delta configuration and a portion of the previously received configuration.

Aspect 35. The method of any of aspects 29-34, further comprising: detecting a radio link failure (RLF) with the cell; in response to the detecting, determining that the first set of one or more conditions associated with the first delta configuration to connect to the first candidate cell or that the second set of one or more conditions associated with the second delta configuration to connect to the second candidate cell is satisfied; and in response to the determining, connecting to the first candidate cell or the second candidate cell.

Aspect 36. A user device comprising hardware and configured to perform the method of any of aspects 27-35.

What is claimed:

1. A method in a base station capable of providing a full configuration related to a radio connection to a user device and a delta configuration which the user device can apply to a previously received configuration, the method comprising:
   determining, by the base station and while the user device is operating in a cell covered by the base station using the previously received configuration, to configure the full configuration for the user device to connect to a candidate cell; and
   transmitting, by the base station and to the user device, the full configuration and an indication of a set of one or more conditions that are associated with the full configuration for the user device to connect to the candidate cell and that are to be satisfied before the user device communicates with the base station via the candidate cell using the full configuration.

2. The method of claim 1, wherein the base station is an MN connected with the user device operating in DC with the MN and an SN.

3. The method of claim 2, wherein the determining comprises sending a request to a candidate SN, causing the candidate SN to generate the full configuration for configuring the candidate cell.

4. The method of claim 3, wherein the transmitting further includes providing an indication of a second set of one or more conditions to be satisfied before the user device communicates with the candidate SN via the candidate cell using the full configuration.

5. The method of claim 4, wherein transmitting the full configuration to the user device causes the user device to communicate with the candidate SN via the candidate cell if the user device detects a radio link failure (RLF) with the cell and the user device determines that the second set of one or more conditions are satisfied.

6. The method of claim 2, wherein the determining comprises:
   configuring a candidate SN for a conditional SN change, and
   sending a request to the candidate SN, causing the candidate SN to determine to configure the full configuration for the user device.

7. The method of claim 1, wherein the base station is an MN connected with the user device, and further configured to handover the user device to a candidate MN.

8. The method of claim 1, wherein the base station is an MN connected with the user device, and further configured to handover the user device to the candidate cell.

9. A base station capable of providing a full configuration related to a radio connection to a user device and a delta configuration which the user device can apply to a previously received configuration, the base station comprising processing hardware configured to:
   determine, while the user device is operating in a cell covered by the base station using the previously received configuration, to configure the full configuration for the user device to connect to a candidate cell; and
   transmit, to the user device, the full configuration and an indication of a set of one or more conditions that are associated with the full configuration for the user device to connect to the candidate cell and that are to be satisfied before the user device communicates with the base station via the candidate cell using the full configuration.

10. The base station of claim 9, wherein the base station is an MN connected with the user device operating in DC with the MN and an SN.

11. The base station of claim 10, wherein the processing hardware is configured to determine to configure the full configuration for the user device by sending a request to a candidate SN, causing the candidate SN to generate the full configuration for configuring the candidate cell.

12. The base station of claim 11, wherein the processing hardware is configured to transmit the full configuration and the indication by providing an indication of a set of one or more conditions to be satisfied before the user device communicates with the candidate SN via the candidate cell using the full configuration.

13. The base station of claim 10, wherein the processing hardware is configured to determine to configure the full configuration for the user device by:
   configuring a candidate SN for a conditional SN change, and
   sending a request to the candidate SN, causing the candidate SN to determine to configure the full configuration for the user device.

14. The base station of claim 9, wherein the base station is an MN connected with the user device, and further configured to handover the user device to a candidate MN.

15. The base station of claim 9, wherein the base station is an MN connected with the user device, and further configured to handover the user device to the candidate cell.

16. A method in a user device capable of receiving a full configuration related to a radio connection to a base station and a delta configuration which the user device can apply to a first configuration received previously, the method comprising:
   receiving, by the user device and from the base station while the user device is operating in a cell covered by the base station using the first configuration, the full configuration providing information for user device operation within a candidate cell; and connecting, by the user device, to the candidate cell using the full configuration when the user device determines that a set of one or more conditions associated with the full configuration providing the information for the user device operation within the candidate cell is satisfied.

17. The method of claim 16, further comprising:

detecting a radio link failure (RLF) with the cell;

in response to the detecting, determining that the set of one or more conditions associated with the full configuration providing the information for the user device operation within the candidate cell is satisfied; and in response to the determining, communicating via the candidate cell.

18. The method of claim 17, further comprising:

sending an indication of the detected RLF to the base station.

19. The method of claim 16, wherein the base station is an MN connected with the user device operating in DC with the MN and an SN.

20. The method of claim 16, wherein the user device communicates with a candidate SN via the candidate cell using the full configuration.

* * * * *